US008872379B2

(12) United States Patent
Ruiz et al.

(10) Patent No.: US 8,872,379 B2
(45) Date of Patent: Oct. 28, 2014

(54) EFFICIENT USAGE, STORAGE, AND SHARING OF ENERGY IN BUILDINGS, VEHICLES, AND EQUIPMENT

(75) Inventors: John Ismael Ruiz, New Berlin, WI (US); Clay Grenwell Nesler, Brookfield, WI (US); Michael G. Andrew, Menomonee Falls, WI (US)

(73) Assignee: Johnson Controls Technology Company, Holland, MI (US)

( * ) Notice: Subject to any disclaimer, the term of this patent is extended or adjusted under 35 U.S.C. 154(b) by 748 days.

(21) Appl. No.: 13/122,726

(22) PCT Filed: Oct. 6, 2009

(86) PCT No.: PCT/US2009/059741
§ 371 (c)(1),
(2), (4) Date: Apr. 5, 2011

(87) PCT Pub. No.: WO2010/042550
PCT Pub. Date: Apr. 15, 2010

(65) Prior Publication Data
US 2011/0204720 A1 Aug. 25, 2011

Related U.S. Application Data

(63) Continuation-in-part of application No. 12/324,687, filed on Nov. 26, 2008, now abandoned.

(60) Provisional application No. 61/103,557, filed on Oct. 7, 2008, provisional application No. 61/103,561, filed on Oct. 7, 2008, provisional application No. 61/103,563, filed on Oct. 7, 2008, provisional application No. 60/991,583, filed on Nov. 30, 2007.

(51) Int. Cl.
*H02J 9/00* (2006.01)

(52) U.S. Cl.
USPC .......................................................... 307/66

(58) Field of Classification Search
CPC ...................................................... H02J 9/002
USPC .......................................................... 307/66
See application file for complete search history.

(56) References Cited

U.S. PATENT DOCUMENTS

| | | | |
|---|---|---|---|
| 6,310,783 B1 * | 10/2001 | Winch et al. | 361/797 |
| 6,569,555 B1 | 5/2003 | Faris et al. | |
| 7,010,363 B2 | 3/2006 | Donnelly et al. | |
| 7,274,975 B2 | 9/2007 | Miller | |
| 7,325,542 B2 | 2/2008 | Mejia | |
| 7,353,084 B2 * | 4/2008 | Schaper et al. | 700/287 |

(Continued)

OTHER PUBLICATIONS

International Search Report and Written Opinion of PCT Application No. PCT/US2009/059741 dated May 19, 2010.

*Primary Examiner* — Hal Kaplan
(74) *Attorney, Agent, or Firm* — Fletcher Yoder, P.C.

(57) ABSTRACT

The present disclosure relates generally to energy demand and supply for buildings, vehicles, and equipment. In exemplary embodiments, energy may be stored in one or more battery packs (e.g., stationary batteries or vehicle batteries) for use in buildings, appliances, and equipment typically relying on energy from a power grid. The exemplary embodiments may store the energy during periods of low demand and/or low cost of energy. Thus, the exemplary embodiments may reduce costs associated with energy usage. The exemplary embodiments may use the stored energy to reduce demand on the power utility during periods of high demand and/or provide energy back to the power utility to meet demands.

18 Claims, 28 Drawing Sheets

(56) References Cited

U.S. PATENT DOCUMENTS

| | | |
|---|---|---|
| 7,706,990 B2 | 4/2010 | Herzig |
| 7,832,652 B2 * | 11/2010 | Barton et al. .................. 236/51 |
| 7,839,020 B2 | 11/2010 | Nakanishi |
| 2004/0254654 A1 | 12/2004 | Donnelly et al. |
| 2006/0091849 A1 | 5/2006 | Huynh et al. |
| 2007/0224504 A1 * | 9/2007 | Kita et al. .................. 429/231.1 |
| 2008/0040263 A1 | 2/2008 | Pollack et al. |
| 2008/0118819 A1 | 5/2008 | Gamboa et al. |

* cited by examiner

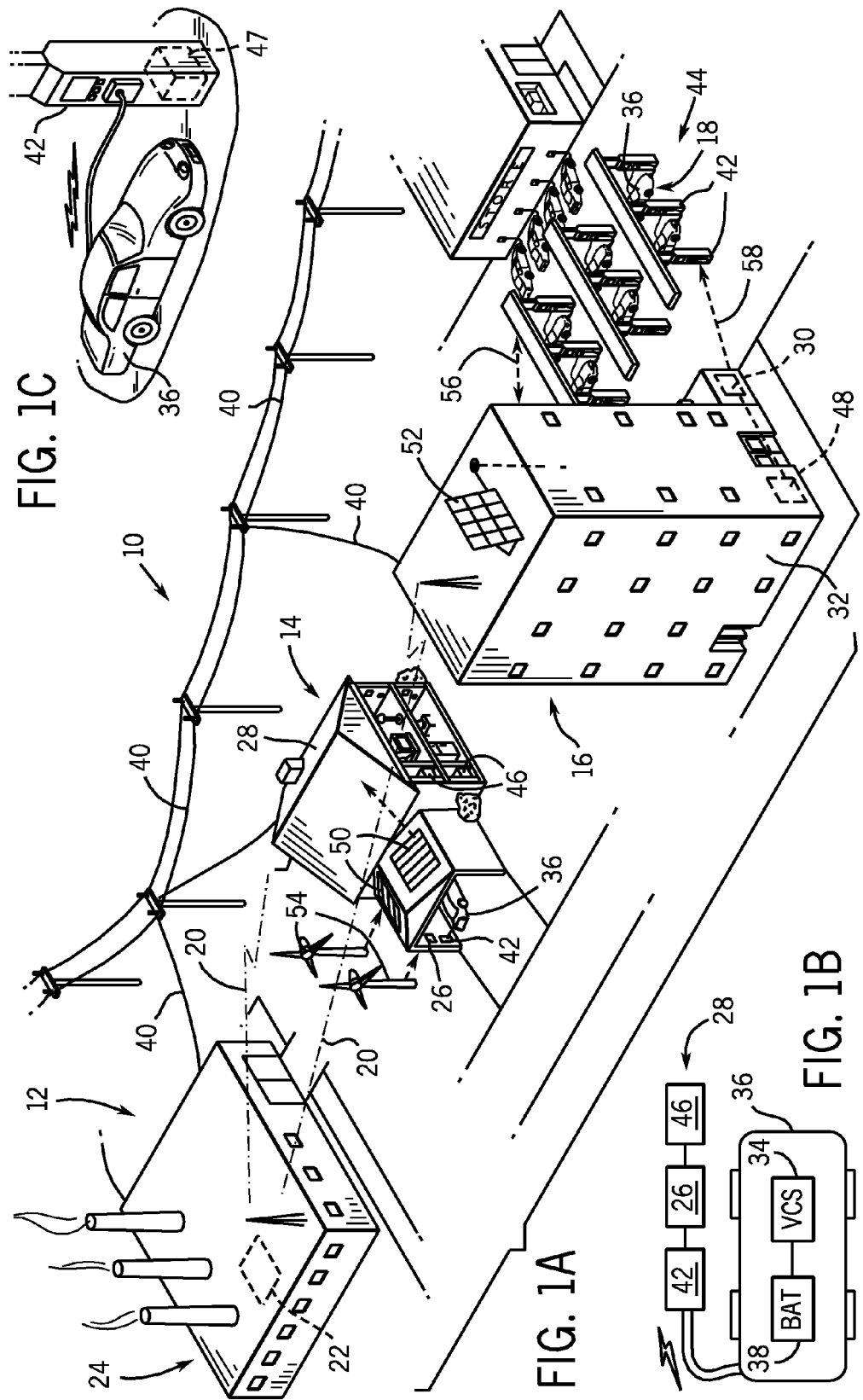

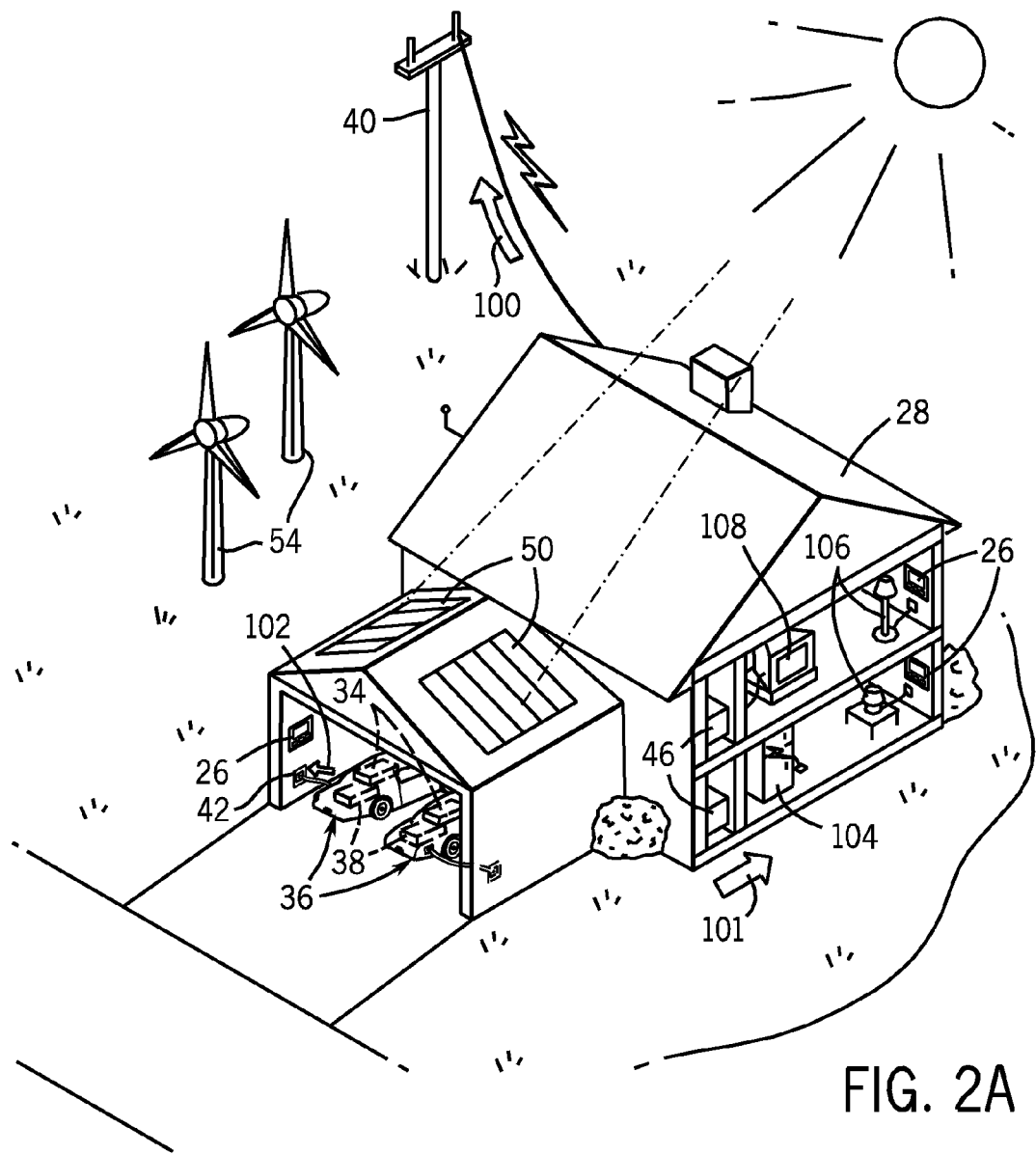
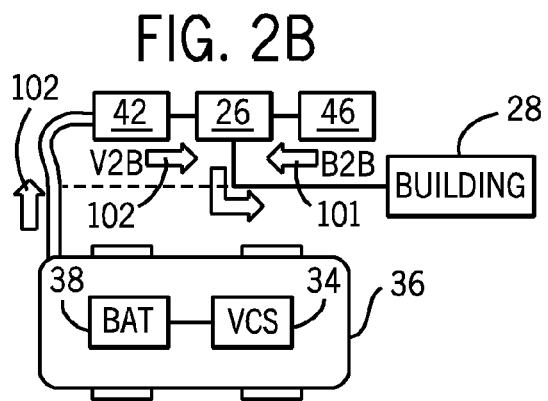
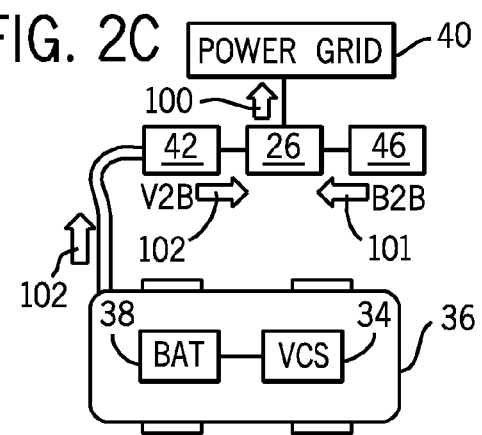
FIG. 2A
FIG. 2B
FIG. 2C

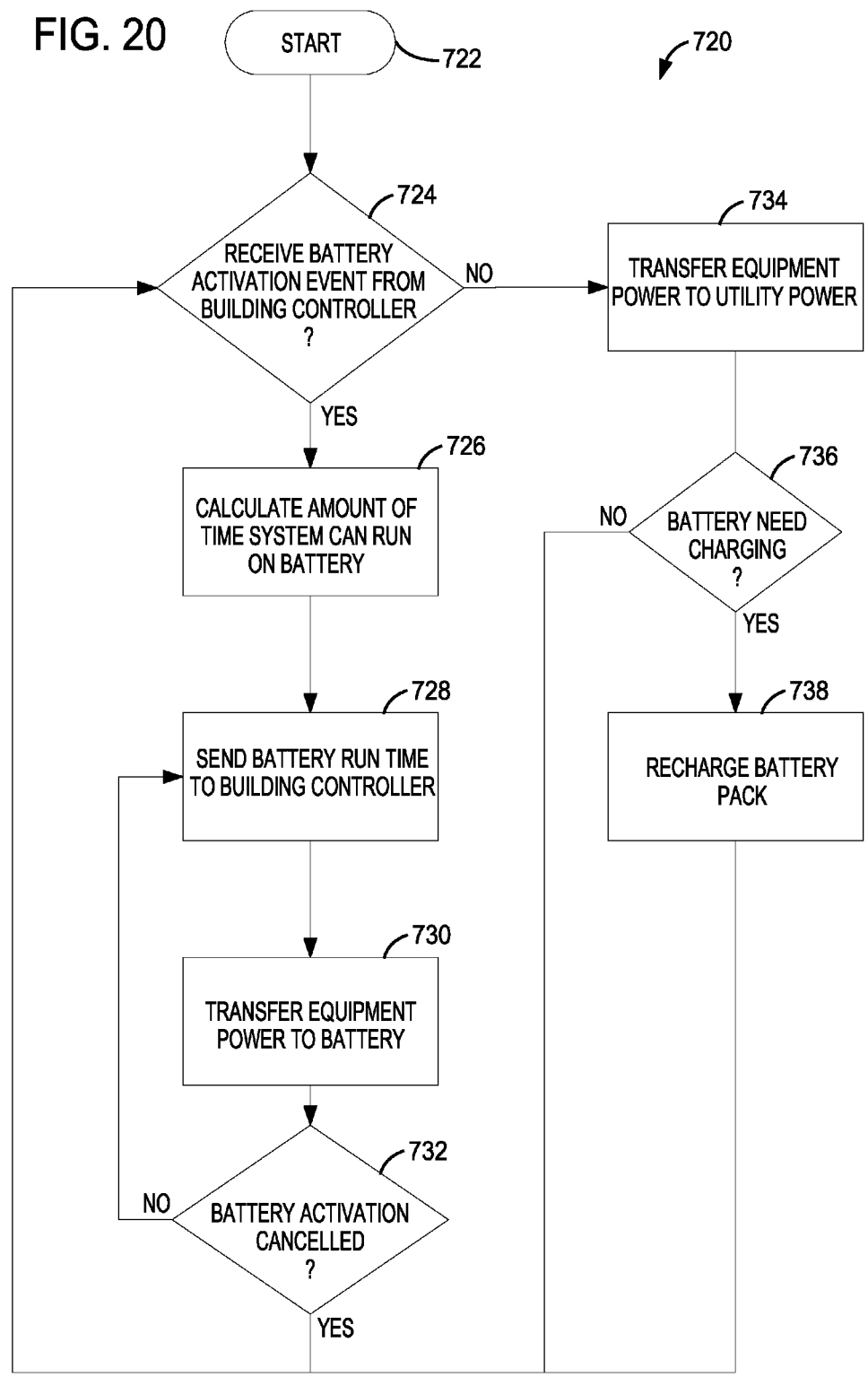

EFFICIENT USAGE, STORAGE, AND SHARING OF ENERGY IN BUILDINGS, VEHICLES, AND EQUIPMENT

CROSS-REFERENCE TO RELATED APPLICATIONS

This application claims priority from and the benefit of PCT Application No. PCT/US2009/059741 entitled "EFFICIENT USAGE, STORAGE, AND SHARING OF ENERGY IN BUILDINGS, VEHICLES, AND EQUIPMENT", filed on Oct. 6, 2009, which is herein incorporated by reference in its entirety, and which is a continuation of:

U.S. Non-Provisional application Ser. No. 12/324,687, entitled "ELECTRICAL DEMAND RESPONSE USING ENERGY STORAGE IN VEHICLES AND BUILDINGS", filed Nov. 26, 2008, which is hereby incorporated by reference in its entirety, which claims priority from and the benefit of U.S. Provisional Application Ser. No. 60/991,583, entitled "ELECTRICAL DEMAND RESPONSE SYSTEM", filed Nov. 30, 2007, which is hereby incorporated by reference in its entirety;

U.S. Provisional Application Ser. No. 61/103,557, entitled "EFFICIENT USAGE, STORAGE, AND SHARING OF ENERGY IN BUILDINGS, VEHICLES, AND EQUIPMENT", filed Oct. 7, 2008, which is hereby incorporated by reference in its entirety;

U.S. Provisional Application Ser. No. 61/103,561, entitled "EFFICIENT USAGE, STORAGE, AND SHARING OF ENERGY BETWEEN VEHICLES AND BUILDINGS", filed Oct. 7, 2008, which is hereby incorporated by reference in its Entirety; and U.S. Provisional Application Ser. No. 61/103,563, entitled "EFFICIENT USAGE, STORAGE, AND SHARING OF ENERGY BETWEEN VEHICLES AND THE ELECTRIC POWER GRID", filed Oct. 7, 2008, which is hereby incorporated by reference in its entirety.

BACKGROUND

The invention relates generally to efficient usage, storage, and sharing of energy with buildings, vehicles, and equipment, and also electrical demand response using energy storage.

Energy drives a myriad of devices and equipment in commercial, industrial, and residential applications. For example, energy drives lights, motors, household appliances, medical equipment, computers, heating and air conditioning systems, and many other electrical devices. Some of these devices require continuous power to function, e.g., medical monitoring equipment. Unfortunately, the existing infrastructure relies heavily on fossil fuels to power combustion engines in vehicles and equipment, and power utilities to generate and distribute electricity through a power grid to the various applications.

Shortages and/or increased costs associated with fossil fuels and electricity from power utilities significantly impact consumers and businesses. In general, shortages and/or increased costs often occur during times of peak demand. On a daily basis, peak demand occurs during the daytime, while minimum demand occurs during the night time. On a more random basis, peak demand (or a demand greater than an available supply) may occur as a result of a natural disaster. For example, a hurricane or earthquake may damage the power grid and/or electric generators of the power utilities, thereby resulting in substantial loss of electric power to commercial, industrial, and residential applications. Repairs to these damaged lines and generators may take hours, days, or weeks. Various sites also may lose power from the power grid for other reasons. During these times of lost power, the sites may be unable to continue operations.

Often, energy is more expensive during times of peak demand. For example, a power utility may employ low cost electrical generators during periods of minimum demand, while further employing high cost electrical generators during periods of peak demand. Unfortunately, the existing infrastructure does not adequately address these different costs associated with peak and minimum demands. As a result, commercial, industrial, and residential applications typically draw power from the power grid during times of peak demand, e.g., daytime, despite the higher costs associated with its generation.

SUMMARY

The present disclosure relates generally to energy demand and supply for buildings, vehicles, and equipment. In exemplary embodiments, energy may be stored in one or more battery packs (e.g., stationary batteries or vehicle batteries) for use in buildings, appliances, and equipment typically relying on energy from a power grid. The exemplary embodiments may store the energy during periods of low demand and/or low cost of energy. Thus, the exemplary embodiments may reduce costs associated with energy usage. The exemplary embodiments may use the stored energy to reduce demand on the power utility during periods of high demand and/or provide energy back to the power utility to meet demands.

DRAWINGS

FIG. 1A is a schematic of an exemplary embodiment of an electrical demand response system having a utility energy management system, a home energy management system, a vehicle control system, and a building management system.

FIG. 1B is a block diagram of an exemplary embodiment of a vehicle coupled to a residential building, showing vehicle having vehicle control system coupled to a battery, and residential building having home energy management system coupled to a vehicle charging station and a stationary battery.

FIG. 1C is a schematic of an exemplary embodiment of vehicle coupled to vehicle charging station at a commercial building.

FIG. 2A is a schematic of an exemplary embodiment of a residential building having the home energy management system of FIG. 1, showing an electrical demand response during a period of peak demand (e.g., mid-day) on a power grid.

FIG. 2B is a block diagram of an exemplary embodiment of residential building having both vehicle to building (V2B) and battery to building (B2B) electricity transfers.

FIG. 2C is a block diagram of an exemplary embodiment of residential building having vehicle to building (V2B) and battery to building (B2B) electricity transfers, and a building to grid (B2G) electricity transfer.

FIG. 20 is a flow chart of an exemplary embodiment of a process for controlling power sources for an air handling unit (AHU).

DETAILED DESCRIPTION

Figure 3A:
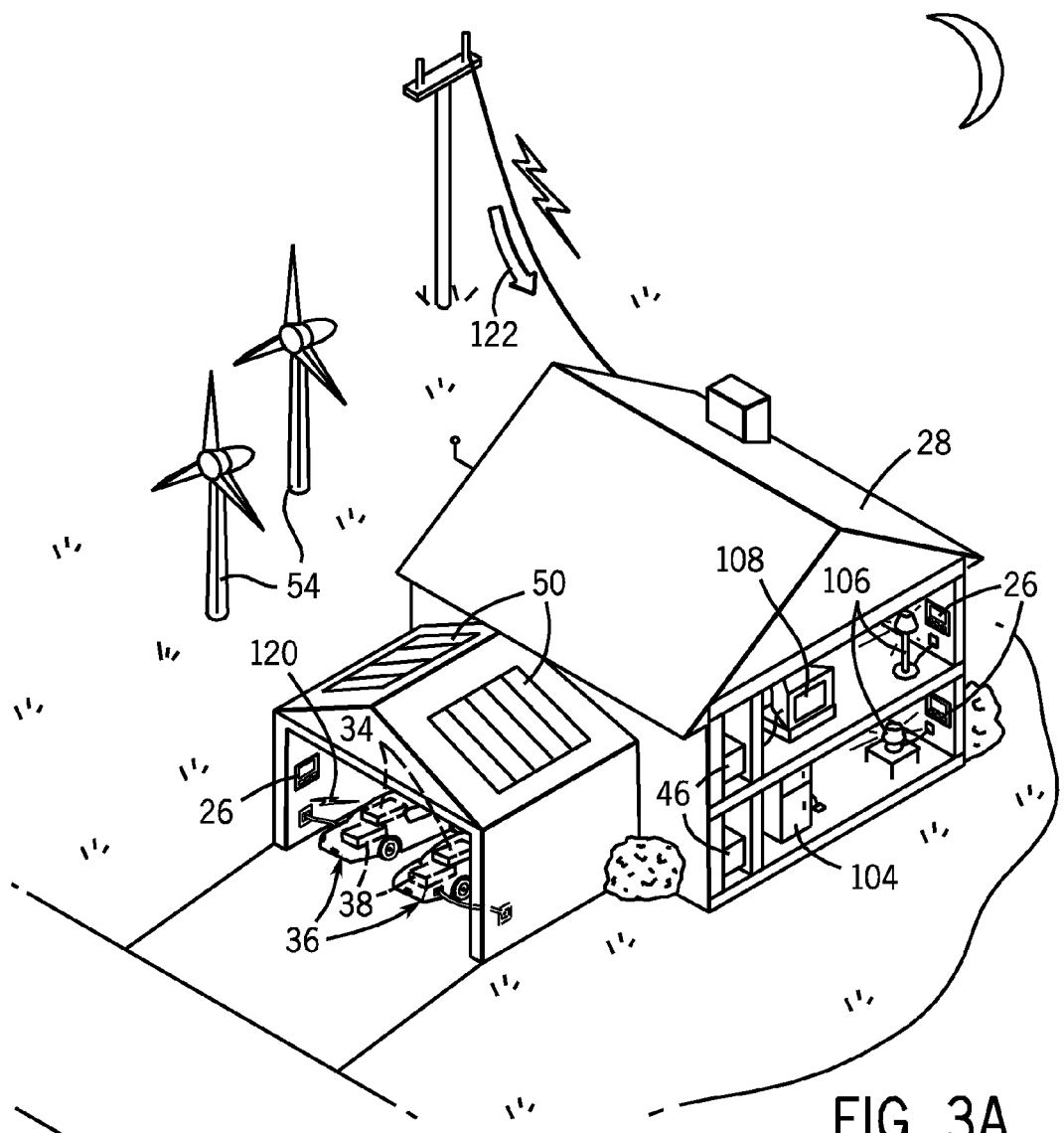
FIG. 3A is a schematic of an exemplary embodiment of a residential building having the home energy management system of FIG. 1, showing an electrical demand response during a period of off-peak demand (e.g., midnight) on a power grid.

In certain exemplary embodiments, a variety of alternative energy sources and energy storage systems may be used to improve electrical reliability, reduce non-sustainable energy consumption, and reduce the peak demand on electric utilities. The energy sources and storage systems may be used to share energy between buildings, vehicles, equipment, and the power grid. The energy sharing may occur in real-time or time-delayed based on various factors, such as energy costs, energy demand, and user comfort. One type of energy storage is a battery or set of batteries, such as stationary or mobile batteries. For example, stationary batteries may be installed on-site of a building or home, and may include used (e.g., spent) vehicle batteries. In certain embodiments, stationary batteries may be distributed throughout a site in proximity to the equipment, and may be disposed in modular battery systems (e.g., racks) for flexibility in energy storage capacity. By further example, stationary batteries may be installed directly into commercial, industrial, and residential equipment, such as appliances, audio/video devices, computers/servers, heating ventilating and air conditioning (HVAC) equipment, motors, and machines. Vehicle batteries may be disposed in an electric vehicle (EV), hybrid electric vehicle (HEV), plug-in hybrid electric vehicle (PHEV), or a combustion engine vehicle. In exemplary embodiments, the batteries may enable energy sharing from battery to building (B2B) or vice versa, battery or building to grid (B2G) or vice versa, vehicle to building (V2B) or vice versa, vehicle to grid (V2G) or vice versa, or another energy sharing arrangement. V2G may include V2B (vehicle to building) plus B2G (building to grid). The batteries may be connected to the power grid coming into a building, but could be an entirely separate power system for a building. Other energy sources may include wind power (e.g., wind turbines), solar power (e.g., solar photovoltaic panels), momentum power (e.g. flywheels), thermal power (e.g. ice storage), and hydroelectric power (hydroelectric turbines). However, any other energy source may be employed along with the exemplary embodiments.

In exemplary embodiments, a building or vehicle control system may integrate energy control features to optimize usage of energy sources and distribution of energy among various loads based on energy demand, real time pricing (RTP) of energy, and prioritization of loads. For example, the building or vehicle control system may include a control panel having a building control, a vehicle control, a grid power control, a battery power control, a solar power control, a wind power control, an electricity buying/selling control, a battery charging/discharging control based on real time pricing (RTP) of energy, and a carbon counter. The control panel may be integrated into a residential building, a commercial building, or a vehicle (e.g., a PHEV).

In exemplary embodiments, an electrical demand response system and methodology may provide stored electrical energy from one or more batteries (e.g., stationary or mobile) back to the electrical grid or directly to building electrical distribution systems during periods of peak utility demand. For example, the batteries may be stationary batteries disposed in a building, facility, or individual equipment, or the batteries may be mobile batteries disposed in a vehicle (e.g., PHEV). These batteries may be charged during periods of off peak demand (e.g., nighttime hours). For example, the PHEV may be charged during off-peak hours by a plug-in connection with a building or through the use of the internal combustion engine. The electrical demand response system and method can be integrated into any power grid, vehicle, or building.

FIG. 1A is a schematic of an exemplary embodiment of an energy management or electrical demand response system 10 having vehicle energy storage in residential, commercial, and industrial locations. In an exemplary embodiment, the electrical demand response system 10 may include a utility demand response system 12, a residential demand response system 14, a commercial demand response system 16, and a vehicle demand response system 18. Each of these systems 12, 14, 16, and 18 may include an energy management system configured to control various aspects of the vehicle energy storage, such as charging and discharging of the vehicle energy storage in response to demand response signals 20. In an exemplary embodiment, utility demand response system 12 includes a utility energy management system (UEMS) 22 at a power utility 24, residential demand response system 14 includes a home energy management system (HEMS) 26 at a residential building 28, commercial demand response system 16 includes a building management system (BMS) 30 at a commercial building 32, and vehicle demand response system 18 includes a vehicle control system (VCS) 34 in a vehicle 36 (FIG. 1B).

Vehicles 36 may include two or more power sources, such as battery power from battery 38 and power from a second source such as an internal combustion engine or a fuel cell. Both power sources are controlled by a vehicle power management system or VCS 34. In an exemplary embodiment, each vehicle 36 may be a PHEV or EV. A PHEV maintains all the functional performance features of a regular hybrid, but differs significantly in two key aspects: 1) the battery capacity is significantly greater in order to provide substantial electric-only operating range; and 2) the vehicle can be plugged into conventional AC power outlets to recharge the battery. For a hybrid, you may fill it up at the gas station, and you may plug it in to an electrical outlet such as a typical 120-volt outlet. Vehicles 36 may include automobiles, motorcycles, buses, recreational vehicles, boats, and other vehicle types. The battery 38 is configured to provide at least a portion of the power to operate the vehicle 36 and/or various vehicle systems. Battery 38 may include several cells in either modular form or as a stand-alone multi-cell array. Battery 38 can be made of modules or individual cells. Battery 38, such as a complete plug and play battery, may include a box, wires, cells, and modules. For example, battery 38 may include a group of cells configured into a self-contained mechanical and electrical unit. Vehicle 38 may include one, two, three, four, or more of these self-contained plug and play units. Each cell includes one or more positive electrodes, one or more negative electrodes, separators between the electrodes, and other features to provide an operational battery or cell within a housing or tray. Battery 38 may include other components (e.g., a battery management system (BMS) that are electrically coupled to the cells and may be adapted to communicate directly or through a battery management system to VCS 34. Vehicles 36 may be configured to be plugged in at home at night for charging. Overnight electrical power may be available at a lower cost than power used during peak hours of the day.

Each vehicle 36 includes one or more energy storage devices, such as battery packs 38 (FIG. 1B), which are accessible and controllable by electrical demand response system 10. For example, UEMS 22, HEMS 26, BMS 30, and VCS 34 may control the charging and discharging of the battery packs 38 based on demand response signals 20. Battery packs 38 may receive electrical power from power utility 24 through an electric power grid 40 and charging stations 42 (FIGS. 1A, 1B, and 1C) disposed at residential building 28, commercial building 32, a parking lot 44, or another location. In an exemplary embodiment, battery packs 38 in each vehicle 36 may provide power back to residential building 28, commercial building 32, and electric power grid 40 based on demand response signals 20. UEMS 22, HEMS 26, BMS 30, and VCS 34 are configured to control the charging and discharging of battery packs 38 located within plugged-in vehicles 36 to respond to variations in energy demand, real time pricing (RTP) of energy, power outages, and other factors.

In an exemplary embodiment, UEMS 22 of power utility 24 is configured to supplement electrical power generation capabilities with a variety of renewable distributed energy sources, including battery packs 38 in various vehicles 36, stationary batteries 46 in residential buildings 28, stationary batteries 48 in commercial buildings 32, solar panels 50 at residential buildings 28, solar panels 52 at commercial buildings 32, and wind turbines 54 at residential and commercial buildings 28 and 32. UEMS 22 of power utility 24 also may utilize stationary batteries, solar panels, and wind turbines at other distributed locations, such as wind farms, solar energy farms, and battery storage facilities. In an exemplary embodiment, UEMS 22 may transmit demand response signals 20 to obtain additional energy from these distributed energy sources during periods of high demand, and may transmit demand response signals 20 to cease using some or all of these distributed energy sources during periods of low energy demand.

Peak energy demand may occur during the daytime around midday, whereas minimum energy demand may occur during the nighttime around midnight. In an exemplary embodiment, UEMS 22 may transmit demand response signals 20 to discharge distributed batteries 38, 46, and 48 into electric power grid 40 to supplement the power generation capabilities of power utility 24 during periods of peak demand. During periods of minimum energy demand, UEMS 22 may transmit demand response signals 20 to charge distributed batteries 38, 46, and 48. In an exemplary embodiment, UEMS 22 may be given complete control of the charging and discharging of distributed batteries 38, 46, and 48. However, in certain embodiments of electrical demand response system 10, the charging and discharging of batteries 38, 46, and 48 may be at least partially or entirely controlled by HEMS 26, BMS 30, and/or VCS 34. For example, UEMS 22, HEMS 26, BMS 30, and VCS 34 may be configured to independently or cooperatively control the charging and discharging of batteries 38, 46, and 48 to respond to variations in energy demand, real time pricing (RTP) of energy, power outages, and other factors.

Referring generally to FIGS. 1A and 1B, an exemplary embodiment of HEMS 26 may be configured to control various energy sources and loads throughout residential building 28. For example, HEMS 26 may be configured to control energy from electric power grid 40, energy from vehicle and stationery batteries 38 and 46, energy from solar panels 50, and energy from wind turbines 54. HEMS 26 also may be configured to control energy usage by lighting, heating and air conditioning, pool and spa equipment, refrigerators, freezers, and other appliances throughout a residential building 28. For example, HEMS 26 may be configured to use energy from batteries 38 and 46, energy from solar panels 50, and energy from wind turbines 54 with a reduced or no reliance on energy from the electrical power grid 40 during periods of peak energy demand, high real time pricing (RTP) of energy, power outages, or low building demand at residential building 28. HEMS 26 may be configured to partially or entirely rely on energy from electric power grid 40 during periods of low energy demand, low real time pricing (RTP) of energy, low charge of batteries 38 and 46, and high building demand at residential building 28. HEMS 26 may be programmable with user preferences of energy conservation, comfort levels, energy needs, work schedules, travel schedules, and other factors to optimize the usage of the energy sources for loads within residential building 28.

HEMS 26, in an exemplary embodiment, may be configured to provide energy from residential building 28 and/or vehicle 36 back to electric power grid 40 based on various demand response signals 20. For example, if demand response signals 20 indicate a high demand or high real time pricing (RTP) of energy, then HEMS 26 may provide energy from batteries 38 and 46, energy from solar panels 50, and energy from wind turbines 54 back to electric power grid 40.

For example, HEMS 26 may be configured to enable buying and selling of energy between power utility 24, residential building 28, commercial building 32, and others. HEMS 26 may enable a user to select a buying point and a selling point for electrical energy, such that HEMS 26 may intelligently use available energy sources to minimize costs and reliance on electric power grid 40 at residential building 28. For example, HEMS 26 may intelligently charge and store energy in batteries 38 and 46 when the real time pricing (RTP) of energy falls to the selected buying point, whereas HEMS 26 may intelligently discharge an output power from batteries 38 and 46 into electric power grid 40 when the real time pricing (RTP) of energy rises to the selected selling point. HEMS 26 also may intelligently sell energy from solar panels 50 and wind turbines 54 back to electric power grid 40 when the real time pricing (RTP) of energy rises to the selected selling point.

In an exemplary embodiment, HEMS 26 may include load priorities for various appliances throughout residential building. HEMS 26 may include preset and user selectable load priorities in the event of high demand, high real time pricing (RTP) of energy, power outages, and user schedules. For example, the load priority may include a high priority for refrigerators, freezers, security systems, and other important equipment. In the event of high demand, high pricing, or power outages, HEMS 26 may use energy from batteries 38 and 46, solar panels 50, and wind turbines 54 to power the various equipment in the preset or user defined order of priority.

Referring generally to FIGS. 1A and 1C, an exemplary embodiment of BMS 30 may be configured to perform many similar functions as HEMS 26. For example, BMS 30 may be configured to control various energy sources and loads throughout commercial building 32. Energy sources may include electric power grid 40, batteries 38 in vehicles 36, stationary batteries 48 in commercial building 32, and solar panels 52 on commercial building 32. In an exemplary embodiment, BMS 30 exchanges electricity 56 and control signal 58 with charging stations 42 and vehicles 36 disposed in parking lot 44. For example, parking lot 44 may include tens, hundreds, and thousands of charging stations 42 and plugged-in vehicles 36 with batteries 38. In certain embodiments, each charging station 42 may include a stationary battery 47 configured to rapidly charge vehicle battery 38. Specifically, charging station 42 directly transfers electrical energy from stationary battery 47 to vehicle battery 38 (i.e., a battery to battery transfer), rather than transferring electrical energy from power grid 40 to vehicle battery 38 (i.e., grid to battery transfer). The battery to battery transfer substantially reduces the charge duration as compared with the grid to battery transfer. For example, a grid 40 to vehicle battery 38 transfer may take approximately 6 to 8 hours, whereas a stationary battery 47 to vehicle battery 38 transfer may take approximately 15 to 30 minutes.

BMS 30 may be configured to charge and discharge vehicle batteries 38, stationary batteries 47, and stationary batteries 48 depending on demand response signals 20, building energy demand, and other factors. In an exemplary embodiment, BMS 30 may control charging stations 42, vehicles 36, vehicle batteries 38, and stationary batteries 47 and 48 to discharge and provide electricity back to commercial building 32 and/or electric power grid 40 during periods of high demand on power grid 40, high demand in commercial building 32, high real time pricing (RTP) of energy, power outages, or energy spikes in commercial building 32. For example, BMS 30 may normalize energy demand in commercial building 32 by acquiring energy from batteries 38 in vehicles 36 and/or stationary batteries 47 and 48. BMS 30 also may sell electrical energy from vehicles 36 in parking lot 44 to power utility 24 during periods of high demand on electric power grid 40 or high real time pricing (RTP) of energy. BMS 30 may control charging stations 42 to charge vehicle batteries 38 and stationary batteries 47 and 48 during periods of low demand on electric power grid 40, low real time pricing (RTP) of energy, low building demand at commercial building 32, or based on minimum charge levels (e.g., sufficient to provide adequate range for vehicles 36).

In exemplary embodiments, VCS 34 may include features similar to HEMS 26 and/or BMS 30. For example, VCS 34 may include vehicle controls, vehicle battery management controls, building controls, and other energy controls. The other energy controls may include power grid controls, solar panel controls, wind turbine controls, stationary battery controls, and demand response controls. VCS 34 may be capable of smart energy controls for integration into residential building 28 and/or commercial building 32 with or without HEMS 26 or BMS 30 present in such buildings.

FIG. 2A is a schematic of an exemplary embodiment of residential building 28 having HEMS 26, showing an electrical demand response during a period of peak demand; (e.g., midday) on electrical power grid 40. In the exemplary embodiment, HEMS 26 may use local energy sources rather than power grid 40 to run lighting, appliances, and equipment throughout residential building 28 during the period of peak demand. For example, HEMS 26 may use energy from vehicle and stationary batteries 38 and 46, solar panels 50, and wind turbines 54 to power at least some or all loads throughout residential building 28. Stationary batteries 46 may be disposed at one central location, or they may be distributed throughout residential building 28 at each load. For example, as discussed below, the stationary batteries 46 may be integrated directly into each load (e.g., kitchen appliances, laundry machines, AV equipment, and HVAC equipment), or they may be disposed in modular battery systems proximate to each load. HEMS 26 may rely first on solar panels 50 and wind turbines 54, second on batteries 38 and 46, and third on power grid 40 during the period of peak demand. HEMS 26 may distribute these power sources to residential loads in an order of load priority, a reduced energy consumption configuration, or based on user preferences. For example, HEMS 26 may use a load priority to discharge vehicle and stationary batteries 38 and 46 to power only more important or critical equipment, such as freezers, refrigerators, and security systems. Depending on local needs and real time pricing (RTP) of energy, HEMS 26 may transfer energy from batteries 38 and 46, solar panels 50, and wind turbines 54 back to electrical power grid 40 during the period of peak demand.

In the exemplary embodiment, HEMS 26 may control charging and discharging of batteries 38 and 46 alone or in combination with VCS 34 in vehicle 36 and/or UEMS 22 at power utility 24. For example, in an exemplary embodiment, VCS 34 may override all or some of the energy management features of HEMS 26, or vice versa. For example, a homeowner at residential building 28 may synchronize each personal vehicle 36 with HEMS 26, such that HEMS 26 may completely control VCS 34 and battery 38 of such personal vehicle 36. However, third party vehicles 36 may not submit to complete control by HEMS 26, but rather each third party vehicle 36 may have energy control features to override HEMS 26. In an exemplary embodiment, HEMS 26 and/or VCS 34 may control vehicle battery 38 to discharge 100 back in to power grid 40, which may be described as vehicle to grid (V2G), and stationary battery 46 to discharge 100 back in to power grid 40, which may be described as building/battery to grid (B2G). Thus, battery discharge 100 may include V2G and/or B2G. HEMS 26 and/or VCS 34 may control stationary battery 46 to discharge 101 into residential building 28, which may be described as battery to building (B2B), and vehicle battery 38 to discharge 102 into residential building 28, which may be described as vehicle to building (V2B). Thus, battery discharge 101 and 102 may power residential building 28 rather than power grid 40. For example, discharges 101 and/or 102 back into residential building 28 may be configured to power critical appliances, such as a refrigerator/freezer 104. However, discharges 101 and/or 102 back into residential building 28 also may power other devices and equipment, such as lighting 106, televisions 108, heating and air conditioning, and security systems.

HEMS 26, VCS 34, and UEMS 22 also may coordinate and share other information with one another. For example, VCS 34 and HEMS 26 may exchange a variety of vehicle information, such as service/maintenance information (e.g., oil changes), fuel levels, and battery charge levels. HEMS 26 may display this information inside residential building for convenience of the owner. HEMS 26 also may communicate via the Internet with auto manufacturers, dealers, parts stores, financial institutions, and other sites to exchange additional vehicle information, such as manufacturer recalls, loan payment information, and current parts/service sales. Similarly, VCS 34 and HEMS 26 may communicate other user-defined information, such as electronic calendars, appointments, reminders, traffic information, school class schedules, sports schedules, movie times, addresses, and phone numbers.

FIG. 2B is a block diagram of an exemplary embodiment of residential building 28 having both vehicle to building (V2B) 102 and battery to building (B2B) 101 electricity transfers. During periods of high demand and/or high real time pricing (RTP) of energy, stationary battery 46 may discharge (B2B) 101 into residential building 28 and vehicle battery 38 may discharge (V2B) 102 into residential building 28 to power various residential loads. During this period, HEMS 26 and VCS 34 may reduce or eliminate all reliance on power grid 40 until demand and/or pricing decreases to a relatively lower level. The electricity transfers 101 and 102 may be controlled by UEMS 22, HEMS 26, and/or VCS 34. For example, power utility 24 may or may not be involved in the controls that trigger the electricity transfers 101 and 102. In an exemplary embodiment, HEMS 26 or VCS 34 may trigger electricity transfers 101 and/or 102 completely independent of UEMS 22 and power utility 24. In certain embodiments, HEMS 26 and/or VCS 34 may trigger vehicle 36 to start its engine to provide power to vehicle battery 38, stationary battery 46, and/or residential building 28. For example, during periods of high demand and/or high pricing, HEMS 26 and/or VCS 34 may automatically start vehicle engine after an energy level of vehicle battery 38 and/or stationary battery 46 falls below a threshold, e.g., less than approximately 5, 10, 15, or 20 percent of total power. Simultaneously, HEMS 26 and/or VCS 34 may actuate a ventilation system, e.g., open garage door and/or window, and turn on fan.

FIG. 2C is a block diagram of an exemplary embodiment of residential building 28 having vehicle to building (V2B) 102 and battery to building (B2B) 101 electricity transfers, and a building to grid (B2G) electricity transfer 100. In an exemplary embodiment, vehicle battery 38 may discharge (V2G) 100 back in to power grid 40 and stationary battery 46 may discharge (B2G) 100 back in to power grid 40. The electricity transfers 100, 101, and 102 may be controlled by UEMS 22, HEMS 26, and/or VCS 34. For example, power utility 24 may or may not be involved in the controls that trigger the electricity transfers 100, 101, and 102. In an exemplary embodiment, HEMS 26 or VCS 34 may trigger electricity transfers 100, 101, and/or 102 completely independent of UEMS 22 and power utility 24.

FIG. 3A is a schematic of an exemplary embodiment of residential building 28 having HEMS 26, showing an electrical demand response during a period of off peak demand (e.g., midnight) on electrical power grid 40. In the exemplary embodiment, HEMS 26 may control battery chargers to recharge 120 vehicle and stationary batteries 38 and 46 with power grid electricity 122 or the local power source (e.g., wind turbines 54 or solar panels 50). For example, HEMS 26 may receive demand response signals 20 indicating a low energy demand on power grid 40 or a low real time pricing (RTP) of energy for low cost battery charging of vehicle and stationary batteries 38 and 46. During this period, HEMS 26 may rely on power grid electricity 122 to power refrigerators/freezers 104, lighting 106, televisions 108, heating and air conditioning, pool/spa equipment, pumps, heaters, and other appliances using energy 122 from power grid 40 and wind turbines 54 without reliance on stored energy in batteries 38 and 46. HEMS 26 may control energy usage at residential building 28 alone or in combination with control features of VCS 34 and UEMS 22. For example, HEMS 26 may override VCS 34, or vice versa, depending on vehicle ownership, user preferences, demand response signals 20, and other factors.

Figure 3B:
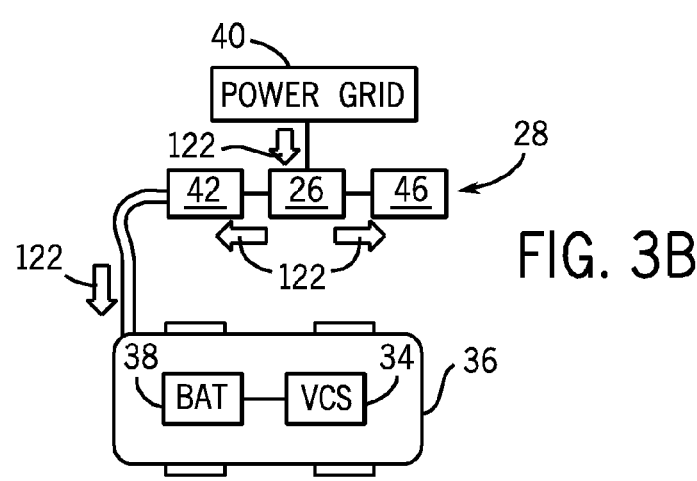
FIG. 3B is a block diagram of an exemplary embodiment of residential building having both power grid to vehicle (G2V) and power grid to battery (G2B) electricity transfers for charging vehicle and stationary batteries.

FIG. 3B is a block diagram of an exemplary embodiment of residential building 28 having both power grid to vehicle (G2V) and power grid to battery (G2B) electricity transfers 122 for charging vehicle and stationary batteries 38 and 46. During periods of low demand and/or low real time pricing (RTP) of energy, power grid 40 may provide electricity transfers 122 to both vehicle battery 38 and stationary battery 46 via HEMS 26, vehicle charging station 42, and VCS 34. During this period, HEMS 26 and VCS 34 may reduce or eliminate all reliance on battery power from batteries 38 and 46 until demand and/or pricing increases to a relatively higher level. The electricity transfers 122 may be controlled by UEMS 22, HEMS 26, and/or VCS 34. For example, power utility 24 may or may not be involved in the controls that trigger the electricity transfers 122. In an exemplary embodiment, HEMS 26 or VCS 34 may trigger electricity transfers 122 completely independent of UEMS 22 and power utility 24.

Figure 4A:
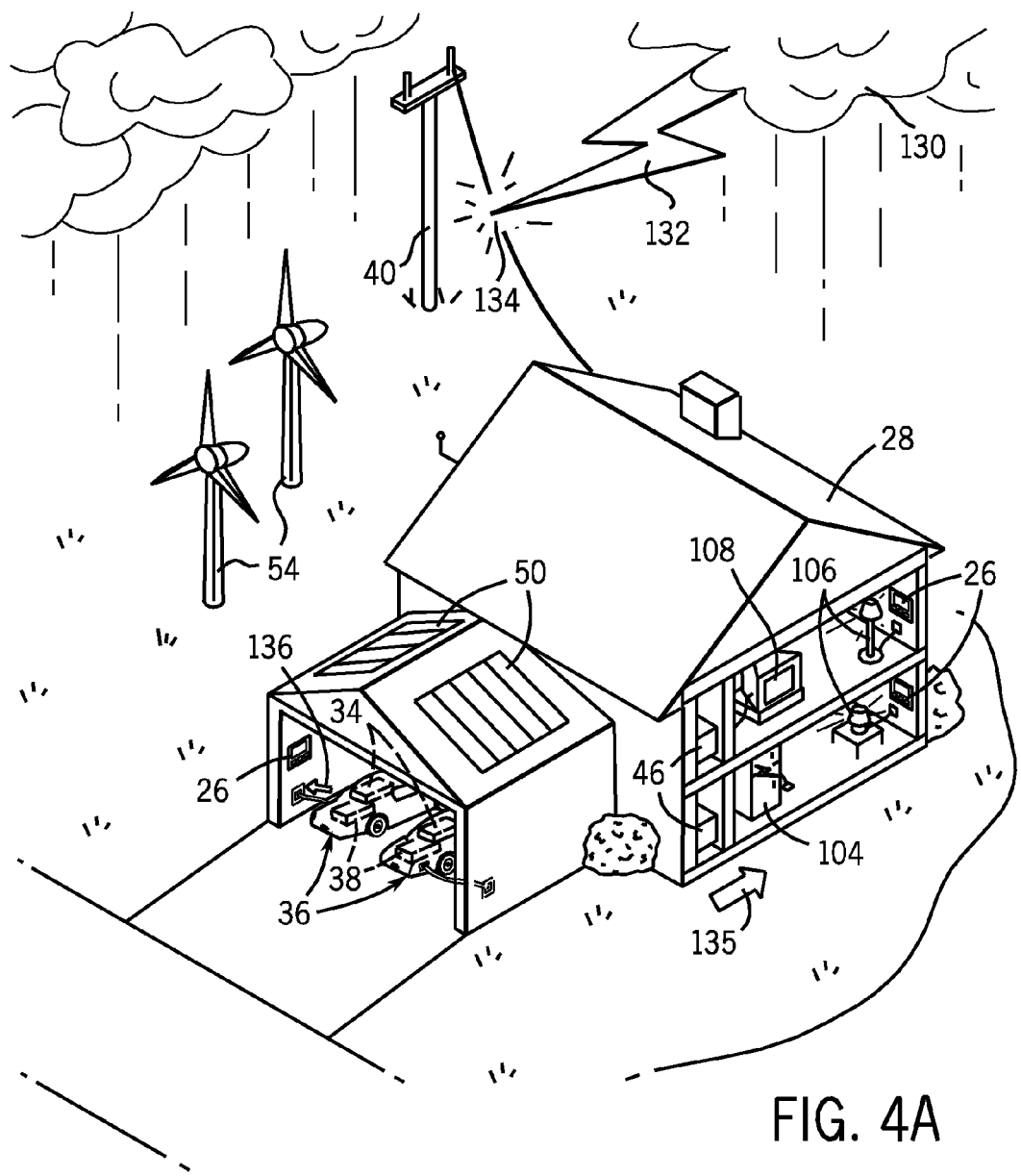
FIG. 4A is a schematic of an exemplary embodiment of a residential building having the home energy management system of FIG. 1, showing an electrical demand response during a period of power outage (e.g., storm or natural disaster) from a power grid.

FIG. 4A is a schematic of an exemplary embodiment of residential building 28 having HEMS 26, showing an electrical demand response during a period of power outage (e.g., storm or natural disaster) from electrical power grid 40. In the exemplary embodiment, a storm 130 produces a lighting strike 132, which causes an interruption 134 in power grid 40 leading to residential building 28. As a result of interruption 134, HEMS 26 may distribute local power in an order of priority starting with solar panels 50 and wind turbines 54 as a first priority, stationary batteries 46 as a second priority, and vehicle battery 38 as a third priority. If solar panels 50 and wind turbines 54 provide sufficient power to residential building 28, then HEMS 26 may defer use of batteries 38 and 46 until power levels drop below the demands of loads throughout residential building 28. However, HEMS 26 may automatically turn to batteries 38 and/or 46 at the time of the interruption 134 and/or to fill gaps/dips in energy from solar panels 50 and wind turbines 54. As needed, HEMS 26 may be configured to rely on vehicle and stationary batteries 38 and 46 for backup power to refrigerators/freezers 104, lighting 106, televisions 108, heating and air conditioning, and other appliances throughout residential building 28. In an exemplary embodiment, batteries 38 and 46 may discharge to provide power 135 and 136 back to an electrical system of residential building 28 to power at least important loads in residential building 28. For example, HEMS 26 may obtain power from vehicle and stationary batteries 38 and 46 to power refrigerator/freezer 104 and at least some lighting 106.

In an exemplary embodiment, HEMS 26 may substantially or completely control energy management throughout residential building 28 and vehicle 36. However, in an exemplary embodiment, VCS 34 of vehicle 36 may override at least some or all control features of HEMS 26. For example, HEMS 26 may control backup power to one set of devices throughout residential building 28, whereas VCS 34 may control backup power to a different set of devices throughout residential building 28. HEMS 26 and VCS 34 also may provide different backup periods and minimum charge levels for vehicle battery 38. For example, HEMS 26 may enable a complete discharge of vehicle battery 38, whereas VCS 34 may enable only a partial discharge of vehicle battery 38. The interaction between HEMS 26 and VCS 34 may depend on ownership of residential building and vehicle 36 among other factors.

Figure 4B:
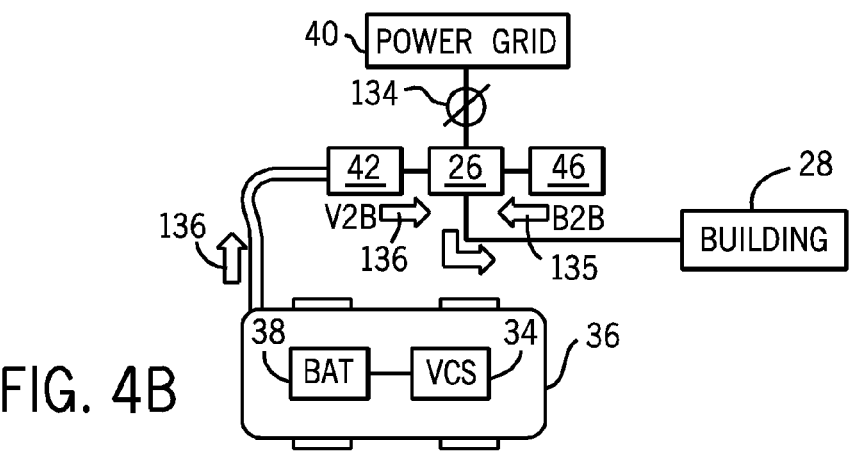
FIG. 4B is a block diagram of an exemplary embodiment of residential building having both vehicle to building (V2B) and battery to building (B2B) electricity transfers during a power interruption from a power grid.

FIG. 4B is a block diagram of an exemplary embodiment of residential building 28 having both vehicle to building (V2B) 102 and battery to building (B2B) 101 electricity transfers during power interruption 134 from power grid 40. During periods of interruption 134, stationary battery 46 may discharge (B2B) 101 into residential building 28 and vehicle battery 38 may discharge (V2B) 102 into residential building 28 to power various residential loads. During this period, HEMS 26 and VCS 34 may monitor for a return of electricity to power grid 40, while intelligently controlling the distribution of battery power among residential loads. The electricity transfers 101 and 102 may be controlled by UEMS 22, HEMS 26, and/or VCS 34. For example, power utility 24 may or may not be involved in the controls that trigger the electricity transfers 101 and 102. In an exemplary embodiment, UEMS 22 may communicate data regarding power interruption 134, e.g., expected outage duration or expected return of power. UEMS 22 may use a wired or wireless network to communicate this data directly to HEMS 26 and/or VCS 34 to enable intelligent usage of battery power based on such data. In an exemplary embodiment, HEMS 26 or VCS 34 may trigger electricity transfers 101 and/or 102 completely independent of UEMS 22 and power utility 24.

In certain embodiments, HEMS 26 and/or VCS 34 may trigger vehicle 36 to start its engine to provide power to residential building 28 during the period of power outage. For example, HEMS 26 and/or VCS 34 may automatically start vehicle engine after an energy level of vehicle battery 38 and/or stationary battery 46 falls below a threshold, e.g., less than approximately 5, 10, 15, or 20 percent of total power. Simultaneously, HEMS 26 and/or VCS 34 may actuate a ventilation system, e.g., open garage door and/or window, and turn on fan. Thus, vehicle 36 may function as a power generator either with or without an engine running in vehicle 36.

Figure 5:
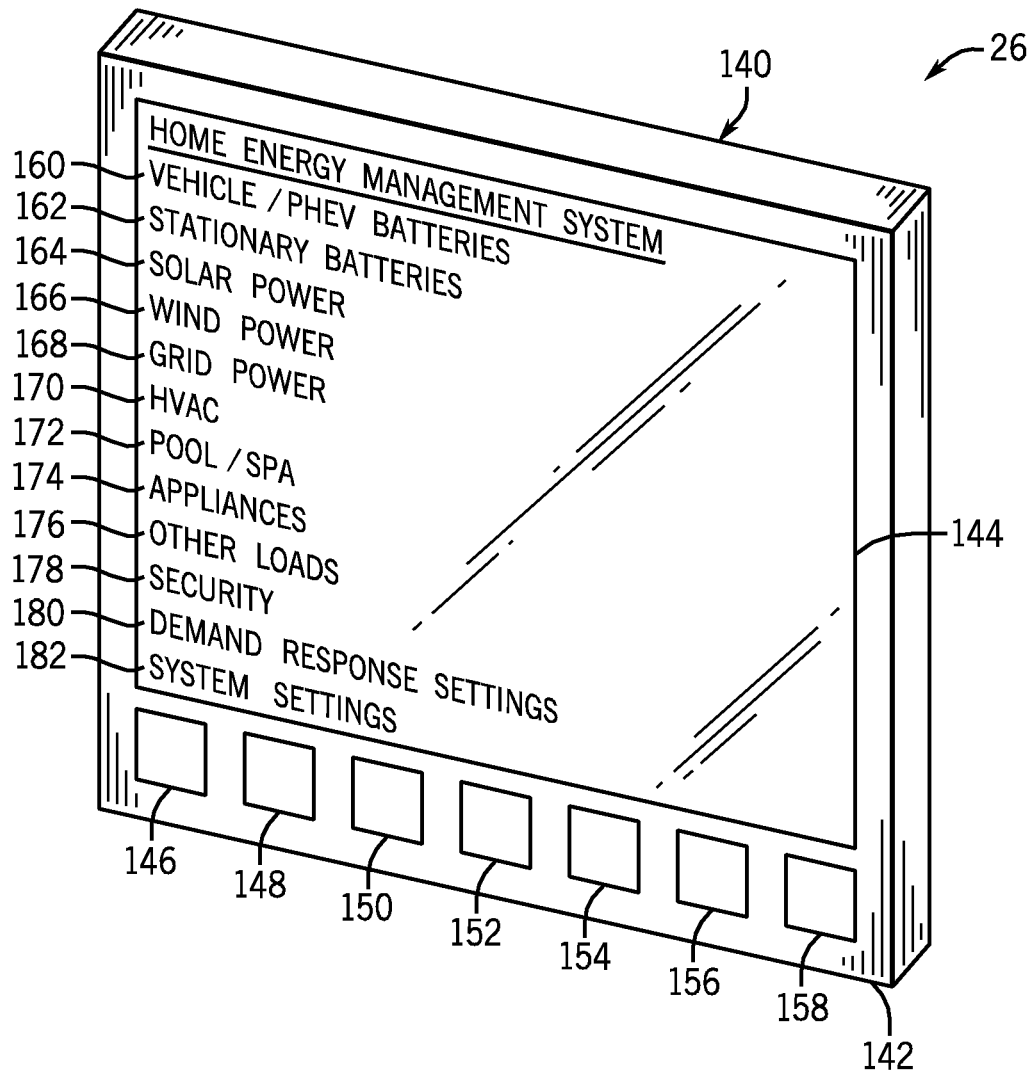
FIG. 5 is a schematic of an exemplary embodiment of a user interface for the home energy management system of FIGS. 1 through 4.

FIG. 5 is a schematic of an exemplary embodiment of a user interface 140 of HEMS 26. In an exemplary embodiment, user interface 140 may include a control panel 142 having a screen 144 and control buttons 146, 148, 150, 152, 154, 156, and 158. Screen 144 may include a liquid crystal display (LCD) or a touch screen display. Screen 144 may provide a menu of controllable features, such as vehicle/PHEV batteries 160, stationary batteries 162, solar power 164, wind power 166, grid power 168, HVAC 170, pool/spa 172, appliances 174, other loads 176, security 178, demand response settings 180, and system settings 182. In an exemplary embodiment, user interface 140 enables user control of both operational settings of building systems and energy settings of various energy sources. Control panel 142 may be a stand-alone panel, such as a wireless remote control, or an integrated wall-mount control panel. Control panel 142 may be configured for use solely in residential building 28, or control panel 142 may be portable and modular for use in vehicle 36 and commercial building 32. In exemplary embodiments, control panel 142 may include vehicle controls and commercial building controls.

Control selections 160 through 182 may enable user customized settings of equipment operational parameters and energy management. Referring first to control selections 160 through 168, energy management may include usage of available energy sources in response to grid power shortages, grid power real time pricing (RTP) of energy, user comfort levels, daily, monthly, or yearly electrical usage/cost, and other factors. For example, vehicle/PHEV battery selection 160 may enable control of charging and discharging of vehicle batteries 38 (FIG. 1B), assignment of loads to use energy from vehicle batteries, historical trends in charging and discharging of vehicle batteries, home settings for vehicle batteries, and away setting for vehicle batteries. Stationary batteries selection 162 may enable control of charging and discharging of stationary batteries 46 (FIG. 1B), assignment of loads to stationary batteries 46, and other control features similar to those of vehicle battery selection 160. Solar power selection 164 may enable user control of solar energy from solar panels 50 (FIG. 1A), assignment of loads to solar panels 50, viewing of historical energy generation and consumption of solar energy, and selling points for selling solar energy back to power grid 40. Wind power selection 166 may enable user control of wind energy from wind turbines 54 (FIG. 1A), assignment of loads to wind turbines 54, viewing of historical energy generation and usage of wind energy, and selling points for selling wind energy back to power grid 40. Grid power selection 168 may enable user control of energy usage from power grid 40 based on energy conservation preferences, comfort levels, real time pricing (RTP) of energy, critical loads, daily, monthly, and yearly usage/cost details, and other factors.

Control selections 170 through 178 relate to operational parameters for residential loads. HVAC selection 170 may enable user control of HVAC equipment based on comfort levels, real time pricing (RTP) of energy, availability of battery, solar, and wind power at residential building 28, and availability of grid power. Pool/spa selection 172, appliances selection 174, and other load selection 176 may enable user control of the various equipment throughout residential building 28 based on performance levels, energy conservation preferences, availability of grid power, availability of battery, solar, and wind power, and real time pricing (RTP) of energy. Security selection 178 may enable user control of a home security system, including door sensors, window sensors, and motion sensors.

Demand response settings 180 may enable user control of local energy usage in response to demand response signals 20 from power utility 24. For example, demand response settings 180 may include user comfort levels, buying and selling points for electricity, charging and discharging preferences for vehicle and stationary batteries 38 and 46, and other settings impacting the residential energy storage, vehicle energy storage, residential energy consumption, vehicle energy to power grid 40, and residential building 28 to power grid 40.

Figure 6:
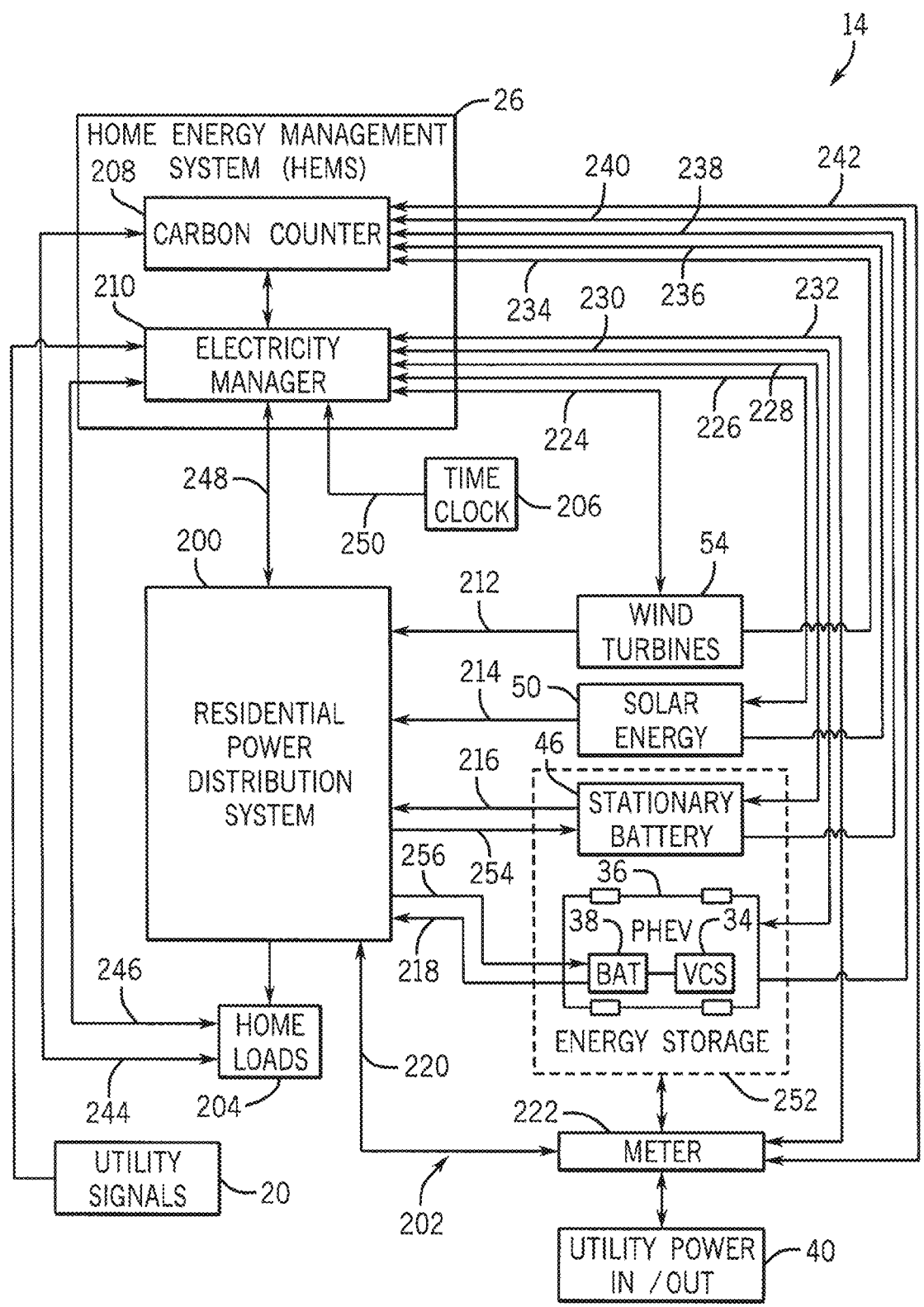
FIG. 6 is a block diagram of an exemplary embodiment of a residential electrical demand response system having the home energy management system of FIGS. 1 through 5.

FIG. 6 is a block diagram of an exemplary embodiment of a residential electrical demand response system 14 having HEMS 26 of FIGS. 1 through 5. In an exemplary embodiment, HEMS 26 may be coupled to a residential power distribution system 200, energy sources 202, home loads 204, and a real time clock 206. HEMS 26 may include a carbon counter 208 and an electricity manager 210 configured to optimize usage of energy sources 202 among home loads 204 and/or power grid 40. For example, carbon counter 208 and electricity manager 210 may be configured to measure, control, and generally communicate with residential power distribution system 200, energy sources 202, home loads 204, time clock 206, and utility signals 20.

Residential power distribution system 200 may include residential wiring, circuit breakers, control circuitry, and power distribution panel disposed in residential building 28. In an exemplary embodiment, residential power distribution system 200 may receive wind energy 212 from wind turbines 54, solar energy 214 from solar panels 50, stationary battery power 216 from stationary battery 46, vehicle battery power 218 from battery 38 in vehicle 36, and grid power 220 from meter 222 coupled to power grid 40.

In an exemplary embodiment, each of the energy sources 202 may be communicative with carbon counter 208 and electricity manager 210 to reduce reliance on power grid 240, improve energy conservation, reduce greenhouse gas emissions (e.g., carbon) associated with power generation, and reduce costs associated with powering home loads 204. For example, HEMS 26 may exchange control signals and measurement data 224, 226, 228, 230, and 232 between electricity manager 210 and wind turbines 54, solar panels 50, stationary battery 46, vehicle 36, and meter 222, respectively. HEMS 26 also may exchange signals and data 234, 236, 238, 240, and 242 between carbon counter 208 and wind turbines 54, solar panels 50, stationary battery 46, vehicle 36, and meter 222, respectively to determine the amount of green house gases being generated and/or deferred. Signals and data 224 through 242 (as well as information from the Carbon Counter 208) are configured to enable HEMS 26 to intelligently control distribution of energy sources 202 through residential power distribution system 200 to various home loads 204. In an exemplary embodiment, HEMS 26 is configured to exchange signals and data 244 between carbon counter 208 and various home loads 204, and also signals and data 246 between electricity manager 210 and various home loads 204.

HEMS 26, in an exemplary embodiment, may be configured to monitor and control 248 residential power distribution 200 based on signals and data 224 through 242 exchanged with energy sources 202, time data 250 received from time clock 206, data and signals 244 and 246 exchanged with home loads 204, and utility signals 20 exchanged with power utility 24. For example, in an exemplary embodiment, electricity manager 210 may compare available energy 212 through 220 relative to home loads 204, time data 250, and utility signals 220 to intelligently use wind energy 212, solar energy 214, and battery energy 216 and 218 as a tradeoff with grid power 220. Electricity manager 210 may prioritize energy usage and distribution to home loads 204 based on real time pricing (RTP) of energy, power grid demand, grid generation fuel mix (carbon generation), residential building demand, user comfort levels, power grid outages, and various user preferences.

For example, electricity manager 210 may control 248 residential power distribution system 200 to use available wind energy 212 and solar energy 214 to power various home loads 204 as a first priority. If wind energy 212 and solar energy 214 is insufficient to power home loads 204, then electricity manager 210 may control 248 residential power distribution system 200 to either cut low priority home loads 204 or draw additional power from either energy storage 252 or electric power grid 40. For example, if electricity manager 210 receives signals 20 indicating a high power grid demand, high carbon content of generation sources, or high real time pricing (RTP) of energy, then electricity manager 210 may control 248 residential power distribution system 200 to use stationary battery power 216 to power various home loads 204 as a secondary priority. If stationary battery power 216 is insufficient to meet the demands of home loads 204, then electricity manager 210 may control 248 residential power distribution system 200 to use vehicle battery power 218 as a supplement to power home loads 204 as a third priority. If home loads 204 still demand additional power, then electricity manager 210 may control 248 residential power distribution system 200 to use grid power 220 to power home loads 204 as a forth priority. Electricity manager 210 also may cut at least some or all of the power to home loads 204 depending on utility signals 20, time data 250, and available energy sources 202. For example, electricity manager 210 may cut low priority home loads 204 during periods of high power grid demand, high real time pricing (RTP) of energy, power outages, or natural disasters.

If electricity manager 210 receives utility signals 20 indicating a low power grid demand or low real time pricing (RTP) of energy, then electricity manager 210 may control 248 residential power distribution system 200 to charge 254 stationary battery 46 and charge 256 vehicle battery 38 in vehicle 36. In this exemplary embodiment, electricity manager 210 may control 248 residential power distribution system 200 to use wind and solar energy 212 and 214 as a first priority, grid power 220 as a second priority, stationary battery power 216 as a third priority, and a vehicle battery power 218 and a fourth priority. In view of utility signals 20, electricity manager 210 may reduce reliance and costs associated with power grid 40 by storing low cost grid power 220 into energy storage 252 and using energy storage 252 during periods of high cost grid power 220. Energy storage 252 essentially shifts demand on power grid 40 from a period of high demand and high real time pricing (RTP) of energy to a later period of low demand and low real time pricing (RTP) of energy. For example, electricity manager 210 may control 248 residential power distribution system 200 to charge energy storage 252 at night, and discharge energy storage 252 to power home loads 204 during the day.

Electricity manager 210, in an exemplary embodiment, may be configured to even a building load and reduce peak demand. If energy demands of home loads 204 vary over a period of time (e.g., sudden spikes and dips), then electricity manager 210 may control 248 residential power distribution systems 200 to periodically charge and discharge batteries 46 and 38 to generally eliminate the spikes and dips on power grid 40. For example, electricity manager 210 may control 248 residential power distribution systems 200 to draw battery power 216 and 218 to reduce spikes to help normalize usage of grid power 220. Electricity manager 210 may control 248 residential power distribution systems 200 to charge 254 and 256 batteries 46 and 38 to reduce dips to help normalize usage of grid power 220.

In an exemplary embodiment, electricity manager 210 may be configured to control 248 residential power distribution system 200 to buy and sell energy sources 202 based on utility signals 20, e.g., demand levels and real time pricing (RTP) of energy. For example, if utility signals 20 indicate a high real time pricing (RTP) of energy, then electricity manager 210 may control 248 residential power distribution system 200 to sell wind energy 212, solar energy 214, stationary battery power 216, and/or vehicle battery power 218 back to power grid 40 through meter 222. If utility signals 20 indicate a low real time pricing (RTP) of energy, then electricity manager 210 may control 248 residential power distribution system 200 to use at least some grid power 220 to recharge 254 and 256 batteries 46 and 38.

In an exemplary embodiment, carbon counter 208 may be configured to monitor usage of energy sources 202 to evaluate the usage of clean power generation systems (e.g., wind, solar, water, etc.) versus relatively unclean power generation systems (e.g., coal). For example, carbon counter 208 may be configured to monitor clean power associated with wind turbines 54 and solar panels 50. Carbon counter 208 also may be configured to monitor usage of grid power 220 from unclean power utilities 24, such as coal plants or other carbon producing power generation facilities. For example, carbon counter 208 may measure kilowatts of wind and solar energy 212 and 214 versus coal generated grid power 220. In an exemplary embodiment, carbon counter 208 may record kilowatts of available wind and solar energy 212 and 214 to provide historical data, which may be used to facilitate selling of the wind/solar power back to power utility 24. The HEMS 26 may also be configured to try and use as much clean energy as possible independent of price.

Figure 7:
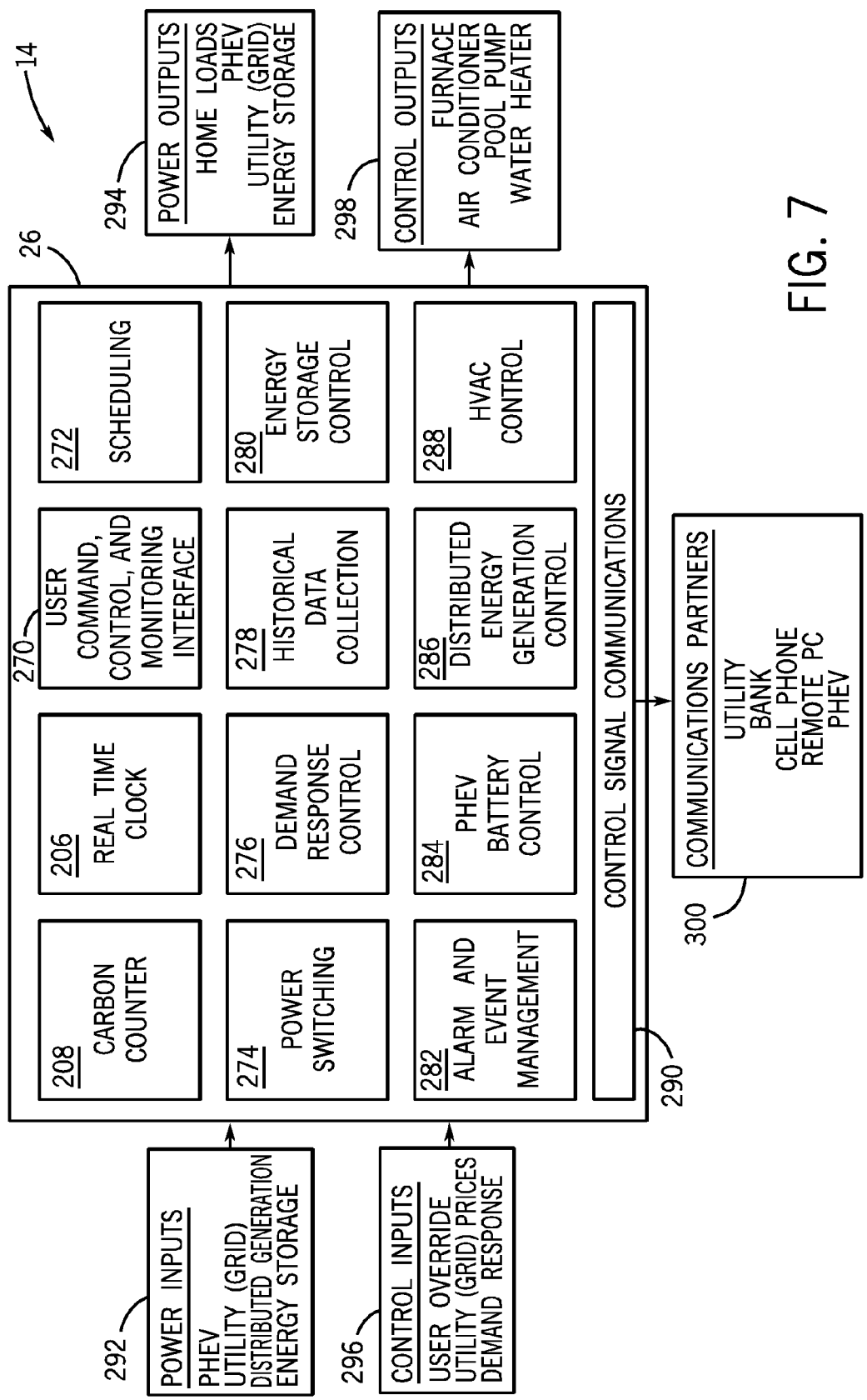
FIG. 7 is a block diagram of an exemplary embodiment of the home energy management system of FIGS. 1 through 6.

FIG. 7 is a block diagram of an exemplary embodiment of HEMS 26 of FIGS. 1 through 6. In an exemplary embodiment, HEMS 26 includes carbon counter 208, real time clock 206, user command, control, and monitoring interface 270, scheduling 272, power switching 274, demand response control 276, historical data collection 278, energy storage control 280, alarm and event management 282, PHEV battery control 284, distributed energy generation control 286, HVAC control 288, and control signal communications 290. HEMS 26 may receive power inputs 292 and provide power output 294, receive control inputs 296 and provide control outputs 298, and communicate with various communications partners 300.

Power inputs 292 may include vehicles 36 (e.g., PHEVs), power grid 40, distributed generation (e.g., solar panels 50 and wind turbines 54), and batteries 46 and 38. Power outputs 294 may include home loads, vehicles 36, power grid 40, and batteries 46 and 38. For example, home loads may include refrigerators, freezers, furnaces, air conditioners, pool/spa pumps, pool/spa heaters, water heaters, lighting, security, and various appliances. Control inputs 296 may include user overrides, real time pricing (RTP) from power grid 40, carbon content of generation from power grid 40, and demand response signals 20. Control outputs 298 may include refrigerators, freezers, furnaces, air conditioners, pool/spa pumps, pool/spa heaters, water heaters, lighting, security, and various appliances.

User command, control, and monitoring interface 270 may include a control panel, such as control panel 142 shown in FIG. 5, to enable user management of residential power distribution system 200, energy sources 202, and home loads 204 via inputs and outputs 292 through 298. Interface 270 may enable user management of controls 272 through 290. For example, interface 270 may enable user management of scheduling 272 to charge stationary and vehicle batteries 46 and 38 during periods of low demand while discharging batteries 46 and 38 into residential power distribution system 200 during periods of high demand. Interface 270 may enable user management of power switching 274 to selectively use one or more of energy sources 202 alone or in combination with one another for various home loads 204. For example, power switching 274 may enable automatic switching from grid power 220 to batteries 46 and 38 upon receiving control inputs 296 indicative of a high power grid demand, a high real time pricing (RTP) of energy, a power outage, or another event.

Interface 270 may enable user management of demand response control 276 to control energy sources 202 based on control inputs 296. For example, demand response control 276 may enable remote control by power utility 24, VCS 34 in vehicle 36, BMS 30 in commercial building 32, or another source. Demand response control 276 may enable user selection of various actions based on demand response control inputs 296. For example, demand response control 276 may enable a user to select an energy conservation mode or backup battery power mode in response to control inputs 296 indicative of high power grid demand or high real time pricing (RTP) of energy. In an exemplary embodiment, demand response control 276 may enable user management of buying and selling of electricity between residential building 28 and power utility 24. For example, demand response control 276 may enable user selection of selling prices for electricity, such that a user may sell wind energy 212, solar energy 214, and/or battery energy 216 and 218 to power utility 24 during periods of high demand or high real time pricing (RTP) of energy. Demand response control 276 also may enable user selection of a buying price for using grid power 220 to charge 254 and 256 batteries 46 and 38.

Historical data collection 278 may record energy usage and local power generation, such as power demands of home loads 204 and generated wind energy 212 and solar energy 214. Energy storage control 280 may be configured to control charging and discharging of stationary and vehicle batteries 46 and 38 in conjunction with scheduling 272, power switching 274, and demand response control 276. Alarm and event management 282 may be configured to alert a user of off-normal conditions (e.g. too hot or too cold in house), equipment failures, power outages, changes in energy demand, changes in real time pricing (RTP) of energy, levels of battery power in batteries 46 and 38, or various demand response signals from power utility 24.

PHEV battery control 284 may be configured to enable user management of charging and discharging of vehicle battery 38 depending on real time clock 206, scheduling 272, and user preferences. For example, PHEV battery control 284 may enable user customization based on work schedules, driving schedules, at home schedules, and other factors. Control 284 also may enable user selection of buying and selling prices for charging and discharging batteries 46 and 38 with power grid 40. Distributed energy generation control 286 may be configured to enable user management of wind turbines 54, solar panels 50, and other distributed energy sources. For example, control 286 may enable user selection of home loads 204 to use wind energy 212 and solar energy 214. Control 286 also may enable user selection of selling prices for selling wind energy 212 and solar energy 214 back to power utility 24. To modulate the amount of energy generated, distributed energy control 286 may control the angle of the solar panels 50 in reference to the sun or the pitch and speed of the wind turbine blades 54.

HVAC control 288 may enable user management of heating and cooling settings based on real time clock 206, scheduling 272, historical data collection 278, and control inputs 296. For example, HVAC control 288 may enable user selection of a comfort level and an energy conservation mode depending on real time pricing (RTP) of energy, occupancy of the residential building 28, and available energy sources 202.

In an exemplary embodiment, HEMS 26 may communicate with various communications partners, such as power utility 24, a bank, a cell phone, a remote computer, a PHEV, or another vehicle. For example, a user may remotely access and control HEMS 26 via a personal cell phone, computer, or vehicle. The bank may communicate with HEMS 26 for electricity billing based on automatic meter readings.

Figure 8:
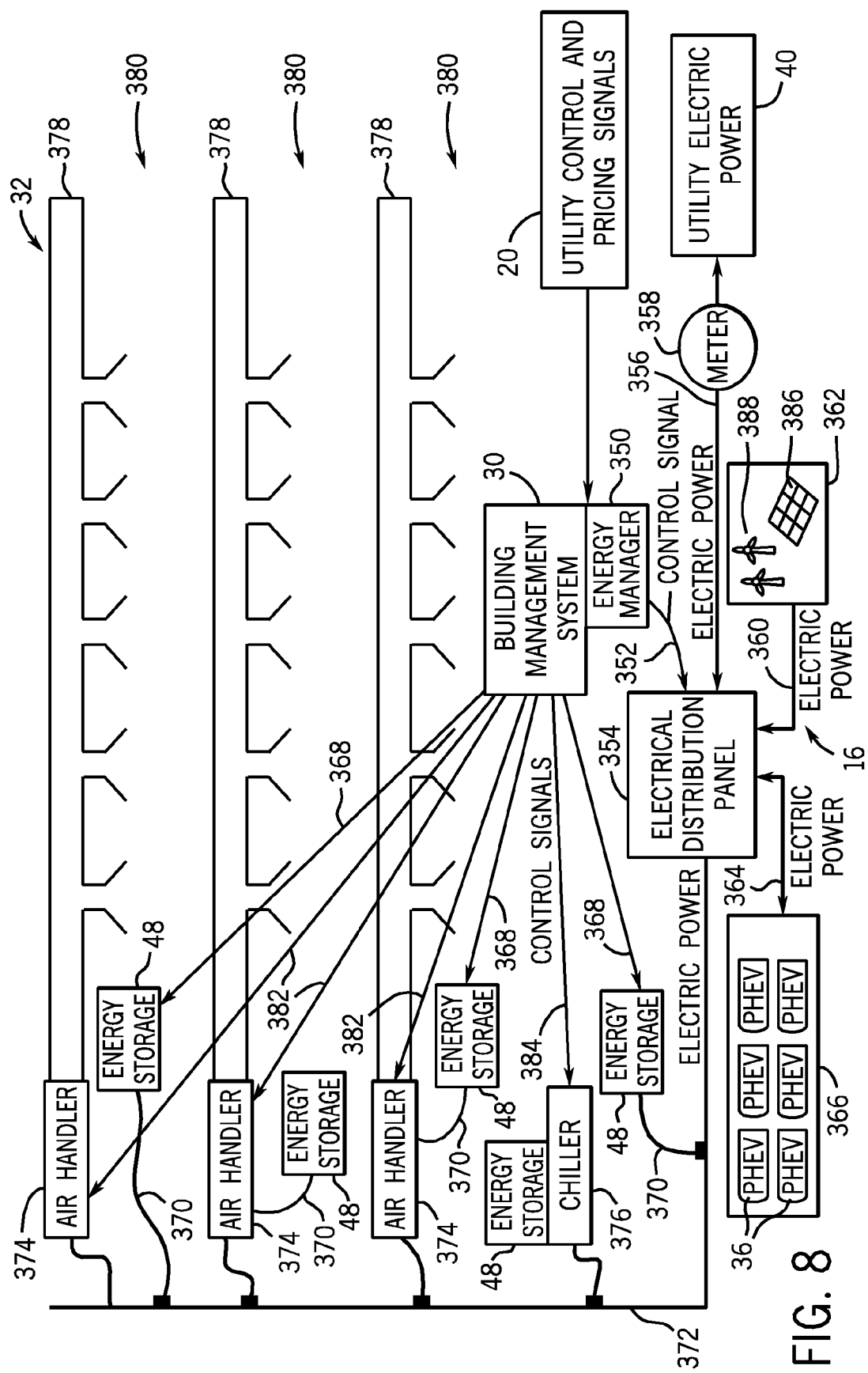
FIG. 8 is a block diagram of an exemplary embodiment of a commercial electrical demand response system having the building management system of FIG. 1.

FIG. 8 is a block diagram of an exemplary embodiment of commercial demand response system 16 having BMS 30 of FIG. 1. In an exemplary embodiment, BMS 30 includes or communicates with an energy manager 350, which is configured to intelligently manage various energy sources throughout commercial building 32. For example, energy manager 350 may control 352 an electrical distribution panel 354 to distribute electric power 356 from a meter 358, electric power 360 from distributed energy sources 362, and electric power 364 from a fleet 366 of vehicles 36. BMS 30 also may use energy manager 350 to control 368 energy storage 48 to intelligently charge and discharge 370 into an electrical distribution system 372 within commercial building 32. For example, energy storage 48, such as stationary battery packs, may be distributed throughout commercial building 32 at various floors, rooms, and specific equipment. In an exemplary embodiment, energy storage 48 may be positioned at least close to or directly connected to various equipment, such as air handlers 374, chillers 376, security systems, computer systems, refrigerators/freezers, and equipment. In certain embodiments, energy storage 48 may be integrated directly into equipment, or may be disposed in modular energy storage systems (e.g., energy storage racks) proximate equipment. For example, energy storage 48 may be provided for each air handler 374 coupled to a HVAC duct 378 on a respective floor 380 in commercial building 32. Energy storage 48 may be dedicated to specific equipment, such as air handlers 374 and chillers 376, or multiple commercial loads may receive power from energy storage 48. Energy storage 48 connected to air handlers 374, chillers 376, and various HVAC equipment may include an electrical energy storage system (e.g., battery packs) or a thermal storage system. For example, a thermal storage system may reduce electrical energy consumption of the equipment by cooling air with ice instead of electrical-mechanical cooling.

In an exemplary embodiment, BMS 30 along with energy manager 350 are configured to cooperatively manage both building systems and energy usage throughout commercial building 32. For example, BMS 30 may be configured to control 382 operation of air handlers 374, control 384 operation of chillers 376, control 368 charging and discharging 370 of energy storage 48, usage of electric power 356 from meter 358, usage of electric power 360 from distributed energy sources 362, usage of electric power 364 from fleet 366 of vehicles 36, and various other building systems and energy sources.

For example, BMS 30 and energy manager 350 may receive utility control and pricing signals 20 to trigger changes in the energy management throughout commercial building 32. In an exemplary embodiment, signals 20 may include a real time pricing (RTP) of energy signal, indicating a high or low price of electric power 356 received through meter 358 from electric power grid 40. In response to signals 20, BMS 30 and energy manager 350 may increase or decrease usage of electric power 356 from power grid 40 relative to electric power 360, 364, and 370 from distributed energy sources 362, fleet 366, and energy storage 48. For example, if signals 20 indicate a high real time pricing (RTP) of energy from power grid 40, then energy manager 350 may control energy distribution to use electric power 360 from distributed energy sources 362 as a first priority, electric power 370 from energy storage 48 as a second priority, electric power 364 from fleet 366 as a third priority, and electric power 356 from power grid 40 as a fourth priority. Distributed energy sources 362 may include solar panels 386 and wind turbines 388, which may provide a variable amount of electric power 360 depending on levels of sunlight and wind. If energy manager 350 determines that distributed energy sources 362 provide insufficient electric power 360 for commercial building 32, then energy manager 350 may turn to energy storage 48 and fleet 366 before relying on electric power 356 from power grid 40. If signals 20 are indicative of a low real time pricing (RTP) of energy from power grid 40, then energy manager 350 may use electric power 356 from power grid 40 rather than electric power 370 from energy storage 48 and electric power 364 from fleet 366. For example, in the event of a low real time pricing (RTP) of energy, energy manager 350 may use electric power 360 from distributed energy sources 362 as a first priority and electric power 356 from power grid 30 as a second priority. Energy manager 350 also may charge energy storage 48 and vehicles 36 in fleet 366 during periods of low demand and low real time pricing (RTP) of energy from power grid 40.

In an exemplary embodiment, BMS 30 and energy manager 350 may rely on energy storage 48 and fleet 356 to even a building load and reduce peak demand by commercial building 32 on power grid 40. For example, if equipment throughout commercial building 32 creates spikes in power demand, then energy storage 48 and vehicles 366 may discharge into electrical distribution system 372 to meet the spikes in demand. As a result, electrical demand on power grid 40 is generally constant due to the discharge of battery power into electrical distribution system 372. In an exemplary embodiment, BMS 30 and energy manager 350 may be configured to discharge battery power from energy storage 48 and fleet 366 into electrical distribution system 372 during periods of peak demand, e.g., midday when demand on power utility 24 is the greatest. During periods of low demand or sudden drops in electrical demand by commercial building 32, BMS 30 and energy manager 350 may be configured to charge batteries in energy storage 48 and fleet 366. As a result, the charging of batteries may even the electrical load by commercial building 32 on power grid 40.

Figure 9:
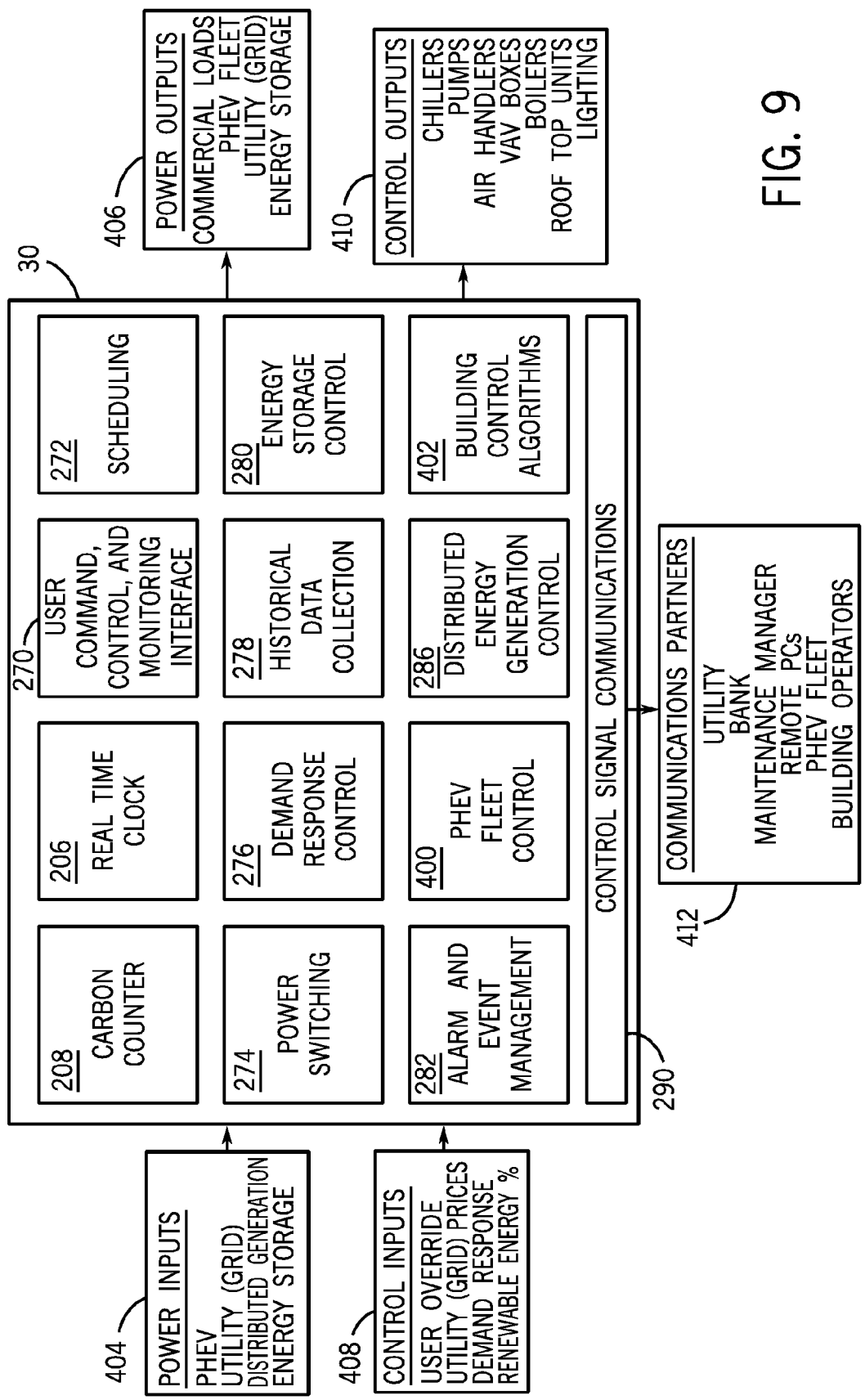
FIG. 9 is a block diagram of an exemplary embodiment of the building management system of FIGS. 1 and 8.

FIG. 9 is a block diagram of an exemplary embodiment of BMS 30 of FIGS. 1 and 8. In an exemplary embodiment, BMS 30 may have a variety of features similar to HEMS 26 as shown in FIG. 7. For example, BMS 30 may include carbon counter 208, real time clock 206, user command, control, and monitoring interface 270, scheduling 272, power switching 274, demand response control 276, historical data collection 278, energy storage control 280, alarm and event management 282, distributed energy generation control 286, and control signal communications 290. Rather than PHEV battery control 284 and HVAC control 288 of HEMS 26, BMS 30 may include PHEV fleet control 400 and building control algorithms 402.

BMS 30 may receive power inputs 404 and provide power outputs 406, receive control inputs 408 and provide control outputs 410, and communicate with various communication partners 412. In an exemplary embodiment, power inputs 404 may include a PHEV fleet, a power utility grid, distributed power generation, and energy storage. Power outputs 406 may include commercial loads, PHEV fleet, utility power grid, and energy storage. Control inputs 408 may include a user override, utility power grid prices, demand response signals, and renewable energy percentages. Control outputs 410 may include chillers, pumps, air handlers, VAV boxes, boilers, rooftop units, and lighting. Communication partners 412 may include a power utility, a bank, a maintenance manager, remote computers, PHEV fleet, and building operators.

In an exemplary embodiment, interface 270 may enable user management of PHEV fleet control 400 along with scheduling 272, power switching 274, demand response control 276, and other aspects of BMS 30. For example, PHEV fleet control 400 may enable user management of vehicle battery charging and discharging relative to commercial building 32. For example, if control inputs 408 indicate a high real time pricing (RTP) of energy from power grid 40, then the PHEV fleet control 400 may enable discharging of vehicle batteries 38 into electrical distribution system 372 of commercial building 32. If control inputs 408 indicate a low real time pricing (RTP) of energy from power grid 40, then PHEV fleet control 400 may enable battery charging of vehicle batteries 38 within the fleet.

Building control algorithms 402 may include operational controls of chillers, pumps, air handlers, VAV boxes, boilers, rooftop units, and lighting throughout commercial building 32. Building control algorithms 402 may be configured to adjust control outputs 410 based on available power inputs 404 and control signals 408. For example, building control algorithms 402 may shut down, turn on, or vary operation of building equipment based on available power inputs 404, projected air pollution, and real time pricing (RTP) of energy in control inputs 408. BMS 30 may be remotely controlled through one or more communication partners 412 via wireless or wired communications. For example, remote computers may communicate through the internet to enable user adjustment of building controls and energy usage via BMS 30.

With reference to FIGS. 1 through 7, the energy demand response system enables the energy storage and generation capabilities of vehicles (e.g., PHEVs) to be used to provide emergency back-up power for residential buildings or supply power back to the electric grid when needed. A PHEV may supply back up power for a residence for hours on battery storage alone or for days with combined battery storage and generation from the internal combustion engine. In a residential application, the garage may become the integration point for the demand response functionality. The PHEV may be charged by connection to an Energy Manager Unit (EM), which controls the power functions between the PHEV, the residence or other building, and the power grid. The EM may include a real-time clock to automate battery charging during off-peak hours. Two-way communication between the EM and the Vehicle Power Management System (VPMS) or Vehicle Control System (VCS) allows the current vehicle charge capacity to be used in making energy charging and discharging decisions.

In one mode of demand response, a utility provider, independent system operator (ISO) or Curtailment Service Provider (CSP) may provide a curtailment signal to the EM through Internet, wired broadband, wireless communications, or any other mode of communication. The EM then checks the storage capacity of the PHEV and, if sufficient, starts discharge of the battery until the storage capacity reaches a pre-determined minimum level (e.g., 40%) or the curtailment request is withdrawn. The EM directs the withdrawn electric power to the power grid. In an alternative mode, the utility provider, ISO or CSP sends electricity pricing information to the EM and then the EM decides if it is attractive to use the stored PHEV battery energy for supplying electrical power to the residence based on storage capacity of battery, time of day and economic incentives. The pricing information may be provided by the utility, ISO or CSP for one hour intervals and one day in advance. If stored energy is used, the PHEV energy is then either distributed to the home directly using a transfer switch or may be put back on the power grid. The former may allow a number of additional demand response options such as temporarily turning off optional or high requirement electrical loads such as air conditioning units, pool/spa pumps, etc. The latter may involve additional safety-related isolation components and net metering to "credit" the homeowner for the generated electricity.

Two-way communication capability with the EM may give utility provider, ISO or CSP direct grid regulation capability, verification of curtailment and real-time monitoring of storage capacity across the electrical grid, including PHEVs. However, a fully functional solution may be developed without two-way communication by providing pricing and/or curtailment signals to the EM and letting the EM take autonomous action driven by utility and/or ISO incentives.

With reference to FIGS. 1, 8, and 9, a commercial building may have a high quantity of vehicles in a parking structure or lot, such that PHEVs may be charged at designated parking spots. In a commercial situation, the electrical infrastructure and the EM may be designed to handle the larger number of PHEVs and the larger power system for the building. Unlike the residential situation in which the PHEVs may charge overnight, in the commercial application of the energy demand system, the PHEVs may charge in the early hours of the day and be used to supply energy to the building's power system at critical times in the afternoon when the demand reduction is most needed since commercial off-peak electricity rates are often lower than residential rates. During periods of high electrical demand, commercial building owners would find it cost effective to "top off" their employee's PHEVs in the morning in order to use a portion of the energy in the afternoon to reduce the building's peak demand. Commercial buildings may receive financial incentives from utilities for curtailing loads and bringing distributed generation online and have experienced staff and sophisticated systems for managing energy.

The current system may be integrated into such systems such as a system employing hard wired or radio frequency devices described in more detail below in order to provide a unified building management system. In exemplary embodiments, buildings 28 and 32 may include RF-enabled devices throughout any number of floors, rooms, spaces, zones, and/or other building structures. RF-enabled devices may exist inside or outside the building, on walls or on desks, be user interactive or not, and may be any type of building management device. For example, RF-enabled devices may include a security device, a light switch, a fan actuator, a temperature sensor, a thermostat, a smoke detector, etc. PHEVs, battery management systems, vehicle power management systems, and Energy Managers may include RF-enabled devices. System 10 may include a Human Machine Interface that operates as a communication device such as an RF-enabled device with the Energy Manager. RF-enabled devices may be configured to conduct building management functions (e.g., sense temperature, sense humidity, control a building management device, etc.). RF-enabled devices may also serve any number of network functions (e.g., RF measuring functions, network routing functions, etc.).

In an exemplary embodiment, a building management system ("BMS") may include one or more network automation engines ("NAE") connected to a proprietary or standard communications network such as an IP network (e.g., Ethernet, WiFi, ZigBee, Bluetooth, etc.). NAE may support various field-level communications protocols and/or technology, including various Internet Protocols (IP), BACnet over IP, BACnet Master-Slave/Token-Passing (MS/TP), N2 Bus, N2 over Ethernet, Wireless N2, LonWorks, ZigBee®, and any number of other standard or proprietary field-level building management protocols and/or technologies. NAE may include varying levels of supervisory features and building management. The user interface of NAE may be accessed via a web browser capable of communicably connecting to and accessing NAE. For example, multiple web browser terminals may variously connect to NAE or other devices of BMS. For example, a web browser may access BMS and connected NAEs via a WAN, local IP network, or via a connected wireless access point. A terminal may also access BMS and connected NAEs and provide information to another source, such as a printer.

NAE may have any number of BMS devices variously connected to it. These devices may include, among other devices not mentioned here, devices such as: field-level control modules, Variable Air Volume Modular Assemblies (VMAs), integrator units, variable air volume devices, extended digital controllers, unitary devices, air handling unit controllers, boilers, fan coil units, heat pump units, unit ventilators, Variable Air Volume (VAV) units, expansion modules, blowers, temperature sensors, flow transducers, sensors, motion detectors, actuators, dampers, air handling units, heaters, air conditioning units, etc. These devices may be controlled and/or monitored by NAE. Data generated by or available on the various devices that are directly or indirectly connected to NAE may be passed, sent, requested, or read by NAE. This data may be stored by NAE, processed by NAE, transformed by NAE, and/or sent to various other systems or terminals of the building management system. The various devices of the BMS may be connected to NAE with a wired connection or with a wireless connection. Depending on the configuration of the system 10, components such as the Energy Manager may function as an NAE or may also function as a BMS device connected to an NAE.

In an exemplary embodiment, system 10 may include a mesh network. Mesh network may include a building/parking area, a plurality of RF-enabled devices, a controller system, a network, and a workstation (e.g., a desktop computer, a personal digital assistant, a laptop, etc.). RF-enabled devices may be interconnected by RF connections. RF connections may be disabled (or otherwise unavailable) for various reasons. As a result, some RF-enabled devices may temporarily be disconnected from the mesh network, but are configured to automatically connect (or reconnect) to any other suitable device within range. Controller system may be connected to workstation via network. According to exemplary embodiments, RF-enabled devices may be arranged in another type of network topology.

Using a plurality of low-power and multi-function or reduced function wireless devices distributed around a building/parking area and configured in a mesh network in conjunction with the electrical demand response system 10, a redundant, agile, and cost-effective communications/energy system for building management systems may be provided to improve energy management.

Figure 10:
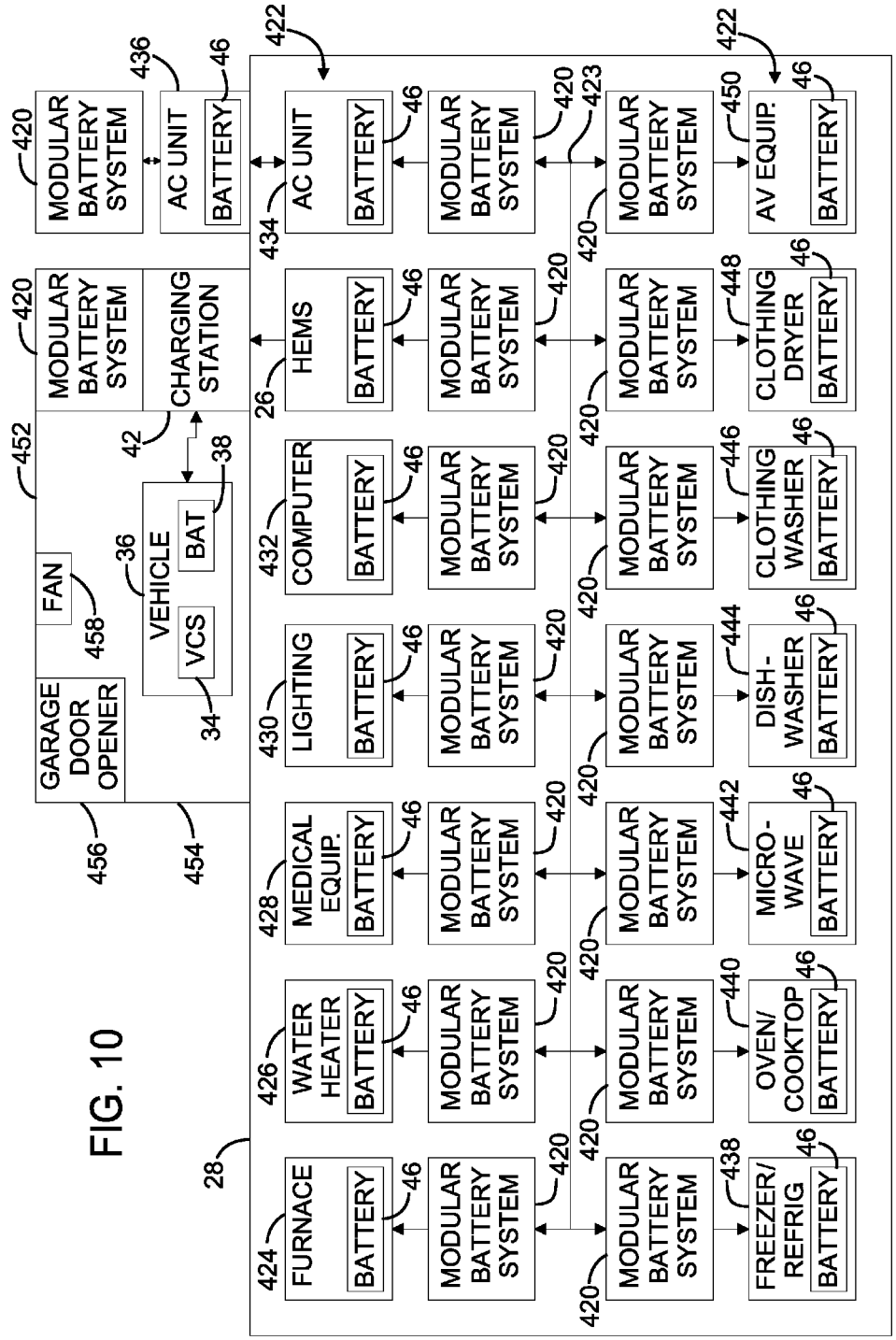
FIG. 10 is a block diagram of an exemplary embodiment of a residential building having distributed energy sources.

FIG. 10 is a block diagram of an exemplary embodiment of residential building 28 having distributed energy sources, which include modular battery systems 420 (e.g., appliance backup power sources) and residential equipment 422 having stationary batteries 46. Each item of residential equipment 422 includes at least one integrated stationary battery 46 configured to provide a desired amount of battery backup for that specific item. For example, each item of residential equipment 422 may have a standard capacity battery 46, or may have an item-specific capacity battery 46 to provide a desired backup time, e.g., 0.5 to 10 hours. In addition or alternatively, each item of residential equipment 422 (or groups of equipment) may be coupled to modular battery system 420, which includes a plurality of modular battery receptacles configured to enable modular energy storage for that item. In other words, a user may install one or more battery modules 46 in each modular battery system 420 to provide a desired amount of battery backup. In certain embodiments, batteries 46 may be used (e.g., spent) vehicle batteries 38, such as PHEV batteries no longer suitable for use in vehicle 36.

Residential equipment 422 may include a variety of appliances, fixtures, and portable devices throughout residential building 28. Appliances and fixtures typically rely only on electricity from a residential wiring system 423, which receives electricity from power grid 40. In the illustrated embodiment, energy storage (e.g., batteries 46) is dedicated to each item of residential equipment 422 to provide sufficient battery backup for that item. Although the present disclosure is not limited to any specific embodiments, residential equipment 422 may include a furnace 424, a water heater 426, medical equipment 428, lighting 430, computers 432, HEMS 26, an interior air conditioning (AC) unit 434, an exterior AC unit 436, refrigerator/freezer 438, oven/cook top 440, microwave oven 442, dishwasher 444, clothing washer 446, clothing dryer 448, and audio/video (AV) equipment 450. Specific details of these items of residential equipment 422 are provided in the following paragraph.

Furnace 424 may include an electric heating element, a gas heating element with an electric ignition, and/or a motorized fan. Water heater 426 may include an electric heating element, a gas heating element with an electric ignition, and/or an electronic thermostat. Medical equipment 428 may include physical therapy equipment (e.g., treadmill), life support equipment, motorized doors, or medical instruments. Lighting 430 may include light fixtures or stand-alone lamps, e.g., overhead ceiling lights, table lamps, and outdoor spot lights. Computer 432 may include desktop personal computers, home servers, security systems, printers, monitors, scanners, fax machines, game systems, and peripherals. AC unit 434 may include evaporator coils, a motorized fan, and an electronic thermostat. AC unit 436 may include condenser coils, a motorized fan, a compressor, and a compressor motor. Refrigerator/freezer 438 includes a vapor compression refrigeration cycle, which may include a motorized compressor, an evaporator, a condenser, a motorized compressor, an expansion valve, a motorized fan, a light, and an electronic thermostat. Oven/cook top 440 may include an electric heating element, a gas heating element with an electric ignition, a light, and/or an electronic thermostat. Microwave 442 may include a microwave generator, a light, and an electronic control panel. Dishwasher 444 may include a motorized rotatable spray bar, an electric heating element, a light, and/or an electronic control panel. Clothing washer 446 may include a motorized rotatable drum, a water pump, a light, and/or an electronic control panel. Clothing dryer 448 may include an electric heating element, a gas heating element with an electric ignition, a light, a motorized fan, an electronic thermostat, and/or an electronic control panel. AV equipment 450 may include a television (e.g., CRT, LCD, LED, plasma, or video projector), an audio receiver (e.g., satellite radio, internet radio, or AM/FM radio), an audio amplifier, an audio player/recorder (e.g., tape, compact disc, or digital storage), a television receiver (e.g., cable, satellite, or internet), a video player/recorder (e.g., digital video disc, blu-ray disc, or digital storage), or a residential telephone system.

As illustrated, HEMS 26 and VCS 34 communicate with one another in residential building 28, and may independently or cooperatively control aspects of charging and discharging vehicle battery 38, modular battery systems 420, and residential equipment 422 having batteries 46. For example, HEMS 26 and VCS 34 may be configured to charge and discharge vehicle battery 38, equipment batteries 46, and modular battery systems 420 depending on electricity demand, real-time pricing of electricity, power outages, and user-defined criteria. In certain embodiments, each item of residential equipment 422 includes an equipment energy controller (EEC) configured to charge and discharge batteries 46 depending on electricity demand, real-time pricing of electricity, power outages, and user-defined criteria. For example, user-defined criteria may include temperature comfort preferences, energy conservation preferences, seasonal preferences (e.g., month of year), and daily preferences (e.g., time of day). In certain embodiments, each modular battery system 420 includes a modular energy controller (MEC) configured to charge and discharge battery modules 46 depending on electricity demand, real-time pricing of electricity, power outages, and user-defined criteria.

In the illustrated embodiment, vehicle 36 is parked in a garage 452 of residential building 28. Garage 452 may include a garage door 454 coupled to a garage door opener 456, a ventilation system having a fan 458 disposed in a window or adjacent a vent, and charging station 42 coupled to a modular battery system 420. In certain embodiments, charging station 42 includes stationary battery 47 configured to rapidly charge vehicle battery 38. In addition or alternatively, modular battery system 420 may be configured to rapidly charge vehicle battery 38. For example, charging station 42 directly transfers electrical energy from stationary battery 47 and/or modular battery system 420 to vehicle battery 38 (i.e., a battery to battery transfer), rather than transferring electrical energy from power grid 40 to vehicle battery 38 (i.e., grid to battery transfer). Grid to battery transfers (i.e., charging) is limited in part due to the electrical wiring system 423 in residential building 28. Limited amounts of current can be sent on these wires to reduce the chance of short-circuiting and overheating. A separate high capacity electrical wiring bus is connected between vehicle 36 and stationary battery 47 of charging station 42 and/or modular battery system 420, thereby enabling power transfer rates drastically greater than the building's electrical wiring system 423 permits. The battery to battery transfer substantially reduces the charge duration as compared with the grid to battery transfer. For example, a grid 40 to vehicle battery 38 transfer may take approximately 4 to 8 hours or more, whereas a stationary battery to vehicle battery 38 transfer may take approximately 15 to 30 minutes or less. Stationary battery 47 of charging station 42 and/or modular battery system 420 may be charged within the current limits of the building's electrical wiring during off-peak hours (e.g., nighttime hours) directly from power grid 40, such that a more rapid charge is possible for vehicle battery 38 when needed.

In certain embodiments, HEMS 26 and/or VCS 34 may trigger vehicle 36 to start its engine to provide power to vehicle battery 38, stationary batteries 46, modular battery systems 420, and/or residential building 28. For example, during periods of high demand, high pricing, or power outages, HEMS 26 and/or VCS 34 may automatically start vehicle engine after one or more battery levels fall below a threshold, e.g., less than approximately 5, 10, 15, or 20 percent of total power. Simultaneously, HEMS 26 and/or VCS 34 may actuate a ventilation system, e.g., open garage door 454 and/or window, turn on fan 458, and/or open ductwork. For example, HEMS 26 and/or VCS 34 may have communication links with garage door opener 456, fan 458, and actuators for ventilations doors, windows, or ductwork. Thus, HEMS 26 and/or VSC 34 may control the ventilation system to vent exhaust gases and/or heat from the vehicle 36 and/or a standalone combustion engine-driven generator in garage 452. HEMS 26 and/or VSC 34 may include sensors configure to sense levels of heat, carbon monoxide, carbon dioxide, smoke, or other emissions. HEMS 26 and/or VSC 34 may communicate (e.g., wired or wirelessly) with a standalone combustion engine-drive generator, vehicle 36, or a charger, such that HEMS 26 and/or VSC 34 may adjust the ventilation system accordingly. In an exemplary embodiment, the system utilizes a HomeLink system by Johnson Controls.

Figure 11:
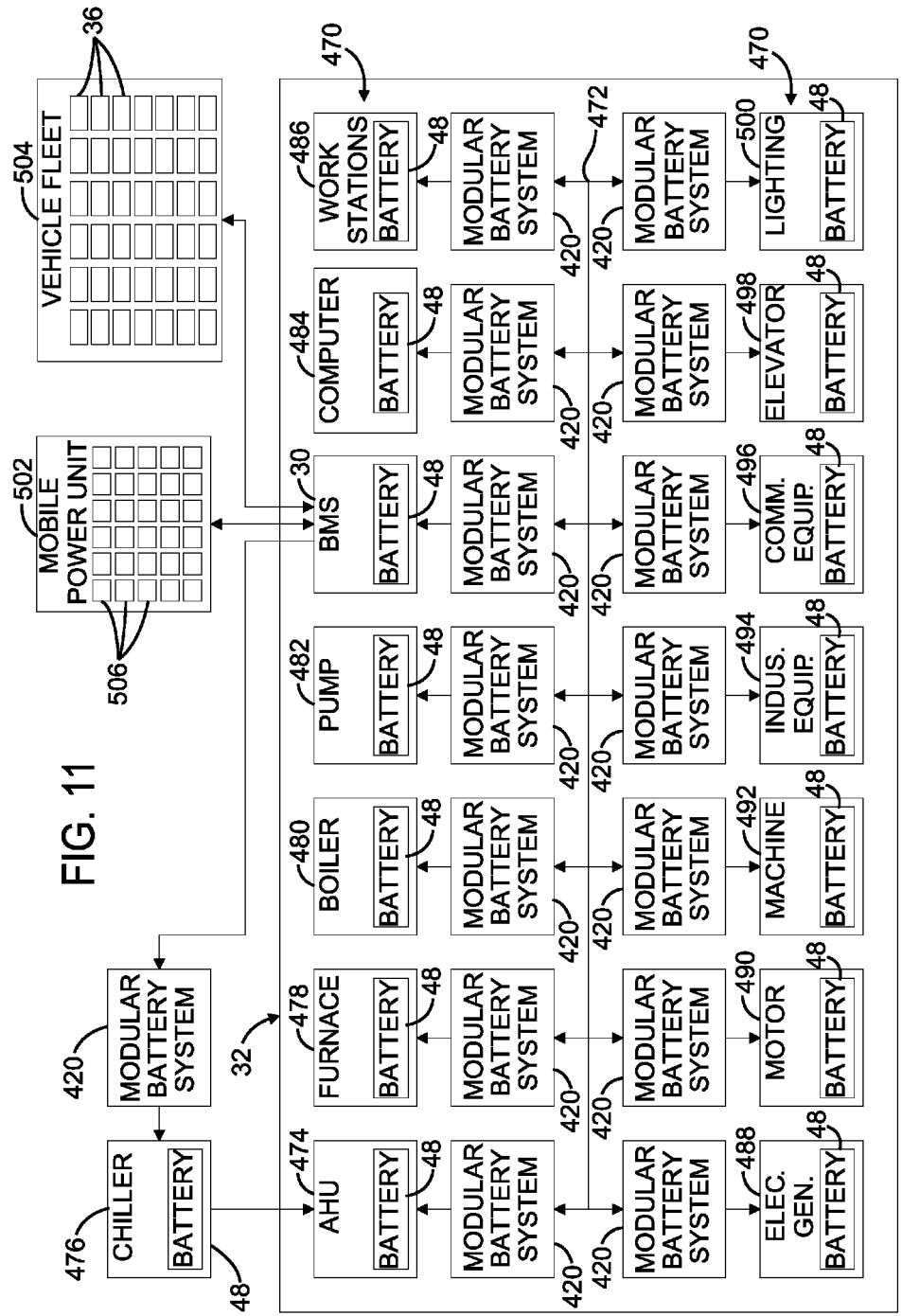
FIG. 11 is a block diagram of an exemplary embodiment of a commercial building having distributed energy sources.

FIG. 11 is a block diagram of an exemplary embodiment of commercial building 32 having distributed energy sources, which include modular battery systems 420 and commercial equipment 470 having stationary batteries 48. Each item of commercial equipment 470 includes at least one integrated stationary battery 48 configured to provide a desired amount of battery backup for that specific item. For example, each item of commercial equipment 470 may have a standard capacity battery 48, or may have an item-specific capacity battery 48 to provide a desired backup time, e.g., 0.5 to 10 hours. In addition or alternatively, each item of commercial equipment 470 (or groups of equipment) may be coupled to modular battery system 420, which includes a plurality of modular battery receptacles configured to enable modular energy storage for that item. In other words, a user may install one or more battery modules 48 in each modular battery system 420 to provide a desired amount of battery backup. In certain embodiments, batteries 48 may be used (e.g., spent) vehicle batteries 38, such as PHEV batteries no longer suitable for use in vehicle 36.

Commercial equipment 470 may include a variety of appliances, fixtures, and portable devices throughout commercial building 32. Appliances and fixtures typically rely only on electricity from a commercial wiring system 472, which receives electricity from power grid 40. In the illustrated embodiment, energy storage (e.g., batteries 48) is dedicated to each item of commercial equipment 470 to provide sufficient battery backup for that item. Although the present disclosure is not limited to any specific embodiments, commercial equipment 470 may include an air handling unit (AHU) 474, a furnace 478, a boiler 480, a pump 482, BMS 30, a computer 484, a work station 486, an electrical generator 488, a motor 490, a machine 492, industrial equipment 494, commercial equipment 496, an elevator 498, and lighting 500

Specific details of these items of commercial equipment 470 are provided in the following paragraph.

Air handling unit 474 may include a heat exchanger, electronically actuated dampers, a motorized fan, and a thermostat. Chiller 476 may include a heat exchanger and a motorized fan. Furnace 478 may include an electric heating element, a gas heating element with an electric ignition, and/or an electronic thermostat. Boiler 480 may include an electric heating element, a gas heating element with an electric ignition, and/or an electronic thermostat. Pump 482 may include a reciprocating pump or a rotary pump coupled to an electric motor. Computer 484 and work stations 486 may include desktop personal computers, servers, security systems, printers, monitors, scanners, fax machines, game systems, and peripherals.

Electrical generator 488 may include a combustion-engine coupled to an electrical generator, which produces electricity in response to work provided by the combustion engine. Battery 48 cooperates with electrical generator 488 to provide backup power. For example, electrical generator 488 may initially provide backup power solely through the battery 48, and then start the combustion-engine when battery power falls below a threshold. The combustion-engine may continue to run until the battery 48 is fully charged, and then shut off until the battery power falls below the threshold again. The combustion-engine may continue to cycle on and off to increase efficiency, reduce noise, and reduce wear.

Motor 490 may be an electric motor configured to move an element in machine 492, industrial equipment 494, and/or commercial equipment 496. For example, items 492, 494, and 496 may include a robotic arm, a conveyor belt, a computer aided manufacturing (CAM) device, industrial automation equipment, a compressor, a pump, a machining tool, an assembly tool, a food processing tool, a clothing production tool, a molding tool, an extrusion tool, a fastening tool, or a welder. Elevator 498 may include a hydraulic or electric drive, configured to raise and lower a platform. Lighting 500 may include light fixtures or stand-alone lamps, e.g., overhead ceiling lights, table lamps, and outdoor spot lights.

As illustrated, BMS 30 may control charging and discharging modular battery systems 420 and commercial equipment 470 having batteries 48. BMS 30 also may communicate with a mobile power unit 502 and/or a vehicle fleet 504 disposed outside of commercial building 32. In certain embodiments, mobile power unit 502 is a vehicle, such as a heavy duty truck or trailer, having a large capacity of energy storage (e.g., mobile battery modules 506). For example, mobile power unit 502 may include approximately 10 to 1000 mobile battery modules 506, which may be removable and pluggable to provide a desired energy storage capacity. Mobile power unit 502 may have sufficient mobile battery modules 506 to recharge at least greater than 10, 50, 100, or 500 vehicles 36. Mobile power unit 502 also may have sufficient mobile battery modules 506 to power commercial building 32 for a duration of approximately 0.5 to 10 hours, or longer. Vehicle fleet 504 may include a plurality of vehicles 36 (e.g., PHEVs) disposed in a parking lot, wherein each vehicle 36 has vehicle battery 38 as a possible energy source. Together, vehicles 36 in fleet 504 represent a power source for commercial building 32 and/or power grid 40.

BMS 30 and/or UEMS 22 may be configured to charge and discharge equipment batteries 48, modular battery systems 420, mobile battery modules 506 in mobile power unit 502, and/or vehicle batteries 38 in fleet 504 depending on electricity demand, real-time pricing of electricity, power outages, and user-defined criteria. In certain embodiments, each item of commercial equipment 470 includes an equipment energy controller (EEC) configured to charge and discharge batteries 48 depending on electricity demand, real-time pricing of electricity, power outages, and user-defined criteria. For example, user-defined criteria may include temperature comfort preferences, energy conservation preferences, seasonal preferences (e.g., month of year), and daily preferences (e.g., time of day). In certain embodiments, each modular battery system 420 includes a modular energy controller (MEC) configured to charge and discharge battery modules 48 depending on electricity demand, real-time pricing of electricity, power outages, and user-defined criteria. Equipment batteries 48 and modular battery systems 420 may be charged during off-peak hours (e.g., nighttime hours) directly from power grid 40, such that power is available during peak hours.

In certain embodiments, BMS 30 and/or UEMS 22 may trigger vehicles 36 in fleet 504 to start their engines to provide power to vehicle battery 38, stationary batteries 48, modular battery systems 420, and/or commercial building 32. For example, during periods of high demand, high pricing, or power outages, BMS 30 and/or UEMS 22 may automatically start vehicle engines after one or more battery levels fall below a threshold, e.g., less than approximately 5, 10, 15, or 20 percent of total power. BMS 30 and/or UEMS 22 may track the duration of engine operation of each vehicle 36, and provide credits to account for fuel usage and electricity pricing.

Exemplary embodiments of commercial equipment 470 may include a variety of systems that consume electricity in commercial building 32. According to the Electronics Industry Association (EIA), cooling systems like chillers 476 consume approximately 26% of the electricity in commercial building 32. Chillers 476 could have the battery packs embedded or as a separate add-on option. Lighting 500 is the next highest electricity consumer at approximately 23%. In this case, the battery packs could be a separate add-on since they may be installed near a lighting distribution panel. Electric heat consumes 8% and ventilation consumes 7% of the building's electricity, so batteries could be added to radiant heaters, electric heating coils, and air handling units (AHUs) 474 to reduce these loads. Altogether, a typical heating ventilating and air conditioning (HVAC) system consume approximately 41% of the electricity in commercial building 32. Many utilities have contracts with businesses for a base electric load and a maximum electric load. If the business uses more electricity than contracted, they are penalized with a demand surcharge. Thus, the BMS 30 may be configured to monitor loads and take equipment 470 off-grid via an automatic transfer switch (ATS) during high consumption times of the day to prevent any surcharges. For example, each battery 48 and/or modular battery system 420 may be sized to provide enough power for the equipment 470 for a period greater than the typical peak demand time (e.g., approximately 4 to 6 hours). During peak demand, the BMS 30 commands the ATS to switch from grid power to battery power. When the demand has fallen, BMS 30 switches the equipment 470 back to grid power and the batteries recharge. BMS 30 may also have an algorithm that determines when to charge the batteries to ensure that all of the battery packs used are not recharging at the same time, thereby reducing the possibility of pushing the electric load past the peak.

In certain embodiments, the batteries could be used for more than just peak load reduction. The batteries could also be used for load shifting. If the customer is serviced by a utility that provides real time pricing (RTP), the batteries could be used to power the equipment 470 when the cost of electricity is high, saving the business money. The batteries could decide when to charge using the RTP by finding the cheapest time to charge instead of right when the BMS 30 switches power back on to the equipment 470. This would also save the business money by shifting the electric load to low cost electric times.

Figure 12:
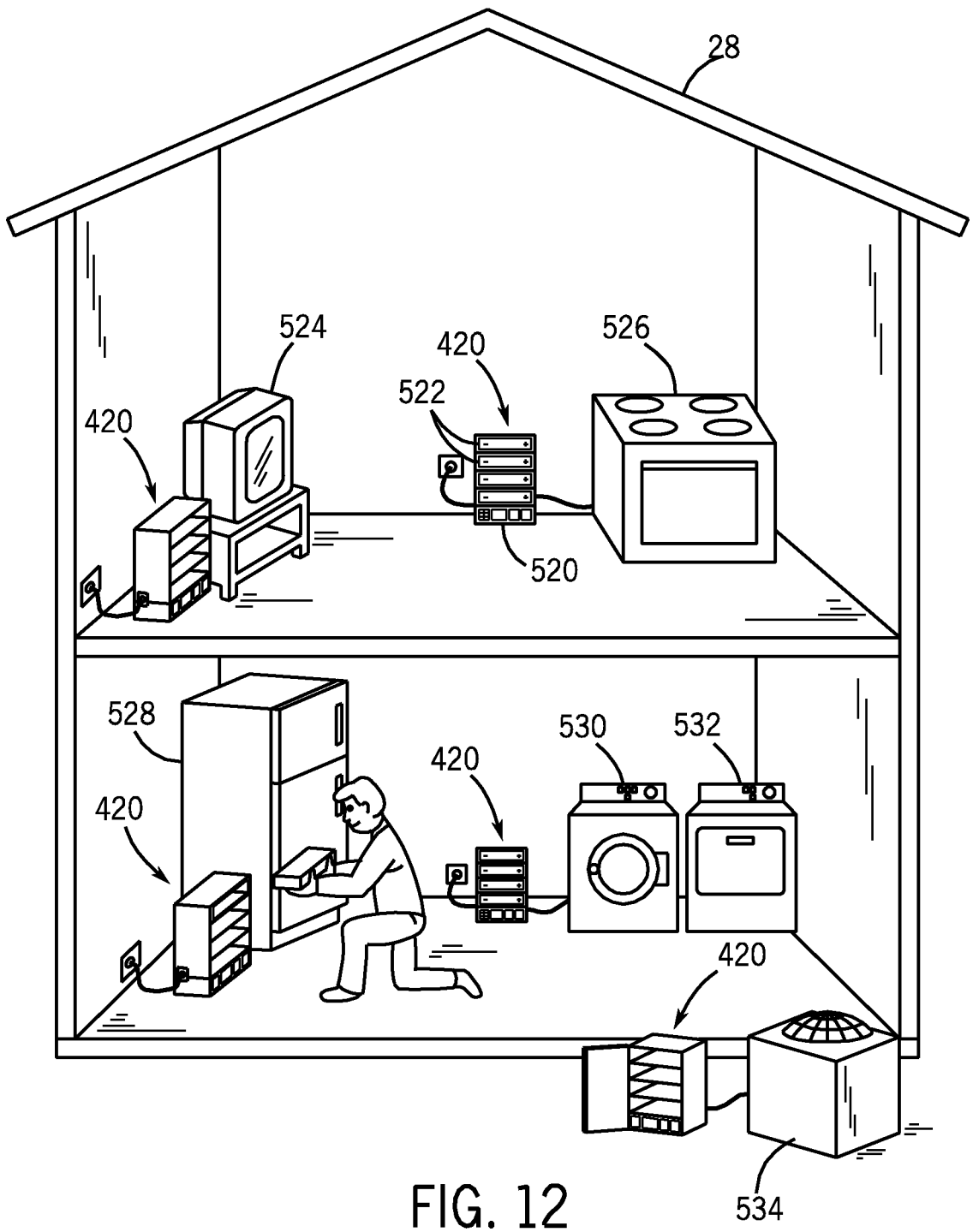
FIG. 12 is a schematic of a residential building having an exemplary embodiment of a distributed arrangement of modular battery systems of FIGS. 10 and 11, each having battery modules disposed in a battery tower.

FIG. 12 is a schematic of a residential building 28 having an exemplary embodiment of a distributed arrangement of modular battery systems 420, e.g., a distributed appliance storage or distributed modular incremental power backup. As illustrated, each modular battery system 420 includes a housing 520, such as a vertical rack or battery tower, supporting a plurality of energy storage units or battery modules 522 (e.g., power bricks). Instead of a single generator at one location, the modular battery systems 420 may be distributed throughout the building 28 at locations of each individual device or appliance. The individual modular battery systems 420 may be the same or different from one another. For example, the modular battery systems 420 may have a common form factor with equal or different energy storage capacities, depending on the number and capacity of battery modules 522. The distributed power backup enables low cost power backup for selected loads, reduces the possibility of a single failure point for all loads, provides scalability to adjust backup times, and enables reuse of otherwise "end of life" batteries from other applications (e.g., PHEV batteries).

In contrast, a typical generator backup is limited to the point where electricity enters the building 28. This can be expensive since all of the electrical loads within the building 28 are being backed up and the generator is generally sized to meet the total combined electrical load. The distributed backup method is more flexible and controllable as it enables the user to choose the devices to protect and the length of time that the devices are protected. Furthermore, the distributed backup method provides instant backup, whereas many generators are not readily available for backup.

In the exemplary embodiment, the electrical backup system is changed from a centralized generator or battery to a distributed backup system with battery stacks or towers at each location of an electric powered device. Electric backup is spread around a building and attached to only the devices that need backup. In this way, the customer can decide which devices require backup power protection and pay for only the energy backup desired. In addition, the customer can decide how long a device needs protection and outfit the backup with only enough energy storage as desired. For example, a homeowner may decide that only his/her sump pump needs backup for 24 hours leaving all of the other devices unprotected.

In the illustrated embodiment, the residential building 28 includes a modular battery system 420 coupled to a television 524, a modular battery system 420 coupled to a range 526, a modular battery system 420 coupled to a refrigerator 528, a modular battery system 420 coupled to a washing machine 530, a modular battery system 420 coupled to a drying machine 532, and a modular battery system 420 coupled to an AC unit (e.g., condenser) 534. However, modular battery system 420 may be coupled to any equipment in residential building 28.

Figure 13:
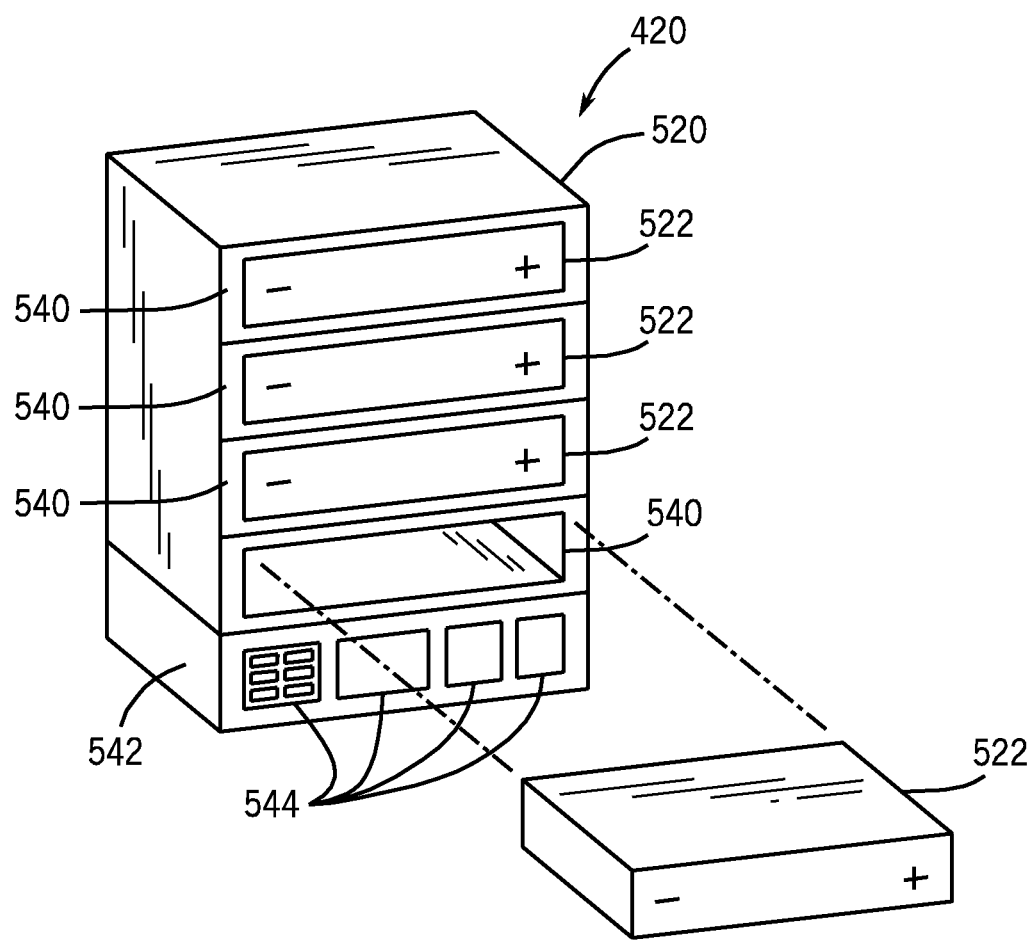
FIG. 13 is a perspective view of an exemplary embodiment of the modular battery system of FIGS. 10 through 12.

FIG. 13 is a perspective view of an exemplary embodiment of modular battery system 420 of FIGS. 10 through 12. In the illustrated embodiment, housing 520 is a tower or rack structure, which includes battery slots or receptacles 540 arranged one over another in a vertically stacked arrangement. In certain embodiments, the housing 520 may arrange receptacles 540 in a horizontal arrangement. Each receptacle 540 is configured to electrically and mechanically support a battery module 520. For example, each receptacle 540 may include a quick plug-in connection, which enables a user to simply insert the battery module 520 into the receptacle 540 for automatic electrical connection. Housing 520 includes a charger/inverter 542 having a control panel 544 configured to monitor and control various aspects of charging and discharging battery modules 520 for backup power. Each battery module 520 contains a battery that provides a unit amount of energy (e.g., 1 Kw-h). The customer uses one modular battery system 420 at each appliance to provide backup and then populates it with the number of battery module 520 suitable to power the device for the desired length of time. Each populated receptacle 540 is connected to the battery charger/inverter 542 in the modular battery system 420 via a backplane connection. The modular battery system 420 controls the charging and discharging of the battery modules 520. The modular battery system 420 plugs into the building's electrical system and monitors the input power. If the input power fails, then modular battery system 420 activates the battery power. If input power is available, then battery modules 520 are charged and monitored. The device being protected is plugged into modular battery system 420 and receives power from battery modules 522. For example, modular battery system 420 may be connected to lights, a refrigerator/freezer, a television, a clothes washing machine, a clothes drying machine, an air conditioning/heating unit, an oven, a water heater, or other electronic devices.

A couple of different variations to this concept are possible. First, it may be possible to use recycled batteries from other devices (like PHEVs) for this application. Spent PHEV battery packs could be used as the battery modules 522 in an industrial sized battery tower. Secondly, battery modules 522 could communicate with the power utility to determine when to charge and discharge the battery modules 522. This would provide a demand response feature in this system.

Figure 14:
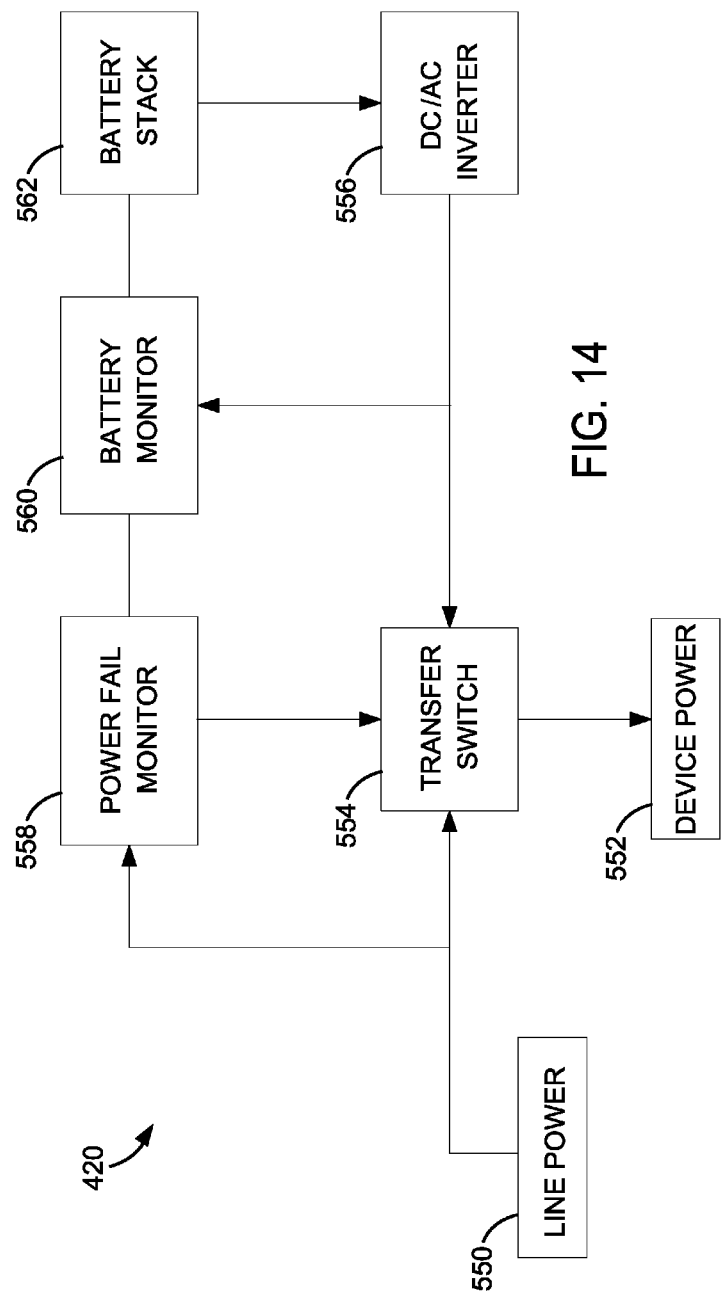
FIG. 14 is a block diagram of an exemplary embodiment of the modular battery system of FIGS. 10 through 13.

FIG. 14 is a block diagram of an exemplary embodiment of a modular battery system 420 (e.g., battery tower) as illustrated in FIGS. 10 through 13. In the exemplary embodiment, modular battery system 420 includes a line power input 550, a device power output 552, a transfer switch 554, a DC/AC inverter 556, a power fail monitor 558, a battery monitor 560, and a battery stack 562. In particular, the exemplary embodiment receives line power 550 into the transfer switch 554 and the power fail monitor 558. If the power fail monitor 558 identifies a lack of electrical power from the line power input 550, then the power fail monitor 558 triggers the transfer switch 554 to change between line power 550 and battery power from the battery stack 562. Upon switching over to battery power in the battery stack 562, the DC/AC inverter 556 changes the DC power to AC power into the transfer switch 554 for delivery through the device power output 552. The battery monitor 560 may perform a variety of functions, such as monitoring the battery power level, battery condition, battery charge capability, and possible need for a replacement battery. In the exemplary embodiment, the modular battery system 420 (e.g., battery tower) may deliver power from the battery stack 562 upon identifying a loss of line power 550, such that power can be immediately applied to one or more devices connected to the device power output 552 of the modular battery system 420. For example, the device power output 552 may be connected to a refrigerator, a washer, a dryer, a television, an oven, an air conditioning unit, a heating unit, or any other stationary or portable electronic device.

Figure 15:
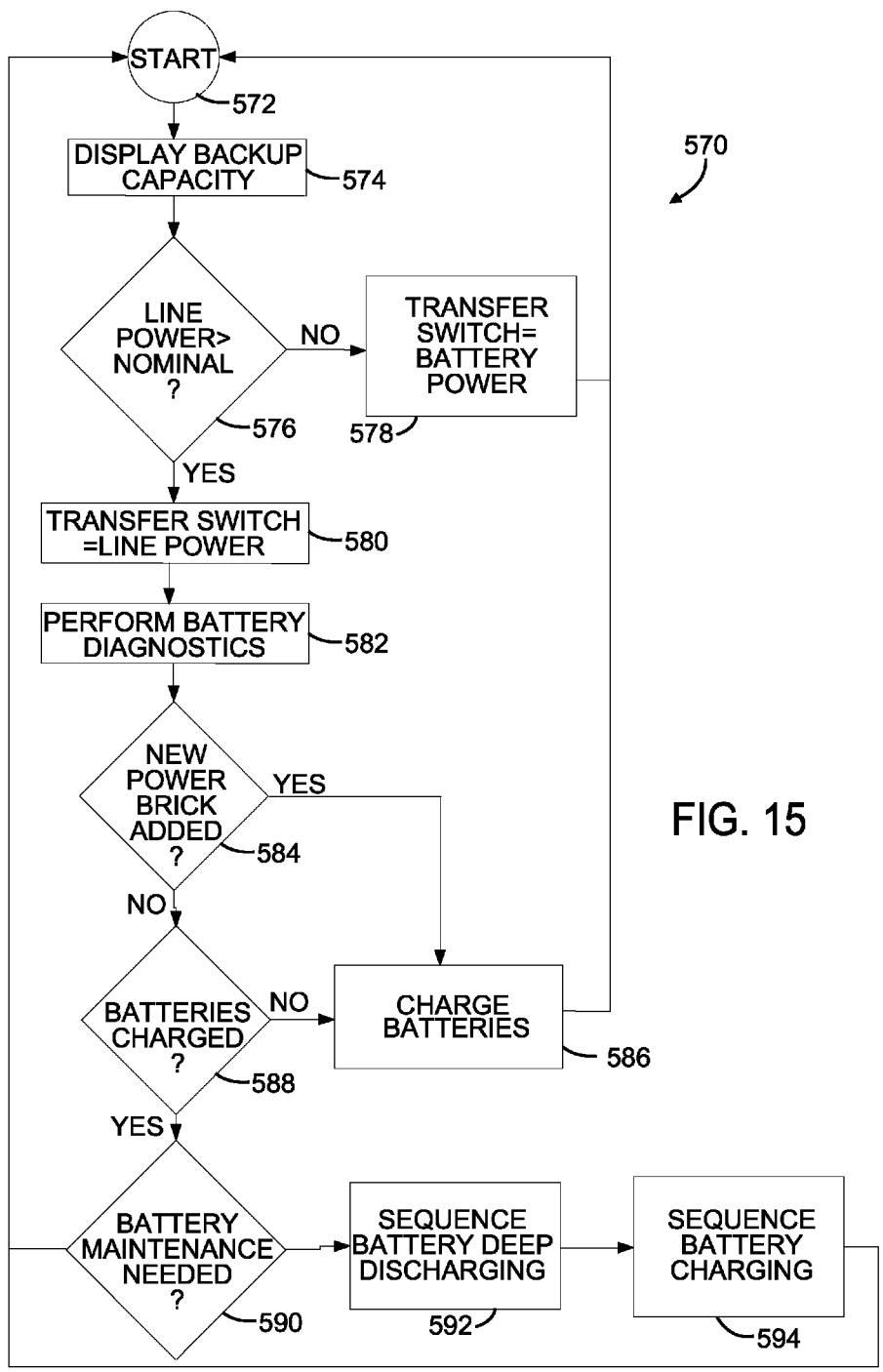
FIG. 15 is a flow chart of an exemplary embodiment of a sequence of operation for the modular battery system of FIGS. 10 through 14.

FIG. 15 is a flow chart of an exemplary embodiment of a sequence of operation 570 for the modular battery system 420 (e.g., battery tower) with battery modules 520 (e.g., power bricks) as shown in FIGS. 10 through 14. In an exemplary embodiment, the process 570 may start 572 by displaying a backup capacity of the battery tower (block 574). For example, the process 570 may display a backup time given the present load, a percentage of total capacity, a value indicative of total energy, or another suitable indication of backup capacity of the battery tower. The process 570 also may query whether line power is greater than or equal to an expected power or nominal power from the power grid (block 576). For example, the expected power may be 110 volts AC in the United States or 220 volts AC in Europe. If the line power is not greater than or equal to the expected power, then the process 570 may trigger a transfer switch to change from line power to battery power within the battery tower (block 578). If the line power is greater than or equal to the expected power, then the process 570 may trigger the transfer switch to change from battery power back to line power (block 580). The process 570 may further perform battery diagnostics on the batteries within the battery tower (block 582).

If a new power brick is added to the battery tower at block 584, then the process 570 may proceed to engage a battery charging procedure to ensure full charge of the stack of batteries including the new power brick within the battery tower (block 586). If a new brick has not been added at block 584, then the process 570 may proceed to check for a current charge level of the batteries within the battery tower (block 588). If the batteries are not fully charged or are below a desired charge level at block 588, then the process 570 may proceed to charge the batteries back to a full charge at block 586. Otherwise, the process 570 may proceed to check for a need for battery maintenance at block 590. If the process 570 does not identify a need for battery maintenance at block 590, then the process 570 may return back to the start 572 for a display of battery capacity and compare line power versus expected power. Otherwise, if the process 570 identifies the need for battery maintenance at block 590, then the process 570 may proceed to perform one or more maintenance procedures, e.g., a sequence of battery deep discharging 592 followed by a sequence of battery charging 594.

Figure 16:
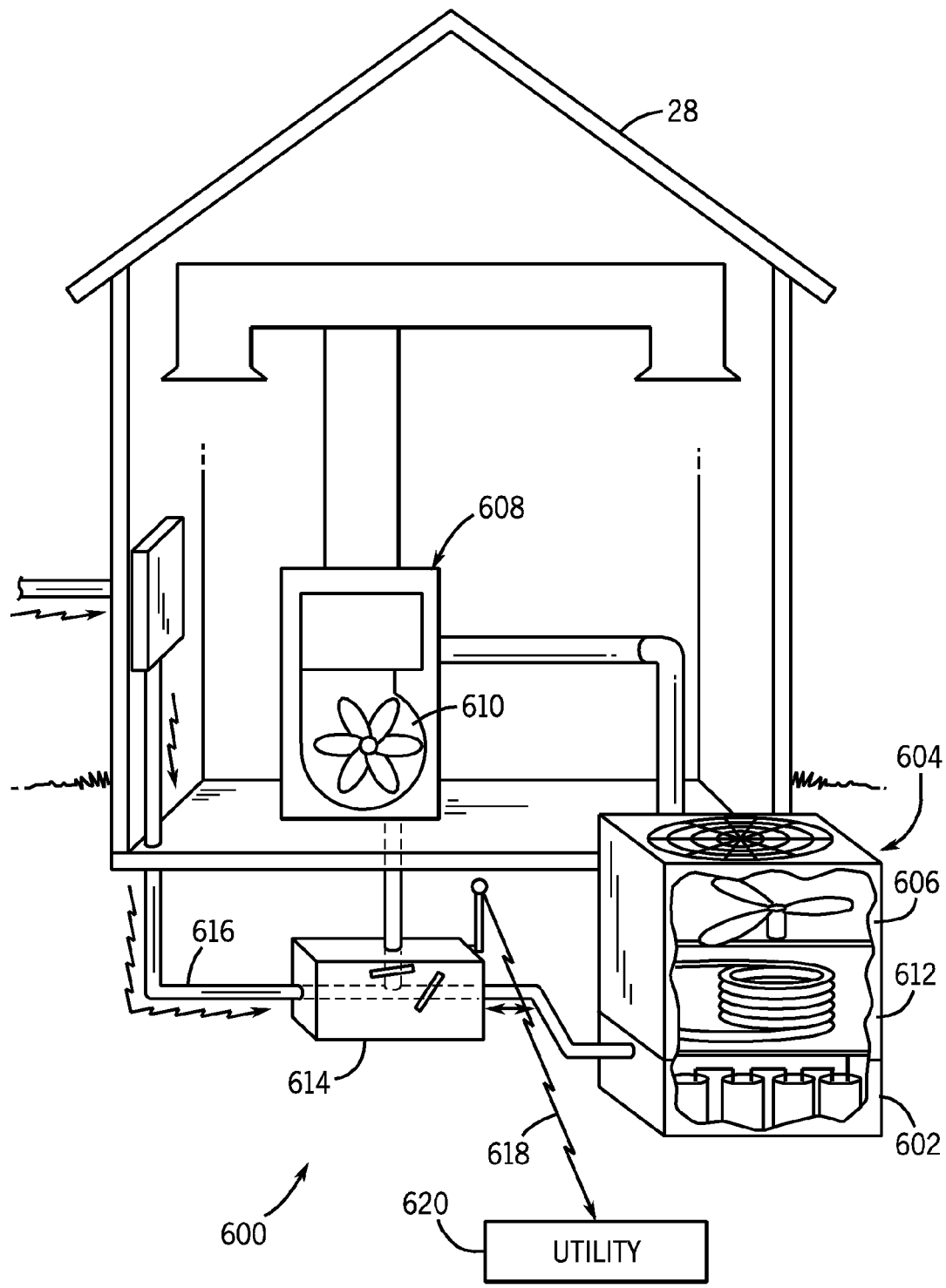
FIG. 16 is a schematic of an exemplary embodiment of an appliance energy storage solution having a heating, ventilating, and air conditioning (HVAC) system with attached energy storage.

FIG. 16 is a schematic of an exemplary embodiment of an appliance energy storage solution, e.g., batteries attached to a residential, commercial, or industrial appliance. The exemplary embodiment may reduce peak electricity demand while providing savings to the consumers, shift electrical usage to times when demand is lower, and enable consumers to participate in load reduction programs without losing operation of the appliances.

An exemplary embodiment of this solution is a battery backed air conditioning system 600. The appliance, e.g., air conditioning system 600, may run off of the energy storage solution during peak electrical demand or power outage. For example, a power utility may provide a demand reduction program where consumers receive a rate incentive if the power utility can automatically turn off their air conditioner during peak electrical demand times. This takes the air conditioner off the electric grid, reducing the utilities electric load at the expense of the customer's comfort. If the air conditioner came with a battery pack prepackaged in the unit, which provides power to the air conditioner during demand reduction periods, the power utility could get the same effect without effecting consumer comfort and the consumer could get the same rate incentives.

In the exemplary embodiment, a battery pack 602 may be embedded into residential air conditioning system 600 for the purpose of running the air conditioning system 600 during peak demand times. The battery pack 602 may be sized to provide enough power to operate condenser unit 604 (e.g., compressor and fan 606) and furnace/evaporator unit 608 (e.g., fan 610) for a period greater than the typical peak demand time (e.g., 4 to 6 hours). For a typical 2.5 tonne condenser unit 604 and furnace blower fan 610, the battery pack 602 may be selected to supply approximately 10 to 40, or 15 to 23 KWH of energy. This battery pack 602 may be located under a condenser coil 612 so that condenser fan 606 can dissipate heat from battery pack 602 along with heat from the coil 612.

If a consumer participates in a demand response program with the power utility, then the power utility may install a remote switch 614 near furnace 608 or condenser unit 604 that opens an electrical circuit 616 when a command 618 is received from the power utility 620. This cuts off power to the condenser unit 604 (and sometimes) the furnace fan 610, reducing the power utility's electric load. In the exemplary embodiment, when the power is removed by the power utility remote switch 614, the air conditioning system 600 may automatically switch to battery power via battery pack 602. The system 600 runs on battery power until either the battery pack 602 is exhausted or the power utility 620 switches power back on to the system 600. When power is returned, the battery pack 602 is recharged by the power grid or other energy sources.

Two additional features could be optionally added to this concept. First, the batteries could be used for more than just backup power. If the customer is serviced by a utility that provides Real Time Pricing (RTP), the batteries could be used to power the air conditioning system 600 when the cost of electricity is high, saving the customer money. Since an air conditioner is used approximately 90-120 days in a season, the battery pack 602 could be designed to support 1400 charge cycles to meet an 11 year average life expectancy of an air conditioner. Second, the battery pack 602 could decide when to charge using the RTP and finding the cheapest time to charge instead of right when the power utility switches power back on to the condensing unit. This would also save the consumer money.

In certain exemplary embodiments, the battery pack 602 attached to the condenser unit 604 may be used to power other appliances within the building 28. For example, if power is lost in the building 28, then the battery pack 602 may be used to power critical devices such as refrigerators, freezers, and medical equipment. Furthermore, other batteries in the building 28 may be used to power the air conditioning system 600, particularly where no critical devices exist in the building 28.

Figure 17:
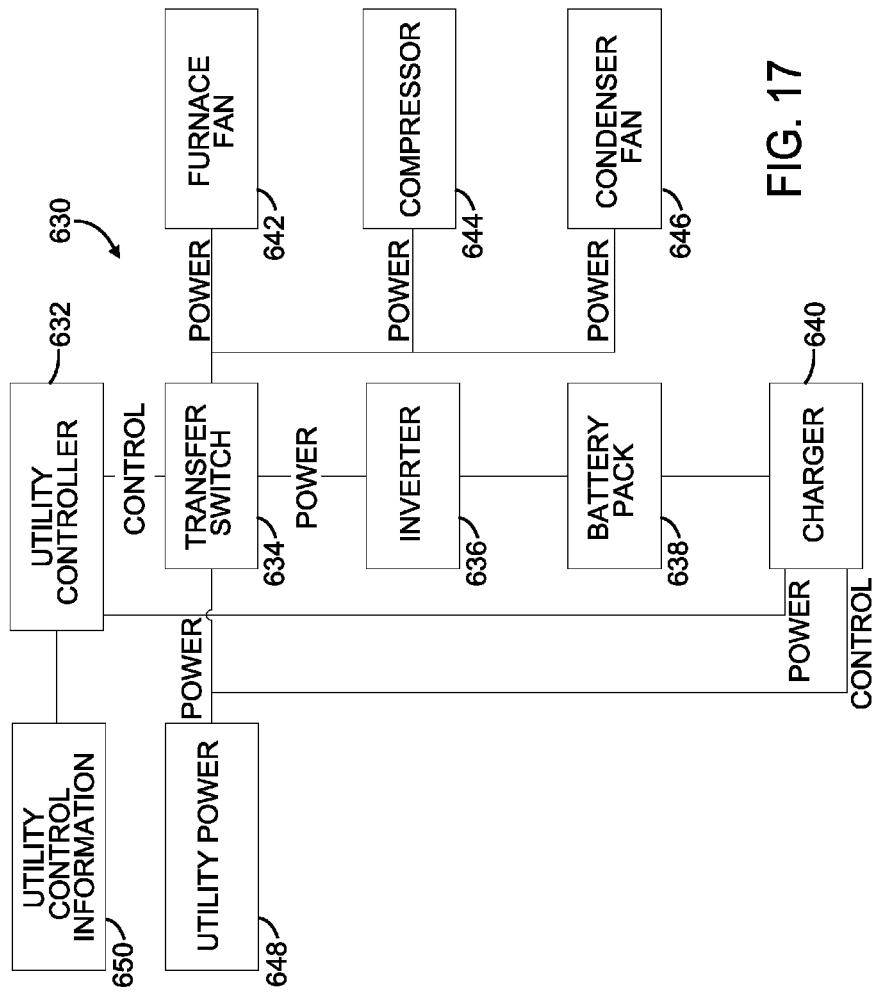
FIG. 17 is a block diagram of an exemplary embodiment of the HVAC system of FIG. 16.

FIG. 17 is a block diagram of an exemplary embodiment of a heating, ventilating, and air conditioning (HVAC) system 630 having attached energy storage, e.g., HVAC system 600 of FIG. 16. In the exemplary embodiment, the system 630 includes a utility controller 632, a transfer switch 634, an inverter 636, a battery pack 638, a charger 640, a furnace fan 642, a compressor 644, and a condenser fan 646. The transfer switch 634 receives and distributes power from either the power utility 648 or battery pack 638 depending on a control signal 650 from the power utility controller 632. The utility controller 632 receives utility control information 650, such as a real time pricing or demand response control signal from the power utility. For example, the utility control information 650 may direct the utility controller 632 to change the transfer switch 634 from utility power to battery power during peak demand and then subsequently control the utility controller 632 to change the transfer switch 634 from battery power to utility power during low demand. In certain exemplary embodiments, the utility controller 632 may change the transfer switch 634 between battery and utility power depending on a number of factors, such as energy demand, energy prices, comfort in the building, and time of day. In the exemplary embodiment, the transfer switch 634 provides the power to the furnace fan 642, the compressor 644, and the condenser fan 646. The power may originate from the power utility 648 or the battery pack 638 depending on the utility control information 650. If the power originates from the battery pack 638, then the system 630 converts the DC power from the battery pack 638 to AC power through the inverter 636 before directing the power to the transfer switch 634 for distribution into components of the system 630.

The system 630 receives the utility power 648 into the transfer switch 634 and the charger 640. Thus, the charger 640 may charge the battery pack 638 while utility power 648 is available. In an exemplary embodiment, the charger 640 receives a control signal to control various aspects of charging of the battery pack 638. For example, the control signal may direct the charger 640 to charge the battery pack 638 during low demand, low energy cost, or night time. The control signal also may direct the charger 640 to perform a quick charge, a trickle charge, a battery reconditioning process, or another suitable process for the battery pack 638. In certain exemplary embodiments, the battery pack 638 and associated circuitry shown in FIG. 17 may be attached to various components of heating and air conditioning systems, but not limited to those shown in FIG. 17.

Figure 18:
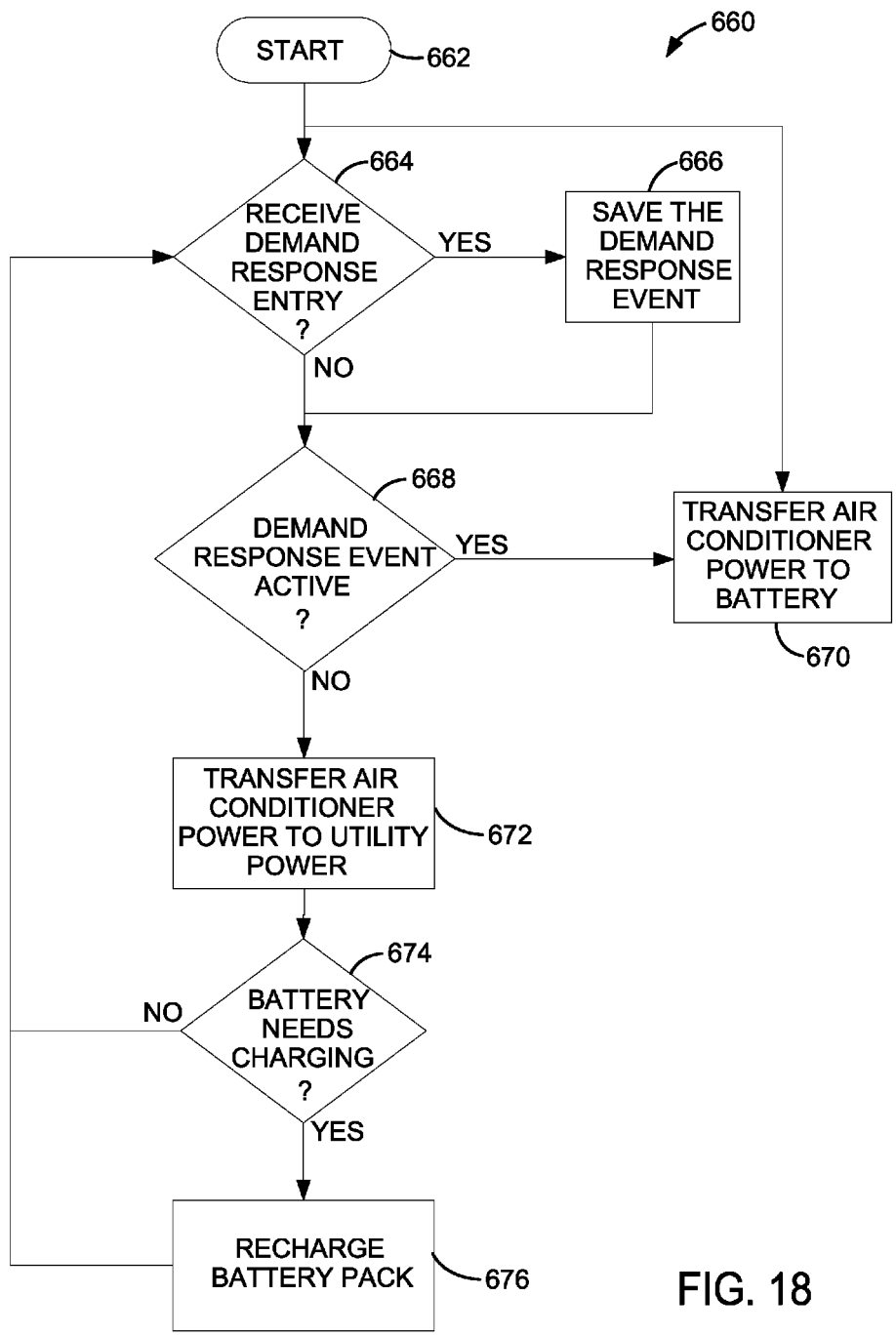
FIG. 18 is a flow chart of an exemplary embodiment of a process of operating the HVAC systems of FIGS. 16 and 17.

FIG. 18 is a flow chart of an exemplary embodiment of a process 660 of operating a heating, ventilating, and air conditioning (HVAC) system having attached energy storage, e.g., HVAC system 600 of FIG. 16 and HVAC system 630 of FIG. 17. In the exemplary embodiment, the process 660 starts by monitoring for a demand response entry (blocks 662 and 664). The demand response entry may be a control signal based on an energy demand, an energy shortage or loss, an energy price, or another control or trigger associated with the power utility. If the process 660 receives a demand response entry at block 664, then the process 660 may proceed to save the demand response entry (block 666) and query whether the demand response is active (block 668). Likewise, if the process 660 does not receive a demand response entry, then the process 660 queries whether the demand response event is active (block 668). If the demand response event is active at block 668, then the process 660 transfers air conditioning and/or heating power to battery backup (block 670). Otherwise, if the demand response event is not active at block 668, then the process 660 proceeds to transfer air conditioning and/or heating power to the utility power (block 672). The process 660 then may query whether the battery needs charging (block 674). If the battery does not need charging at block 674, then the process 660 may return to monitor for a demand response entry at block 664. If the battery does need charging at block 674, then the process 660 may proceed to perform a charging procedure to recharge the battery pack (block 676). In certain exemplary embodiments, the process 660 may trigger a change between utility power and battery power in response to a complete loss of utility power, a return of utility power after a loss, a change from a peak energy demand to a minimum energy demand, a change from a minimum energy demand to a peak energy demand, a change between high and low energy costs, or other demand response events.

Figure 19:
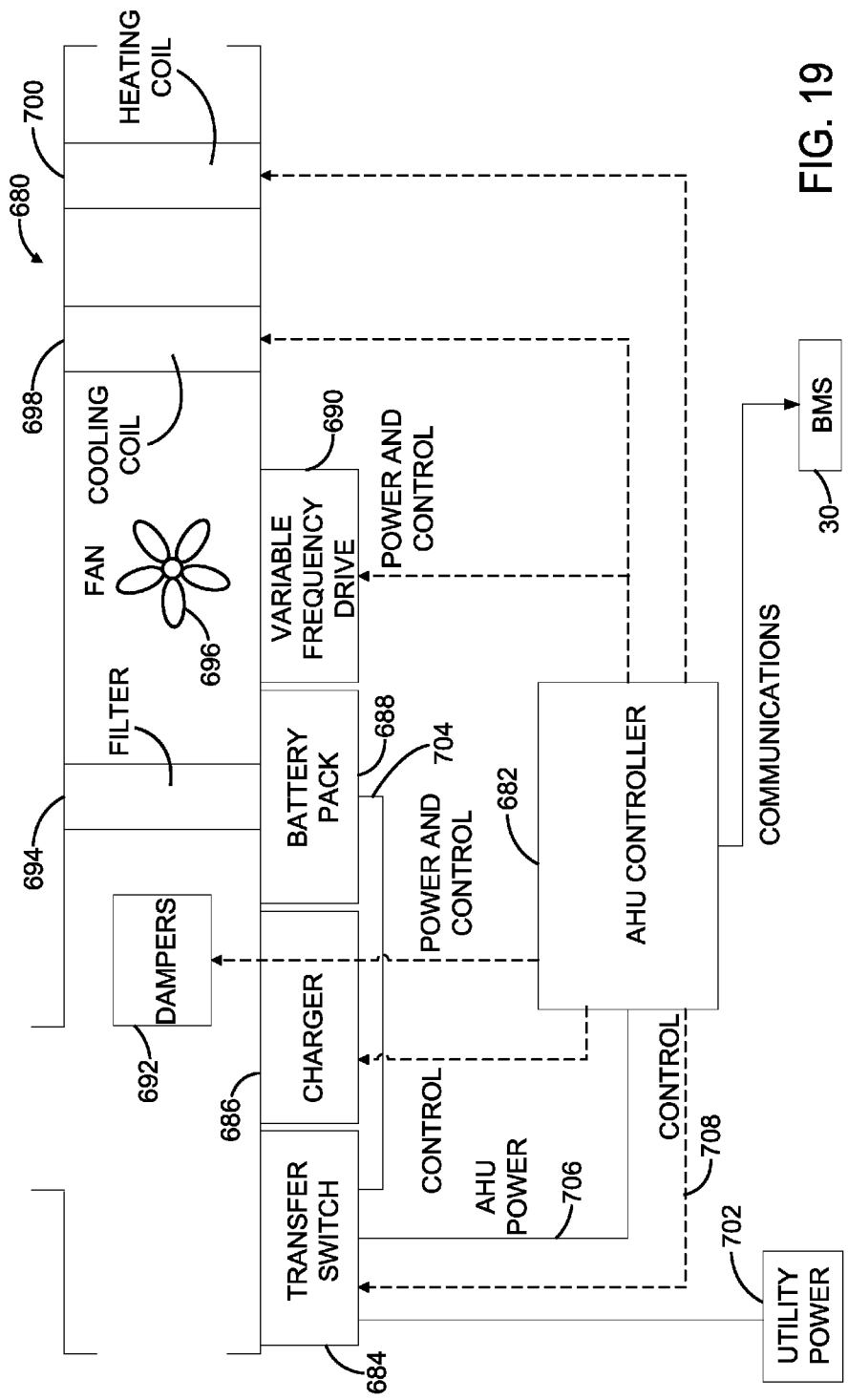
FIG. 19 is a block diagram of an exemplary embodiment of a system having one or more batteries integrated into an air handling unit (AHU).

FIG. 19 is a block diagram of an exemplary embodiment of a system having one or more batteries integrated into an air handling unit (AHU) 680 of a heating, ventilating, and air conditioning (HVAC) system. In the exemplary embodiment, the system includes an air handling unit (AHU) controller 682, a transfer switch 684, a charger 686, a battery back 688, a variable frequency drive 690, dampers 692, a filter 694, a fan 696, a cooling coil 698, and a heating coil 700. The transfer switch 684 receives utility power 702 and battery power 704 from the battery pack 688 and provides power 706 from one of these sources to the entire AHU 680 based on a control signal 708 from the AHU controller 682. For example, the AHU controller 682 may direct the transfer switch 684 to change between the battery pack 688 and the utility power 702 based on communications with the building controller (e.g., BMS 30), the power utility, or another controller.

The AHU controller 682 provides power and control to the dampers 692 and the variable frequency drive 690 coupled to the fan 696. Thus, the AHU controller 682 may enable, disable, or adjust the position of the dampers 692, the power state or speed of the fan 696, and other characteristics of the AHU 680. The AHU controller 682 also may control features of the cooling coil 698, the heating coil 700, and the charger 686. For example, the AHU controller 682 may enable, disable, or control features of the charger 686 to perform a quick charge, a trickle charge, a battery reconditioning process, or another function associated with the battery pack 688.

In an exemplary embodiment, the AHU controller 682 may switch from utility power 702 to battery power 704 during peak demand times and then return from battery power 704 to utility power 702 during minimal demand times. Likewise, the AHU controller 682 may switch between utility power 702 and battery power 704 depending on the costs (e.g., Real Time Pricing) associated with utility power 702. For example, the AHU controller 682 may switch from utility power 702 to battery power 704 while costs are high, and switch from battery power 704 to utility power 702 when costs are low. The AHU controller 682 may perform similar control functions with regard to the charger 686. For example, the AHU controller 682 may enable the charger 686 during a period of low energy demand or low energy costs.

FIG. 20 is a flow chart of an exemplary embodiment of a process 720 for controlling power sources for an air handling unit (AHU), e.g., AHU 680 of FIG. 19. In the exemplary embodiment, the process 720 may start by monitoring for a battery activation event from a building controller (blocks 722 and 724). If the process 720 receives a battery activation event at block 724, then the process 720 may calculate an amount of time the system can run on battery power (block 726). The process 720 may then send battery run time to the building controller (block 728). In turn, the process 720 may transfer equipment from utility power to battery power (block 730). The process 720 may then query for a battery activation cancellation event (block 732). If the process 720 identifies a battery activation cancellation at block 732, then the process 720 returns to monitor for a battery activation event from the building controller at block 724. Otherwise, if the process 720 does not identify a battery activation cancellation at block 732, then the process 720 proceeds to send battery run time to the building controller and run the equipment off of the battery power at block 728. Eventually, the process 720 may receive a battery activation cancellation as the battery run time decreases and approaches zero (block 732). The process 720 then returns to monitor for a battery activation event from the building controller at block 724.

If the process 720 does not receive a battery activation event (block 724) or receives a command to cancel battery power, then the process 720 may proceed to transfer the equipment from battery power to utility power (block 734). The process 720 may then query whether the battery needs charging (block 736). If the process 720 identifies a need for charging at block 736, then the process 720 may proceed to recharge the battery pack (block 738). Otherwise, if the battery pack is sufficiently charged at block 736, then the process 720 may return to monitor for a battery activation event from the building controller (block 724). In the exemplary embodiment, the battery activation event may be based on a loss or return of utility power, a shortage of utility power, a high or low demand for utility power, a high or low cost of utility power, or another factor.

Figure 21A:
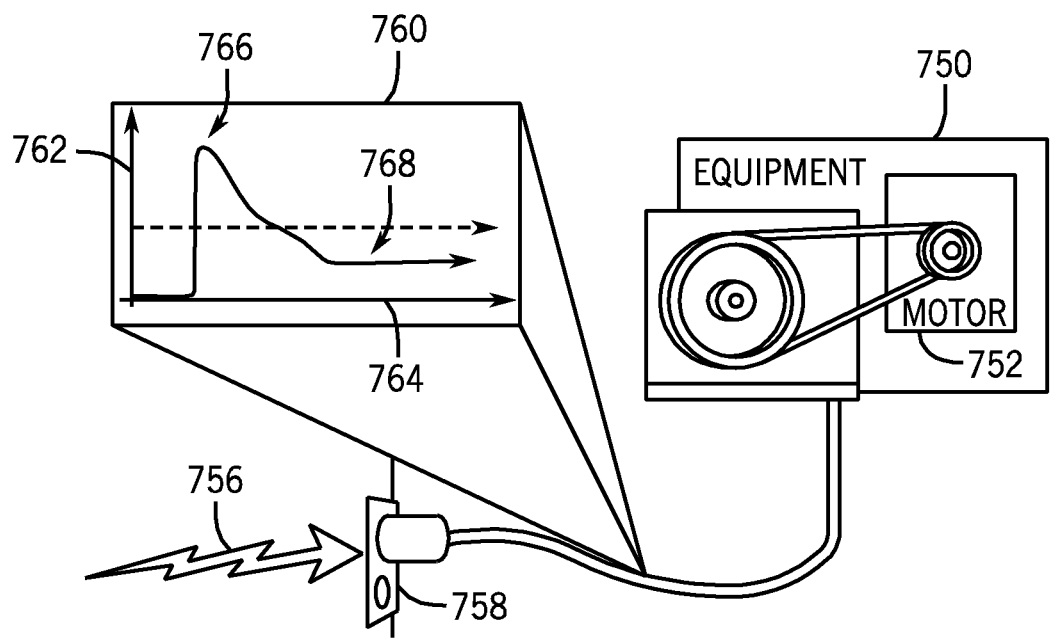
FIGS. 21A and 21B are schematics of an exemplary embodiment of equipment with high startup costs reduced with battery packs.
Figure 21B:
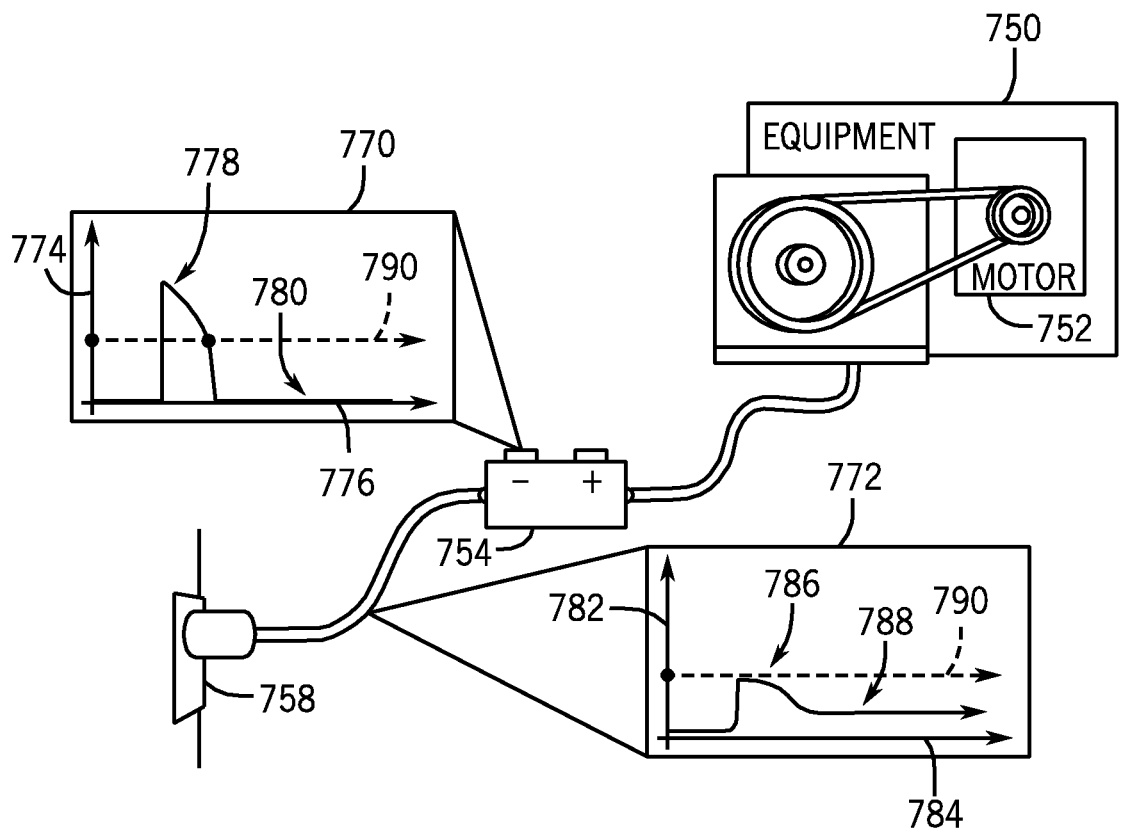

FIGS. 21A and 21B are schematics of an exemplary embodiment of equipment 750 (including motor 752) with high startup costs that may be reduced via battery power rather than utility power. In this application, a battery storage system 754 is attached as a UPS to systems that would be expensive to restart if power is lost. For example, large electric motors 752 typically use much more electricity when starting than when operating. This application pays for the battery system 754 by deferring the cost of equipment 750 startup. In certain exemplary embodiments, the battery storage system 754 may provide demand regulation to reduce electrical infrastructure. During the initial startup of large pieces of electrical equipment 750, the power that equipment 750 draws is larger than when it is already running. In a building with a large number of electrical loads, this can be a significant burden on the building's power grid. These applications try to eliminate this problem by putting energy storage at the equipment 750.

FIG. 21A shows motor 752 of equipment 750 coupled to utility power 756 through an electrical outlet 758. A graph 760 in FIG. 21A shows energy consumption or load 762 of the motor 752 versus time 764 from an initial startup 766 to a steady state condition 768. During the initial startup 766, the graph 760 shows a significant spike in the load 762 by the motor 752. Unfortunately, this spike in the load 762 may be expensive if energy costs are high during the initial startup 766 of the motor 752. The spike in the load 762 also creates a significant drain on the electric utility, particularly when combined with many other load spikes. The electrical infrastructure in the building also may be oversized to account for such load spikes.

FIG. 21B is a schematic of an exemplary embodiment of battery power for high startup cost applications, such as motor 752 of equipment 750 of FIG. 21A. In the exemplary embodiment, the battery pack 754 is disposed between the motor 752 and the electrical outlet 758. During the initial startup of the motor 752, the battery pack 754 provides power to the motor 752 to reduce the load on the electrical utility, as indicated by an upper graph 770 and a lower graph 772. The upper graph 770 shows energy consumption or load 774 of the motor 752 on the battery pack 754 versus time 776 from an initial startup 778 to a steady state condition 780. The lower graph 772 shows energy consumption or load 782 of the motor 752 on the power utility (e.g., outlet 758) versus time 784 from an initial startup 786 to a steady state condition 788.

In both upper and lower graphs 770 and 772, a horizontal line 790 represents an energy threshold or limit for the utility power (e.g., outlet 758). In other words, the lower graph 772 shows that the outlet 758 supplies utility power to the motor 752 up to the horizontal line 790 (e.g., energy threshold), while the upper graphs 770 shows that the battery pack 754 supplies the additional energy needed above the horizontal line 790. Together, the power utility and the battery pack 754 provide sufficient power to meet the high startup demands of motor 752 of equipment 750, while substantially reducing the load on the power utility. Battery pack 754 also defers costs to a later time for charging of the battery pack 754. In other words, the system may recharge the battery pack 754 when the demand and/or costs associated with the electric utility are relatively low. The battery pack 754 also may enable a less robust electrical infrastructure within the building, as the electrical infrastructure may be sized based on the steady state conditions rather than peak conditions of loads.

Figure 22:
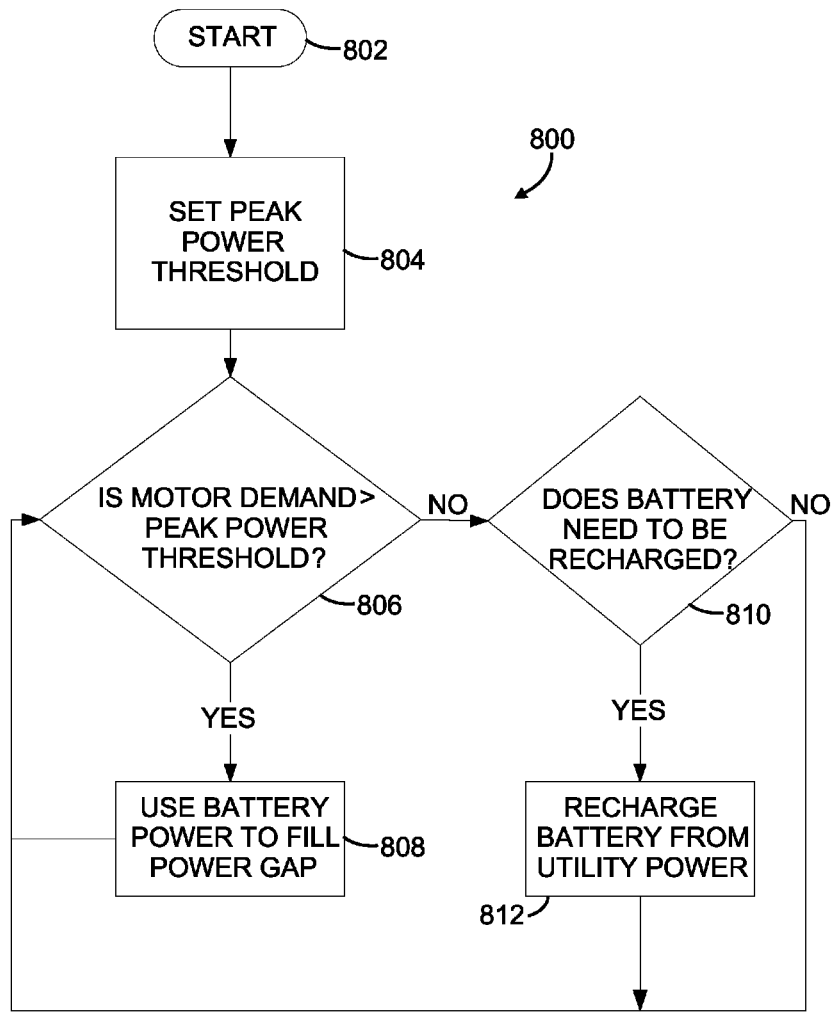
FIG. 22 is a flow chart of an exemplary embodiment of a process for reducing costs associated with startup of high startup cost applications and equipment.

FIG. 22 is a flow chart of an exemplary embodiment of a process 800 for reducing costs associated with startup of high startup cost applications and equipment, e.g., equipment 750 of FIGS. 21A and 21B. In the exemplary embodiment, the process 800 may start by setting a peak power threshold for the application or equipment (blocks 802 and 804). For example, the peak power threshold may be greater than or equal to a steady stated power load of the equipment. The process 800 may then monitor for a change in the power demand or load of the equipment (block 806). For example, the process 800 may query whether a motor demand is greater than the peak power threshold. If the threshold is exceeded at block 806, then the process 800 may use battery power to fill the power gap (block 808). For example, if the equipment has a continuous power load of one 1000 watts and a startup load of 2500 watts, then the process 800 may use the battery power to fill the 1500 watt gap between the continuous and startup loads. If the peak power threshold is not exceeded at block 806, then the process 800 may query whether the battery needs to be recharged (block 810). If the process 800 does not identify the need for a battery recharge at block 810, then the process 800 may continue to query for a change in the equipment load versus the peak power threshold at block 806. If the process 800 identified a need for battery recharging at block 810, then the process 800 may proceed to recharge the battery from the utility power (block 812).

Figure 23A:
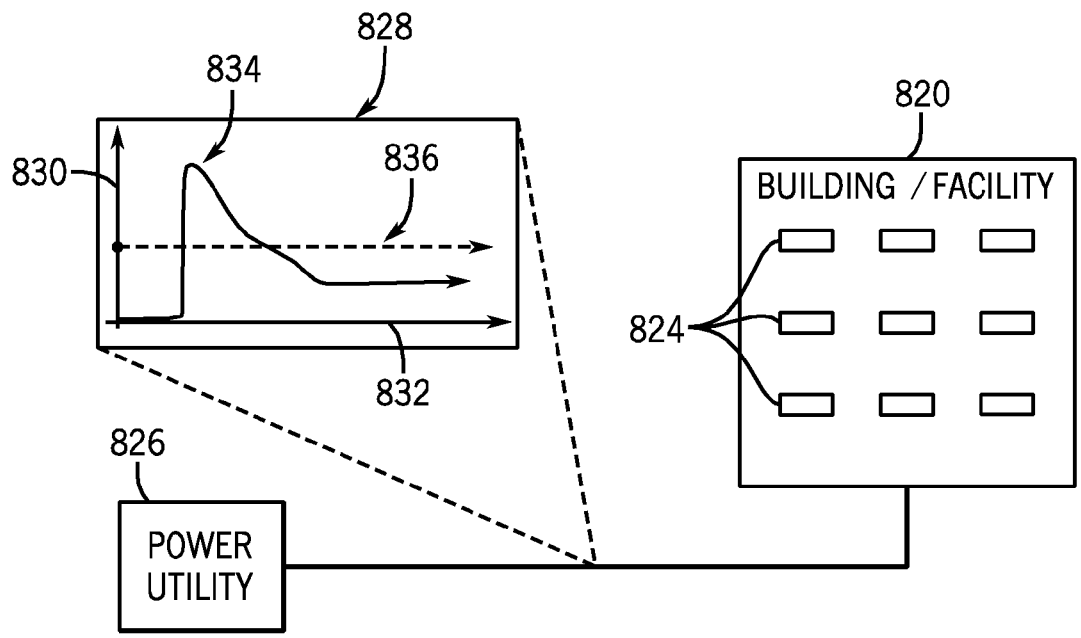
FIGS. 23A and 23B are schematics of an exemplary embodiment of an electrical infrastructure in a building with battery packs to regulate building demand.
Figure 23B:
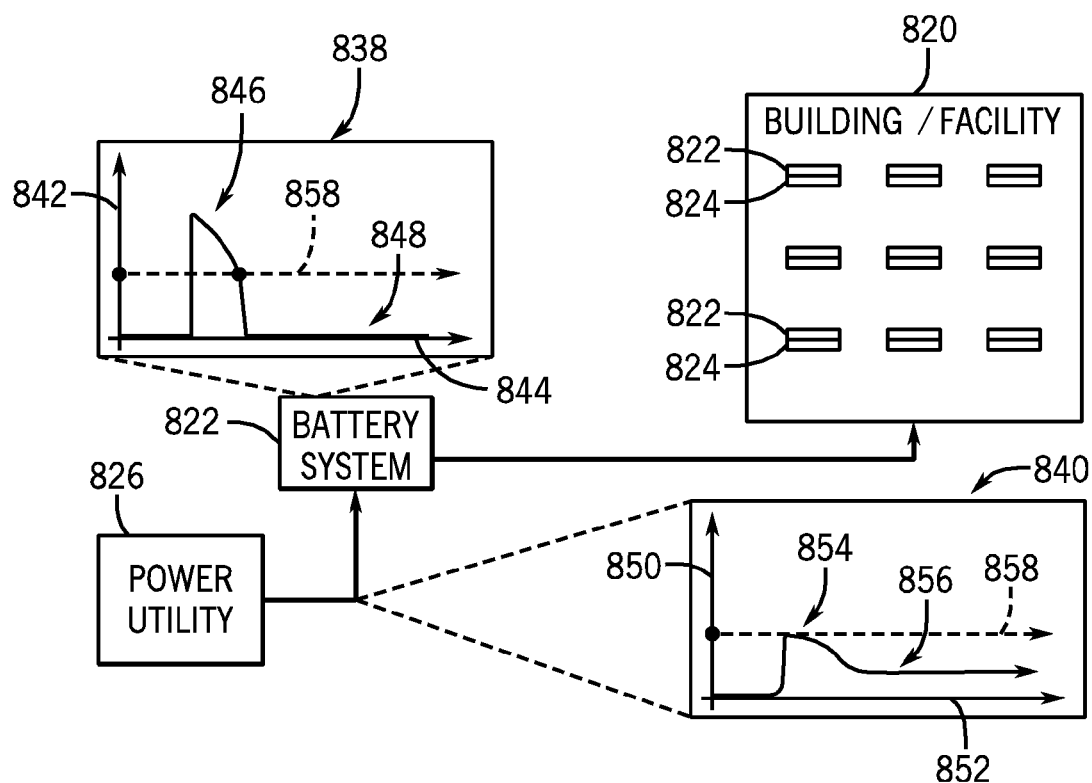

FIGS. 23A and 23B are schematics of an exemplary embodiment of an electrical infrastructure in a building 820, which employs one or more stationary batteries 822 to even out startup power demands for various high startup electrical devices 824 throughout the building 820. In the exemplary embodiment, the stationary batteries 822 may enable a substantial downsizing of the electrical infrastructure in the building 820, because the high initial startup loads of the electrical devices 824 are shifted from the electrical infrastructure to the stationary batteries 822. FIG. 23A is a schematic of the electrical infrastructure without the stationary batteries 822, whereas FIG. 23B is a schematic of the electrical infrastructure including the stationary batteries 822. In operation, the stationary batteries 822 substantially eliminate the initial high startup load on the electrical infrastructure caused by devices 824 throughout the building 820.

The exemplary embodiments may function to provide power fail restart. In this application, the battery 822 provides startup power when multiple inductive loads 824 (e.g., pumps, motors, fans, chillers) startup at the same time. When multiple loads 824 in building 820 need to be started at the same time (e.g., when the power restarts after a power failure), there is a significant draw on the building's power infrastructure. Certain buildings may include special controls that sequence the startup of devices to eliminate this power draw. Instead of sequencing equipment to eliminate the power draw, this application provides the additional startup power from the stationary battery 822 near each device 824 and/or located at a central location.

FIG. 23A shows building 820 coupled to power utility 826 without any stationary batteries 822. A graph 828 in FIG. 23A shows energy consumption or load 830 versus time 832 of the various devices 824 in building 820 from an initial startup 834 to a steady state condition 836. During the initial startup 834, the graph 828 shows a significant spike in the load 830 by the devices 824 in building 820. Unfortunately, this spike in the load 830 may be expensive if energy costs are high during the initial startup 834 of the devices 824. The spike in the load 830 also creates a significant drain on the electric utility, particularly when combined with many other load spikes. The electrical infrastructure in the building also may be oversized to account for such load spikes.

FIG. 23B is a schematic of an exemplary embodiment of battery power for high startup cost applications, such as devices 824 in building 820 of FIG. 23A. In the exemplary embodiment, building 820 includes a plurality of batteries 822 distributed throughout the building, e.g., coupled to each device 824. During the initial startup of the devices 824 in building 820, the batteries 822 provide power to the devices 824 to reduce the load on the electrical utility, as indicated by an upper graph 838 and a lower graph 840. The upper graph 838 shows energy consumption or load 842 of the devices 824 on the batteries 822 (e.g., building load on batteries) versus time 844 from an initial startup 846 to a steady state condition 848. The lower graph 840 shows energy consumption or load 850 of the devices 824 on the power utility 826 (e.g., building load on power utility) versus time 852 from an initial startup 854 to a steady state condition 856.

In both upper and lower graphs 838 and 840, a horizontal line 858 represents an energy threshold or limit for the utility power. In other words, the lower graph 840 shows that power utility 826 supplies power to the devices 824 up to the horizontal line 858 (e.g., energy threshold), while the upper graph 838 shows that the batteries 822 supply the additional energy needed above the horizontal line 858. Together, the power utility 826 and the batteries 822 provide sufficient power to meet the high startup demands of devices 824 in building 820 (e.g., building demand), while substantially reducing the load on the power utility 826. Batteries 822 also defer costs to a later time for charging of the batteries 822. In other words, the system may recharge the batteries 822 when the demand and/or costs associated with the electric utility are relatively low. The batteries 822 also may enable a less robust electrical infrastructure within the building 820, as the electrical infrastructure may be sized based on the steady state conditions rather than peak conditions of loads.

Since the battery power is only needed for a short period during startup, there are at least three ways that the batteries 822 can be controlled. First, the simplest way would be for the batteries 822 to supply power until they run out of charge. Second, a battery 822 could be programmed to turn itself off after a fixed or random time after a power restart. Third, a building controller could sequence the shutdown of the batteries. After the power is restarted, the batteries 822 may then be recharged and readied for the next restart.

Figure 24:
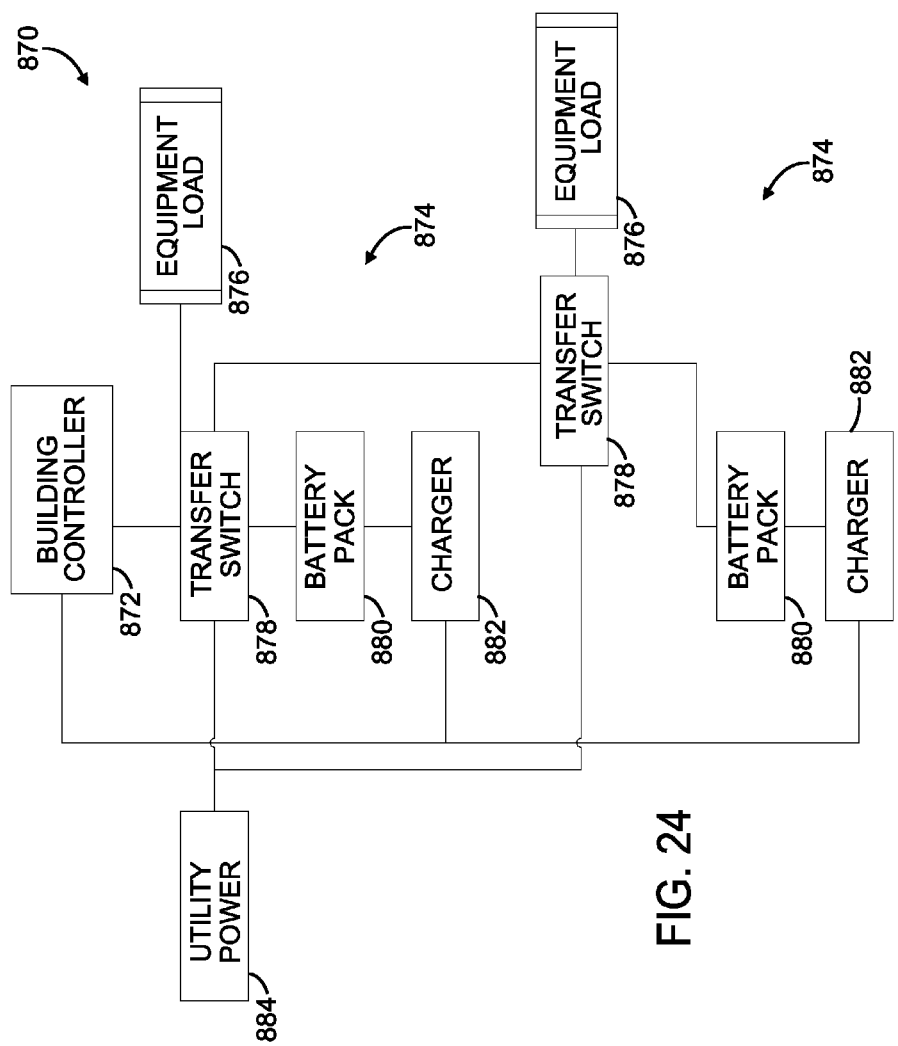
FIG. 24 is a block diagram of an exemplary embodiment of a system for power fail restart of high startup cost equipment.

FIG. 24 is a block diagram of an exemplary embodiment of a system 870 for power fail restart of high startup cost equipment, e.g., devices 824 in building 820 of FIG. 23B. In the exemplary embodiment, the system 870 includes a building controller 872 coupled to one or more sets of power controlled equipment 874. For example, each set of power controlled equipment 874 may include an equipment load 876, a transfer switch 878, a battery pack 880, and a charger 882. The building controller 872 may selectively control each transfer switch 878 to change between utility power 884 and battery power from the battery pack 880 based on various conditions, such as a high startup costs associated with the equipment load 876. The equipment load 876 may undergo a high peak value at startup after a power loss, a maintenance procedure, or a normal shutdown of the equipment. Prior to startup, the building controller 872 may trigger each transfer switch 878 to change from utility power 884 to battery power via the battery pack 880 to substantially reduce the initial high startup load of the equipment 876. Subsequently, the building controller 872 may direct the transfer switch 878 to change back from the battery power to the utility power 884. The return to utility power 884 may occur after a pre-set amount of time, a steady state condition of the equipment load 876, or at a random time. The building controller 872 may direct the charger 882 to perform a quick charge, a trickle charge, a battery reconditioning process, or another function associated with the battery pack 880. In certain exemplary embodiments, the building controller 872 may trigger each transfer switch 878 to change from utility power 884 to battery power to startup the equipment 876 in a sequence to progressively step up the load on the utility power 884 in the electrical infrastructure.

Figure 25:
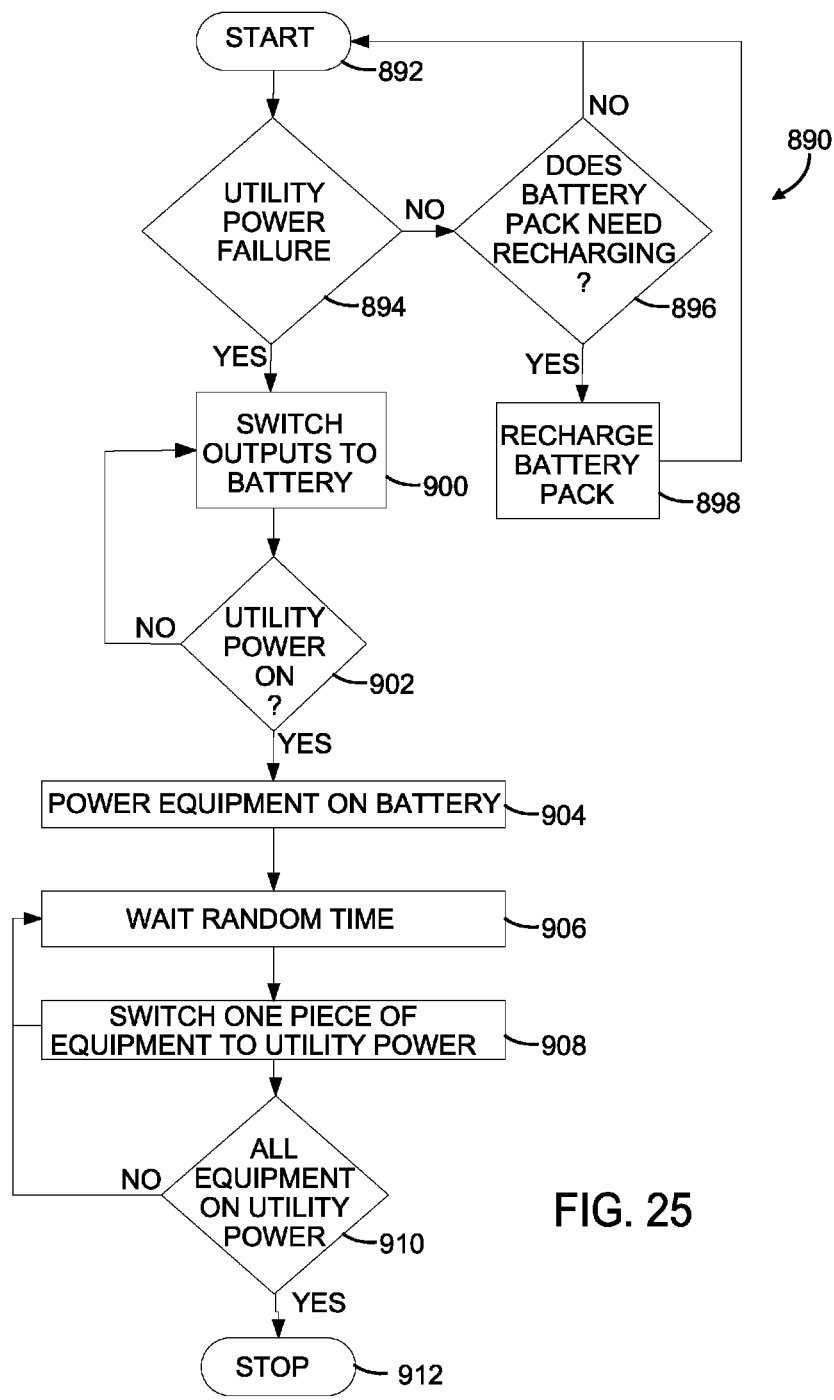
FIG. 25 is a flow chart of an exemplary embodiment of a process for power fail restart of high startup cost equipment.

FIG. 25 is a flow chart of an exemplary embodiment of a process 890 for power fail restart of high startup cost equipment, e.g., devices 824 in building 820 of FIG. 23B. In the exemplary embodiment, the process 890 may start by monitoring for a utility power failure (blocks 892 and 894). If the process 890 does not identify a utility power failure at block 894, then the process 890 may query for a need for battery pack recharging (block 896). If the process 890 identifies a need for battery recharging at block 896, then the process 890 may proceed to initiate a battery pack recharge (block 898). Otherwise, the process 890 may continue to monitor for a utility power failure at block 894. If the process 890 identifies a utility power failure at block 894, then the process 890 may proceed to switch from the utility power to the battery power (block 900). The process 890 may then monitor for a return of utility power (block 902).

Upon return of the utility power at block 902, the process 890 may startup the equipment with the battery power (block 904). The process 890 may then wait a random or preset amount of time (block 906), and then progressively switch the equipment back to the utility power (blocks 908 and 910). For example, the process 890 may begin by switching one piece of equipment back to utility power (block 908), and then query for any remaining equipment on battery power (block 910). If the process 890 identifies additional equipment on battery power at block 910, then the process 890 may wait another random or pre-set amount of time (block 906) and then switch another piece of equipment back to utility power (block 908). After all equipment is back on utility power at block 910, the process 890 may end or continue to monitor for a utility power failure (block 912). In an exemplary embodiment, the process 890 may not return power to all equipment until utility power is returned to the electrical infrastructure. However, an exemplary embodiment may startup and run one or more pieces of the equipment on battery power for at least some duration of time after the utility power failure. For example, the process 890 may run one or more critical pieces of equipment for an amount of time to complete a process.

Figure 26A:
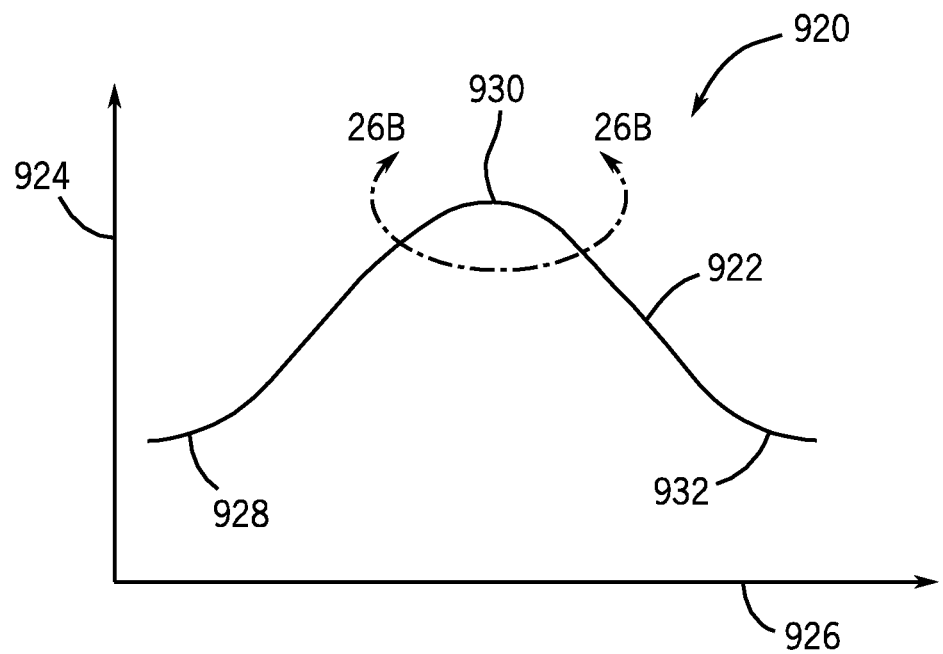
FIGS. 26A and 26B are graphs of an exemplary embodiment of a system for battery trickle charging.
Figure 26B:
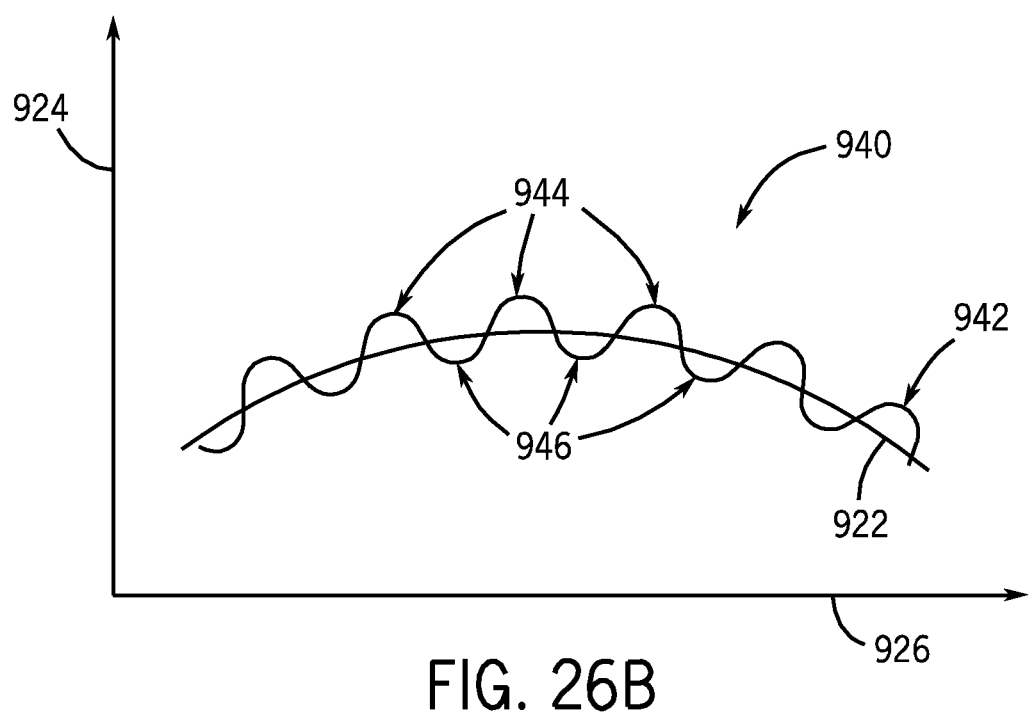

FIGS. 26A and 26B are graphs of an exemplary embodiment of a system for battery trickle charging. In the exemplary embodiment, the system may enable full charging of vehicle and stationary batteries during short term or long term periods of low demand and/or low cost of energy from the power utility. For example, the system may charge the batteries during short term or long term periods of low demand from a particular building, power utility, or another perspective. In exemplary embodiments, the system enables PHEV and stationary battery trickle charging, and specifically manages the recharging process using a demand-leveling strategy based on short-term building energy demand. Recharging PHEV's (and stationary energy storage systems) during on-peak periods can be very expensive and places additional demands on the grid. In commercial building applications, this problem is even more severe as large numbers of vehicles may be plugged in at any one time.

This energy management application coordinates charging of PHEVs, EVs and stationary energy storage systems to intermittently allow charging during short-term periods of low demand. The application would track electrical demand for the building and start trickle charging the batteries when the current demand is lower than the moving average demand over a set period. The vehicles or stationary units would be staggered to allow a large number of batteries to be charged over the course of a day without increasing the peak demand for the building. This process would tend to level the electrical demand for the building and would be applicable to commercial buildings as well as homes.

In certain embodiments, a controller tracks where and when the energy is distributed throughout a building. For example, the controller may monitor energy demand throughout floors and vehicle power connections external to the building. The controller may monitor a short term cyclic nature (or random fluctuations) of the energy demand in the building, but may determine a general trend in the energy demand over the course of each day. During short term periods of low demand or low cost of energy, the controller may enable quick charging or trickle charging of one or more vehicles (e.g., vehicle batteries) connected to the building and/or stationary batteries located inside the building.

FIG. 26A is a graph 920 of a load trend 922 of electricity demand or load 924 versus time 926. As illustrated, the load trend 922 gradually increases from a first minimum load 928 to a maximum load 930 (e.g., peak), and then gradually decreases from the maximum load 930 to a second minimum load 932. The illustrated load trend 922 may correspond to a cyclical trend (e.g., 24 hour period) of operation of a power grid, a building grid, a facility grid, or a specific item of equipment. Thus, the load trend 922 may be described as a long term cyclic trend.

FIG. 26B is a graph 940 of a short-term portion of load trend 922, taken within arcuate line 26B-26B of FIG. 26A. Graph 940 illustrates a short-term cyclic profile 942 (e.g., repeating or random fluctuations) of electricity demand or load 924 versus time 926. As illustrated, short-term cyclic profile 942 alternatingly increases and decreases above and below the load trend 922, as indicated by cyclic peaks 944 above the load trend 922 and cyclic drops 946 below the load trend 922. These cyclical peaks 944 and cyclic drops 946 may occur over a time period of seconds or minutes. In certain embodiments, these cyclic peaks 944 and cyclic drops 946 may correspond to harmonics of the power frequency. For example, in a 60 Hz power grid, the harmonics may correspond to odd factors of 60 Hz, e.g., 180 Hz, 300 Hz, 420 Hz, 540 Hz, and/or 660 Hz.

Regardless of the time frame, the disclosed embodiments may charge one or more batteries (e.g., stationary batteries and/or vehicle batteries) during the short-term cyclic drops 946, and discharge the one or more batteries during the short-term cyclic peaks 944. The short-term cyclic charging and discharging of the batteries may substantially smooth the energy demand on the power grid. In certain embodiments, the short-term cyclic peaks 944 and cyclic drops 946 may correspond to real-time pricing information, and thus the disclosed embodiments may provide real-time, short term charging during low pricing and real-time, short term discharging during high pricing. In certain embodiments, the batteries also may be used to smooth utility power exhibiting similar short-term cyclic peaks 944 and drops 946. In other words, the batteries may cyclically charge and discharge to provide a clean 60 Hz of power without short-term variations (e.g., electrical noise on the power line).

Figure 27:
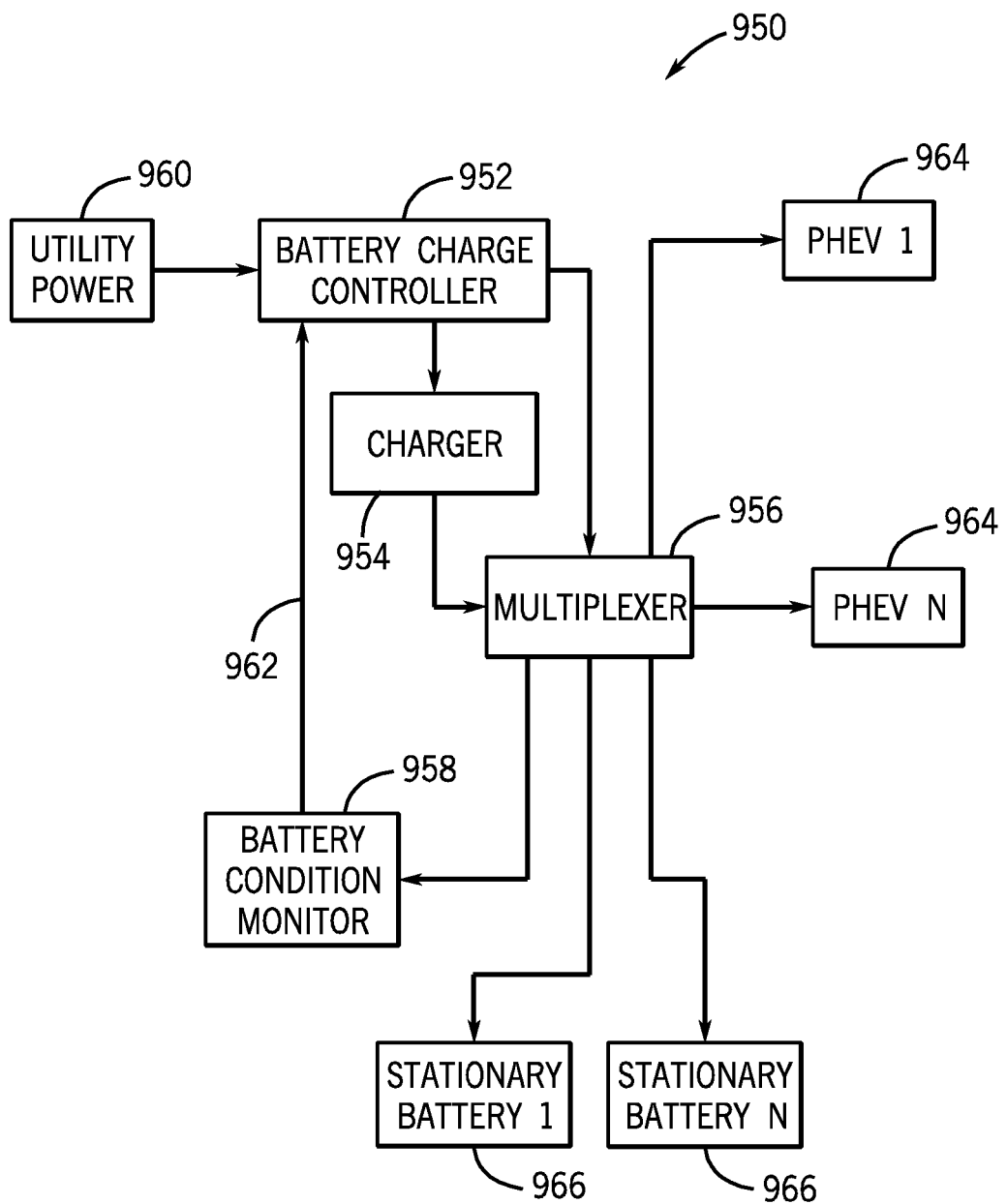
FIG. 27 is a block diagram of an exemplary embodiment of a system for trickle charging vehicle and stationary batteries within a building.

FIG. 27 is a block diagram of an exemplary embodiment of a system 950 for trickle charging vehicle and stationary batteries within a building. In an exemplary embodiment, the system includes a battery charge controller 952, a charger 954, a multiplexer 956, and a battery condition monitor 958. The battery charge controller 952 may receive utility power 960 and information 962 from the battery condition monitor 958. Based on this information 962, the battery charge controller 952 may engage or disengage the charger 954 and control the multiplexer 956 to provide power to charge one or more vehicle batteries 964 and stationary batteries 966. For example, the battery charge controller 952 may receive real time pricing (RTP) and demand data from the power utility and energy usage data associated with the particular building. During periods of low demand or low cost of energy, the battery charge controller 952 may enable the charger 954 and control the multiplexer 956 to charge the various batteries 964 and 966. The battery charge controller 952 may enable either parallel or sequential charging of the various batteries 964 and 966 depending on the current demand, energy costs, and energy consumption in the building.

For example, the system 950 may charge one or more batteries (e.g., stationary batteries and/or vehicle batteries) during the short-term cyclic drops 946 as shown in FIG. 26B, and discharge the one or more batteries during the short-term cyclic peaks 944 as shown in FIG. 26B. Thus, the system 950 may provide short-term bursts of electricity into or out of batteries based on electricity demand, real-time pricing information, and fluctuations in utility power 960.

Figure 28:
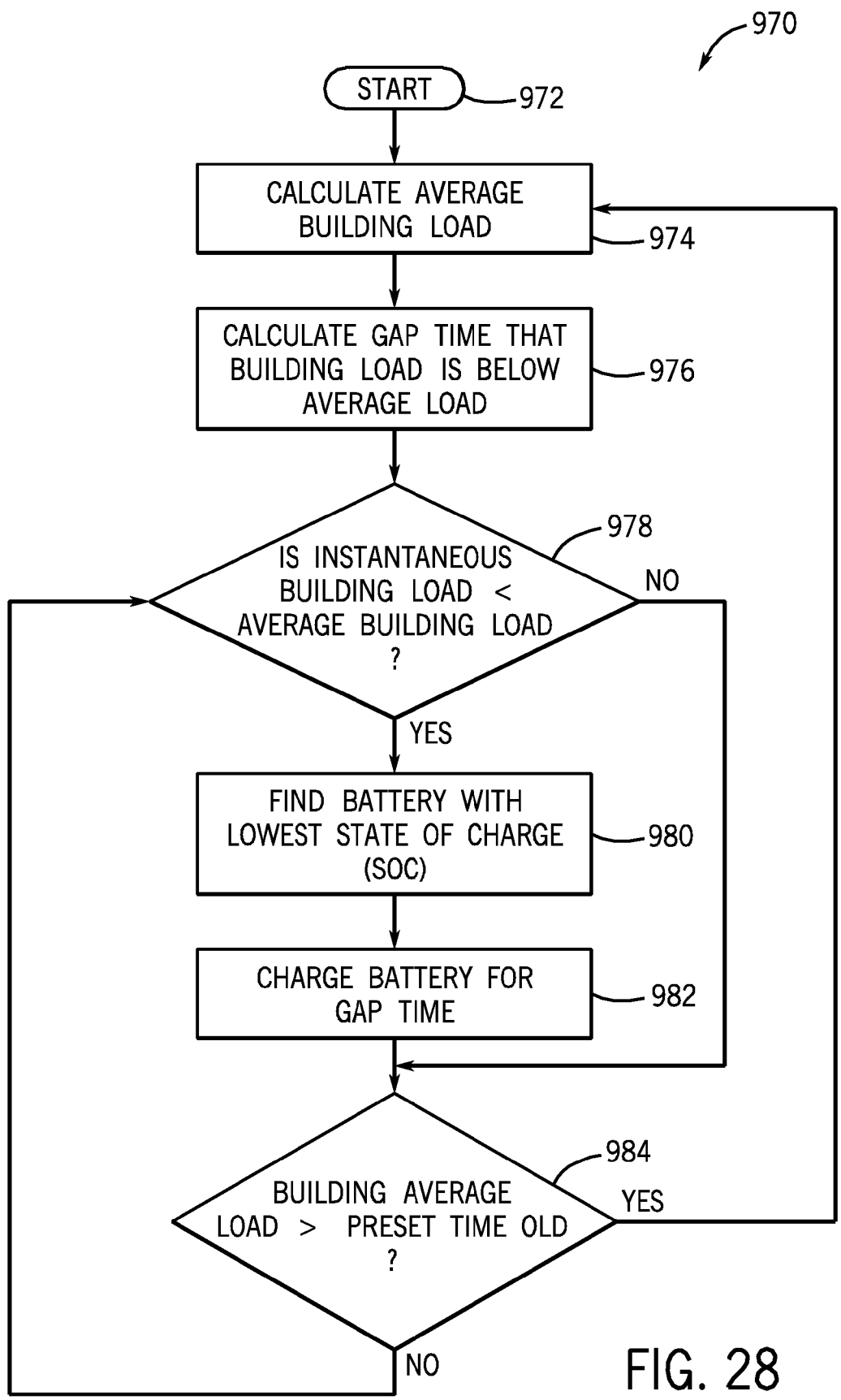
FIG. 28 is a flowchart of an exemplary embodiment of a process for trickle charging vehicle and stationary batteries in a building.

FIG. 28 is a flowchart of an exemplary embodiment of a process 970 for trickle charging vehicle and stationary batteries within a building. In an exemplary embodiment, the process 970 may start by calculating an average building load or trend (blocks 972 and 974). For example, the process 970 may monitor energy usage throughout the building and determine a general trend of the energy usage throughout the building. The process 970 may then calculate one or more gap times that the building load is below the average load (block 976). The process 970 may then monitor for an instantaneous building load versus an average building load (block 978). If the process 970 identifies an instantaneous building load that is less than the average building load at block 978, then the process 970 may identify one or more batteries with a lowest state of charge (SOC) as indicated by block 980, and charge the one or more batteries for the gap time as indicated by block 982. Otherwise, if the instantaneous building load is not less than the average building load at block 978, then the process 970 may skip the steps of identifying batteries with the lowest state of charge (block 980) and charging those batteries for the gap time (block 982).

At block 984, the process 970 may then evaluate whether the average building load is greater than the pre-selected time, e.g., one minute old. If the average building load is greater than the pre-selected time at block 984, then the process 970 may return to the previous step of calculating the average building load (block 974). Otherwise, if the average building load is not greater than the pre-selected time (block 974), then the process 970 may continue to evaluate whether the instantaneous building load is less than the average building load (block 978). In the exemplary embodiment, the process 970 continuously monitors and calculates average building load and instantaneous building load to determine short term periods of low building load (block 978). During these short term periods of low load, the process 970 enables battery charging of one or more vehicles and stationary batteries. In this manner, the process 970 may fill the gaps of low building load, such that the building load has less short term variations and is generally a smooth trend during operation.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A system, comprising:
a heating, ventilating, and air conditioning (HVAC) component; and
a backup energy source coupled to the HVAC component, wherein the backup energy source comprises:
a battery directly attached to the HVAC component,
a modular battery system,
a housing of the modular battery system,
a plurality of battery receptacles in the housing,
a plurality of battery modules removably disposed in the plurality of battery receptacles, and
a charger/inverter including a control panel, wherein the charger/inverter is configured to monitor and control aspects of charging and discharging the plurality of battery modules based on input from a buildings electrical system.

2. A system, comprising:
a heating, ventilating, and air conditioning (HVAC) component; and
a backup energy source coupled to the HVAC component, wherein the backup energy source comprises a battery directly attached to the HVAC component,
wherein the HVAC component comprises a chiller, a condenser, an air handling unit (AHU), or a furnace, or a combination thereof, having the battery integrated into a common enclosure.

3. The system of claim 2, wherein the system comprises a plurality of HVAC components configured to mount at distributed locations in a building, and each HVAC component comprises an associated battery.

4. The system of claim 2, wherein the battery is configured to at least partially power the HVAC component during a startup procedure.

5. A system, comprising:
a heating, ventilating, and air conditioning (HVAC) component; and
a backup energy source coupled to the HVAC component, wherein the backup energy source comprises a battery directly attached to the HVAC component, and
wherein the backup energy source comprises a vehicle battery disposed in a vehicle, and the backup energy source comprises a controller configured to obtain backup power from a fleet of vehicles with vehicle batteries.

6. A system, comprising:
a heating, ventilating, and air conditioning (HVAC) component; and
a backup energy source coupled to the HVAC component, wherein the backup energy source comprises a battery directly attached to the HVAC component, and
wherein the battery is configured to charge during short-term drops in energy demand or pricing, or the battery is configured to discharge during short-term peaks in energy demand or pricing, or the battery is configured to charge or discharge during electrical noise on a power line, or a combination thereof.

7. A system, comprising:
an appliance; and
a backup energy source coupled to the appliance, wherein the backup energy source comprises a battery directly attached to the appliance and wherein the battery is configured to at least partially power the appliance during a startup procedure.

8. The system of claim 7, wherein the battery is integrated into a common enclosure of the appliance, and the appliance comprises a laundry machine or a dishwasher.

9. The system of claim 7, wherein the battery is integrated into a common enclosure of the appliance, and the appliance comprises an oven, a cooktop, or a microwave.

10. The system of claim 7, wherein the battery is integrated into a common enclosure of the appliance, and the appliance comprises a refrigerator or a freezer.

11. The system of claim 7, wherein the backup energy source comprises:
a modular battery system;
a housing of the modular battery system;
a plurality of battery receptacles in the housing;
a plurality of battery modules removably disposed in the plurality of battery receptacles; and
a charger/inverter including a control panel, wherein the charger/inverter is configured to monitor and control aspects of charging and discharging the plurality of battery modules based on input from a buildings electrical system.

12. A system, comprising:
an appliance; and
a backup energy source coupled to the appliance, wherein the backup energy source comprises a battery directly attached to the appliance, wherein the battery is configured to charge during short-term drops in energy demand or pricing, or the battery is configured to discharge during short-term peaks in energy demand or pricing, or the battery is configured to charge or discharge during electrical noise on a power line, or a combination thereof.

13. A system comprising:
an appliance; and
a backup energy source coupled to the appliance, wherein the backup energy source comprises a battery directly attached to the appliance,
wherein the backup energy source comprises a modular battery system having a plurality of battery receptacles, and a plurality of battery modules are removably disposed in the plurality of battery receptacles, and wherein the plurality of battery modules comprises a plurality of vehicle battery modules.

14. A system, comprising:
an energy controller configured to communicate data and energy between a vehicle, a building, and a power utility, wherein the energy controller is configured to control energy distribution from a vehicle battery in the vehicle, a stationary battery in the building, and a power grid.

15. The system of claim 14, wherein the energy controller comprises a vehicle controller configured to mount in the vehicle, a building controller configured to mount in the building, or a combination thereof.

16. The system of claim 14, wherein the energy controller is configured to communicate with a vehicle fleet having a plurality of vehicles, each having an associated vehicle battery.

17. The system of claim 14, wherein the energy controller is configured to start an engine of the vehicle to generate power.

18. The system of claim 17, wherein the energy controller is configured to control a ventilation system of a garage containing the vehicle.

* * * * *